United States Patent
Tada et al.

(10) Patent No.: US 12,545,020 B2
(45) Date of Patent: Feb. 10, 2026

(54) SHEET PROCESSING DEVICE, SHEET LAMINATOR, IMAGE FORMING APPARATUS, AND IMAGE FORMING SYSTEM

(71) Applicants: Ryoma Tada, Kanagawa (JP); Yuuta Hayashi, Tokyo (JP); Haruka Koba, Kanagawa (JP)

(72) Inventors: Ryoma Tada, Kanagawa (JP); Yuuta Hayashi, Tokyo (JP); Haruka Koba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 18/634,313

(22) Filed: Apr. 12, 2024

(65) Prior Publication Data

US 2024/0343034 A1  Oct. 17, 2024

(30) Foreign Application Priority Data

Apr. 14, 2023  (JP) .................................. 2023-066314
Feb. 2, 2024  (JP) .................................. 2024-014825

(51) Int. Cl.
  *B32B 43/00* (2006.01)
  *B32B 37/00* (2006.01)
  (Continued)

(52) U.S. Cl.
  CPC ........ *B32B 43/006* (2013.01); *B32B 37/0046* (2013.01); *B32B 41/00* (2013.01);
  (Continued)

(58) Field of Classification Search
  CPC ... B32B 43/006; B32B 37/0046; B32B 41/00; B32B 2037/0061; B65H 5/006;
  (Continued)

(56) References Cited

U.S. PATENT DOCUMENTS

2020/0247636 A1* 8/2020 Furuhashi ............ B65H 29/125
2020/0341414 A1  10/2020 Watanabe et al.
(Continued)

FOREIGN PATENT DOCUMENTS

JP  2020-121868 A  8/2020
JP  2020-179969 A  11/2020

*Primary Examiner* — Alex B Efta
*Assistant Examiner* — Alexander S Wright
(74) *Attorney, Agent, or Firm* — Harness, Dickey & Pierce, P.L.C.

(57) ABSTRACT

A sheet processing device includes a rotator, a first nipper, a conveyor, a second nipper, a detector, a memory, and circuitry. The rotator winds a two-ply sheet around the rotator to generate a winding circumferential difference between two sheets of the two-ply sheet to separate the two sheets. The detector detects an abnormal condition, in which a gap greater than a given interval is not formed between the two sheets around the rotator. The memory stores a detection result as the abnormal condition. The circuitry is to increase a nipping force of the second nipper with the rotator, and increase the nipping force in a present sheet processing to be greater than a previous nipping force of the second nipper in a previous sheet processing, when the memory stores the detection of the abnormal condition in the previous sheet processing, to wind the two sheets around the rotator.

13 Claims, 32 Drawing Sheets

(51) Int. Cl.
  *B32B 41/00*   (2006.01)
  *B65H 5/00*    (2006.01)
  *B65H 5/30*    (2006.01)
  *B65H 7/12*    (2006.01)

(52) U.S. Cl.
  CPC ............. *B65H 5/006* (2013.01); *B65H 5/305* (2013.01); *B65H 7/12* (2013.01); *B32B 2037/0061* (2013.01); *B65H 2404/1441* (2013.01); *B65H 2801/27* (2013.01)

(58) Field of Classification Search
  CPC .. B65H 5/305; B65H 7/12; B65H 2404/1441; B65H 2801/27; B65H 29/00
  See application file for complete search history.

(56) References Cited

U.S. PATENT DOCUMENTS

2022/0011712 A1\* 1/2022 Asano ................ G03G 15/6591
2023/0278819 A1  9/2023 Koba et al.

\* cited by examiner

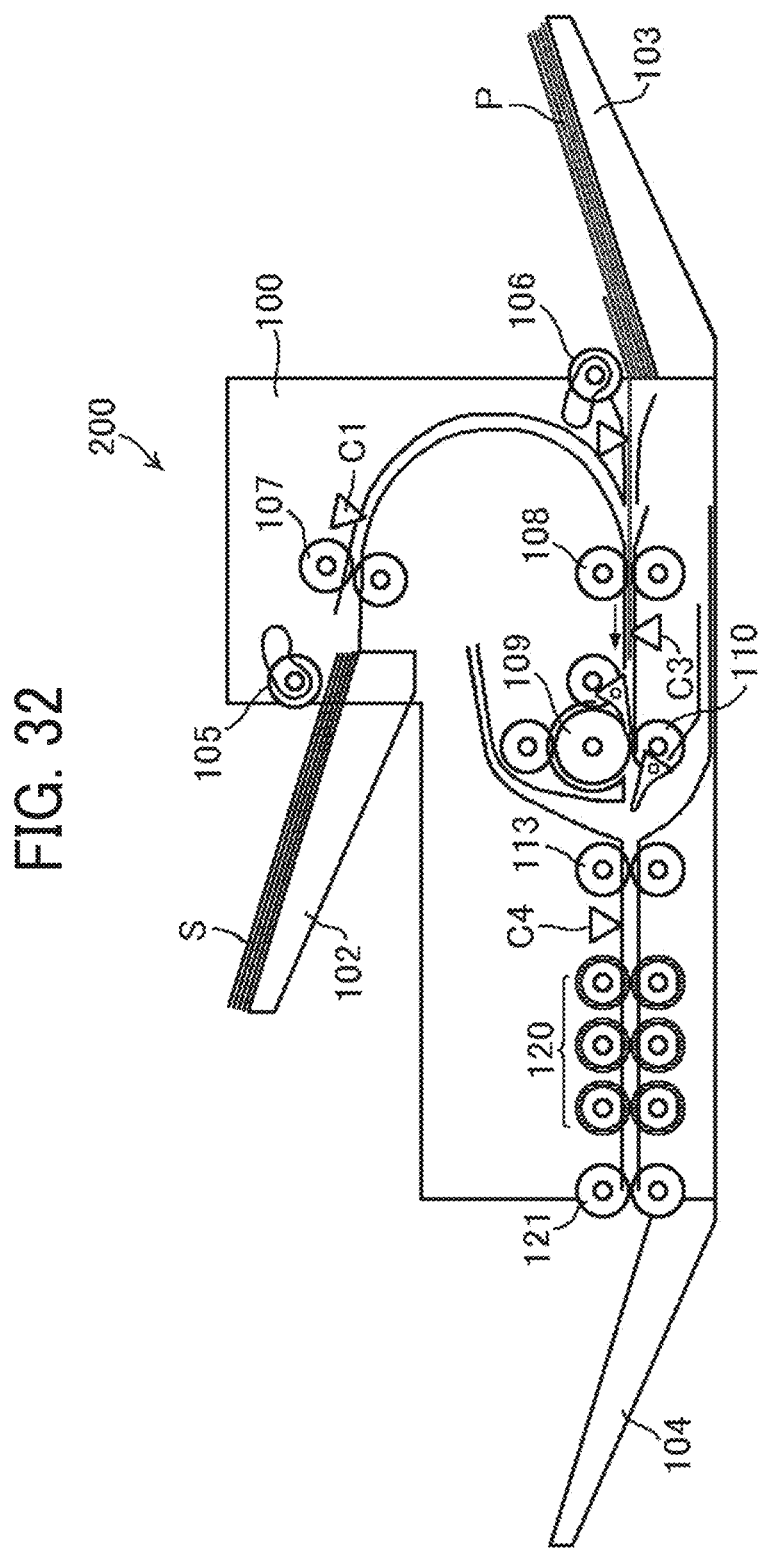

SHEET PROCESSING DEVICE, SHEET LAMINATOR, IMAGE FORMING APPARATUS, AND IMAGE FORMING SYSTEM

CROSS-REFERENCE TO RELATED APPLICATIONS

This patent application is based on and claims priority pursuant to 35 U.S.C. § 119 (a) to Japanese Patent Application Nos. 2023-066314, filed on Apr. 14, 2023, and 2024-014825, filed on Feb. 2, 2024, in the Japan Patent Office, the entire disclosure of each of which is hereby incorporated by reference herein.

BACKGROUND

Technical Field

Embodiments of the present disclosure relate to a sheet processing device, a sheet laminator, an image forming apparatus, and an image forming system.

Background Art

Lamination technologies are known in the art that insert an inner sheet (e.g., paper or photo) between a two-ply sheet (e.g., a lamination sheet or lamination film such as a lamination pouch or lamination folder) and apply heat and pressure to the two-ply lamination sheet to bond the two-ply lamination sheet to insert the inner sheet enclosed by the two-ply lamination sheet. The two-ply lamination sheet is made of two sheets (plies) bonded (sealed) on one side as if one sheet is folded.

The operation of inserting an inner sheet into a two-ply sheet has been mainly performed manually, but in recent years, an apparatus for automating the operation has been proposed.

For example, a sheet separation device has been proposed in which two sheets of a two-ply sheet are separated off by winding the two-ply sheet around a rotary member, generating a difference in the circumferential length of the winding (a slip amount) between one sheet on the inner circumferential side and the other sheet on the outer circumferential side from a geometric relationship, and inserting a separation member in a gap (space) between the two sheets.

This sheet separation device separates the two sheets of the two-ply sheet without making the device to have a complicated, large configuration, due to a relatively simple configuration in which the two sheets are wound around the rotary member.

However, in the peeling apparatus of Patent Document 1, when the two sheets are strongly adhered to each other by static electricity and the difference in winding circumferential length is small, a gap sufficient for inserting the peeling claw is not formed, and the sheets cannot be peeled in some cases.

In this case, when another sheet is subsequently peeled off, the difference in the winding circumferential length remains small because the nipping force of the second member for nipping the two ply sheet between the second member and the rotating member is constant, and thus there is a possibility that the sheet cannot be separated again.

SUMMARY

Embodiments of the present disclosure described herein provide a novel sheet processing device including a rotator, a first nipper, a conveyor, a second nipper, a detector, a memory, and circuitry. The rotator winds a two-ply sheet, in which two sheets are overlapped and bonded at one end of the two-ply sheet, around the rotator to generate a winding circumferential difference between the two sheets of the two-ply sheet. The first nipper nips the two-ply sheet with the rotator to convey the two-ply sheet in a conveyance direction. The conveyor is disposed downstream from the rotator in the conveyance direction to convey the two-ply sheet to a nip between the rotator and the first nipper. The second nipper nips the two-ply sheet with the rotator. The second nipper is disposed downstream from the first nipper in a first rotational direction in which the rotator winds the two-ply sheet. The detector detects an abnormal condition, in which a gap greater than a given interval is not formed between the two sheets of the two-ply sheet when the two sheets is wound around the rotator. The memory stores a detection result as the abnormal condition by the detector. The circuitry is to increase a nipping force of the second nipper, to nip the two-ply sheet with the rotator, with respect to the first nipper toward downstream from the first nipper in the first rotational direction, and increase the nipping force of the second nipper in a present sheet processing to be greater than a previous nipping force of the second nipper in a previous sheet processing when the memory stores the detection result as the abnormal condition in the previous sheet processing, to wind the two sheets of the two-ply sheet around the rotator.

Further, embodiments of the present disclosure described herein provide an image forming apparatus including a sheet stacker, a sheet feeder, an image forming device, and the above-described sheet processing device. The sheet stacker stacks stack a two-ply sheet. The sheet feeder feeds the two-ply sheet from the sheet stacker. The image forming device forms an image on the two-ply sheet fed from the sheet feeder.

Further, embodiments of the present disclosure described herein provide an image forming system including an image forming apparatus to form an image on the two-ply sheet, and the above-described sheet processing device.

Further, embodiments of the present disclosure described herein provide an image forming system includes an image forming apparatus and the above-described sheet processing device. The image forming apparatus forms an image on the two-ply sheet. The sheet processing device is detachably attached to the image forming apparatus.

Further, embodiments of the present disclosure described herein provide a sheet laminator including the above-described sheet processing device and a thermal pressure member to heat and press the two-ply sheet to perform a sheet laminating operation on the two-ply sheet in which an inner sheet is inserted between the two sheets separated by the sheet processing device.

Further, embodiments of the present disclosure described herein provide an image forming apparatus including a sheet stacker, a sheet feeder, an image forming device, and the above-described sheet laminator. The sheet stacker stacks a two-ply sheet. The sheet feeder feeds the two-ply sheet from the sheet stacker. The image forming device forms an image on the two-ply sheet fed from the sheet feeder. The sheet laminator performs a sheet laminating operation on the two-ply sheet in which an inner sheet is inserted between the two sheets.

Further, embodiments of the present disclosure described herein provide an image forming system including an image forming apparatus to form an image on the two-ply sheet, and the above-described sheet laminator.

Further, embodiments of the present disclosure described herein provide an image forming system including an image forming apparatus and the above-described sheet laminator. The image forming apparatus forms an image on the two-ply sheet. The sheet laminator is detachably attached to the image forming apparatus.

BRIEF DESCRIPTION OF THE SEVERAL VIEWS OF THE DRAWINGS

Exemplary embodiments of this disclosure will be described in detail based on the following figures, wherein:

FIG. 32 is a diagram illustrating an overall configuration of a sheet laminator including the sheet processing device according to an embodiment of the present disclosure;

Figure 1:
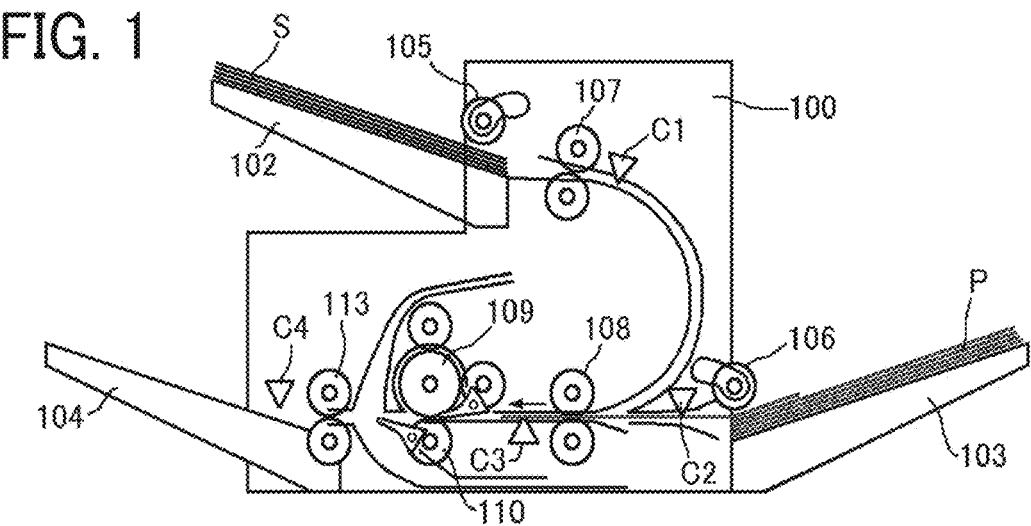
FIG. 1 is a diagram illustrating an overall configuration of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

A sheet processing device according to the present embodiment separates two sheets (plies) of a two-ply sheet, which is referred to as a lamination sheet S in the following description, to insert and sandwich an inner sheet P between the separated sheets of the lamination sheet S.

The lamination sheet S is a two-ply sheet in which two sheets are overlapped and bonded together at a portion (or a side) of the two-ply sheet.

For example, a two-ply sheet has two sheets (two sides). A first side of the two-ply sheet serves as a transparent sheet such as a transparent polyester sheet, a second side of the two-ply sheet serves as a transparent or opaque sheet disposed facing the first side, and the first and second sides are bonded at one side of the two-ply sheet.

The inner sheet P is an example of the sheet medium that is inserted into the two-ply sheet. Examples of the sheet medium include thick paper, postcards, envelopes, plain paper, thin paper, coated paper, art paper, tracing paper, and overhead projector (OHP) transparencies.

In the following description, the phrase "separating the lamination sheet S" indicates "separating the two sheets of the lamination sheet S."

FIG. 1 is a diagram illustrating an overall configuration of a sheet processing device according to an embodiment of the present disclosure.

As illustrated in FIG. 1, the sheet processing device 100 includes a sheet tray 102, a pickup roller 105, and a conveyance roller pair 107. The sheet tray 102 serving as a first sheet stacker on which the lamination sheets S are placed. The pickup roller 105 feeds the lamination sheet S from the sheet tray 102. The sheet processing device 100 further includes a sheet tray 103 as a second sheet stacker on which the inner sheet P is stacked, and a pickup roller 106 that feeds the inner sheet P from the sheet tray 103.

A conveyance sensor (multifeed detection sensor) C1 is disposed downstream from the conveyance roller pair 107 in the sheet conveyance direction to detect the sheet conveyance position of the lamination sheet S.

A conveyance sensor C2 is disposed downstream from the pickup roller 106 in the sheet conveyance direction to detect the sheet conveyance position of the inner sheet P.

The sheet processing device 100 further includes an entrance roller pair 108, a roller pair including a winding roller 109 serving as a rotator and a driven roller 110 serving as a first member or a first roller described below, an exit roller pair 113, and a sheet ejection tray 104. The entrance roller pair 108, the roller pair including the winding roller 109 and the driven roller 110, the exit roller pair 113, and the sheet ejection tray 104 are disposed downstream from the conveyance roller pair 107 and the pickup roller 106 in the sheet conveyance direction.

A conveyance sensor C3 that detects the conveyance position of the lamination sheet S and the conveyance position of the inner sheet P is disposed downstream from the entrance roller pair 108 in the conveyance direction.

A conveyance sensor C4 that detects the conveyance position of the lamination sheet S is disposed downstream from the exit roller pair 113 in the conveyance direction.

The pickup roller 105, the conveyance roller pair 107, the entrance roller pair 108, the roller pair including the winding roller 109 and the driven roller 110 are included in a first feeder, and the pickup roller 106, the entrance roller pair 108, the roller pair including the winding roller 109 and the driven roller 110 are included in a second sheet feeder.

As illustrated in FIG. 1, the sheet processing device 100 according to the present embodiment separately stacks the lamination sheets S and the inner sheets P on separate trays to be conveyed to the roller pair including the winding roller 109 and the driven roller 110 and further to the exit roller pair 113. As described below, the inner sheet P is inserted into an opening of the two separated sheets of the lamination sheet S located between the exit roller pair 113 and the roller pair including the winding roller 109 and the driven roller 110. Then, the lamination sheet S with the inner sheet P sandwiched between the two sheets is ejected by the exit roller pair 113 to be stacked on the sheet ejection tray 104. A detailed description is given below of the specific configuration and operations of the sheet processing device 100.

Figure 2:
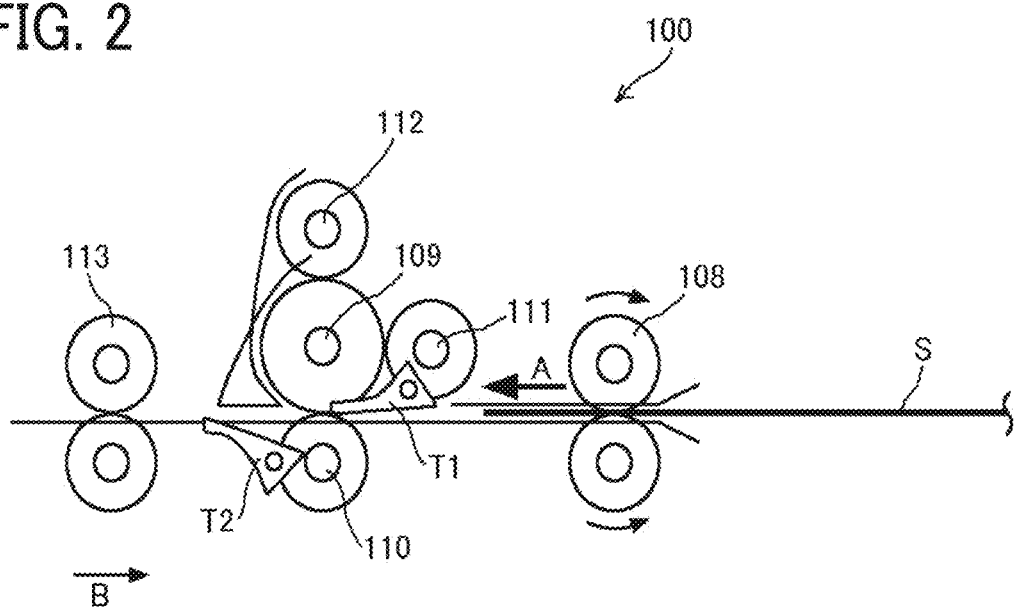
FIG. 2 is a schematic view of a main part of the sheet processing device of FIG. 1 in an operation.

FIG. 2 is a schematic view of the main part of the sheet processing device 100 of FIG. 1 in an operation subsequent to the operation illustrated in FIG. 1.

As illustrated in FIG. 2, the sheet processing device 100 includes the exit roller pair 113 serving as a first conveyor. The lamination sheet S is conveyed by the exit roller pair 113 to be further conveyed between the roller pair including the winding roller 109 and the driven roller 110.

Each of the entrance roller pair 108 and the exit roller pair 113 is, for example, two rollers paired with each other and driven by a driver such as a motor. The driver drives the entrance roller pair 108 in one direction and the exit roller pair 113 in forward and reverse directions, to sandwich the inner sheet P in the lamination sheet S and convey the lamination sheet S and the inner sheet P.

The entrance roller pair 108 conveys the lamination sheet S and the inner sheet P toward the exit roller pair 113.

The sheet conveyance direction indicated by arrow A in FIG. 2 is referred to as a forward conveyance direction or a sheet conveyance direction (direction A).

On the other hand, the exit roller pair 113 can switch the direction of rotation between the forward conveyance direction and a direction opposite to the forward conveyance direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite to the forward conveyance direction (to convey the lamination sheet S in reverse). The sheet conveyance direction of the lamination sheet S toward the winding roller 109 (in other words, the direction opposite to the forward conveyance direction) indicated by arrow B in FIG. 2 is hereinafter referred to as a reverse conveyance direction or a sheet conveyance direction B.

The sheet processing device 100 includes the winding roller 109 as a rotator and the driven roller 110 between the entrance roller pair 108 and the exit roller pair 113. The winding roller 109 serves as a rotator and the driven roller 110 serves as a first roller that is rotated with the rotation of the winding roller 109.

The winding roller 109 is driven by a drive unit such as a motor to rotate in the forward and reverse directions. The direction of rotation of the winding roller 109 can be switched between the forward conveyance direction (clockwise direction) and the reverse conveyance direction (counterclockwise direction). The driven roller 110 contacts the winding roller 109 to form a nip region, and the lamination sheet S and the inner sheet P are nipped and conveyed by the winding roller 109 and the driven roller 110.

The sheet processing device 100 further includes grip rollers 111 and 112 and branching members T1 and T2. The grip rollers 111 and 112 are roller members as second members or second rollers arranged at predetermined intervals in the rotation direction around the circumference (outer peripheral surface) of the winding roller 109 in a direction orthogonal to the rotation axis of the winding roller 109. The branching members T1 and T2 change the conveyance direction of the sheet S.

Each of the multiple grip rollers 111 and 112 are in contact with the winding roller 109 to be rotated with the winding roller 109. Each of the grip rollers 111 and 112 nips (grips) the sheet S with the winding roller 109 to wind the sheet S around the winding roller 109.

The branching member T1 is disposed between the entrance roller pair 108 and the winding roller 109, and the branching member T2 is disposed between the winding roller 109 and the exit roller pair 113. The positions (orientations) of the branching members T1 and T2 can be changed by a driving unit such as a motor to change the conveyance direction of the sheet S.

The grip rollers 111 and 112 and the branching members T1 and T2 are examples of a winding member as a winding unit that winds the sheet S around the winding roller 109.

A description is now given of a series of operations performed in the sheet processing device 100, with reference to FIGS. 1 to 14.

The series of operations performed in the sheet processing device 100 indicates the operations from separating the lamination sheet S to inserting the inner sheet P into the lamination sheet S.

In FIGS. 3 to 14, elements identical to the elements illustrated in FIGS. 1 and 2 are given identical reference numerals, and the detailed descriptions of these elements are omitted.

As illustrated in FIG. 1, the sheet processing device 100 according to the present embodiment stacks the lamination sheet S on the sheet tray 102 such that a part of the lamination sheet S in which two sheets are bonded is positioned on the downstream side in the sheet feed direction (sheet conveyance direction) in which the lamination sheet S is fed by the pickup roller 105. The pickup roller 105 picks the lamination sheet S on the sheet tray 102 and the conveyance roller pair 107 conveys the lamination sheet S toward the entrance roller pair 108.

As illustrated in FIG. 2, the entrance roller pair 108 conveys the lamination sheet S toward a nip region formed by the winding roller 109 and the driven roller 110. At this time, the branching members T1 and T2 are moved to the upper side and the lower side of the conveyance passage of the lamination sheet S, respectively. Specifically, the branching member T1 guides the lamination sheet S from the entrance roller pair 108 to the nip region between the winding roller 109 and the driven roller 110, and the branching member T2 guides the lamination sheet S from the nip region between the winding roller 109 and the driven roller 110 to the exit roller pair 113.

In the sheet processing device 100 according to the present embodiment, the entrance roller pair 108 conveys the lamination sheet S with the bonded side, which is one of four sides of the lamination sheet S, as the downstream side in the forward conveyance direction (the direction A) in FIG. 2. However, the configuration of the sheet processing device 100 is not limited to this configuration. For example, the sheet processing device 100 may stack the lamination sheet S on the sheet tray 102 such that a part of the lamination sheet S in which two sheets are bonded is positioned on the upstream side in the sheet feed direction (sheet conveyance direction) in which the lamination sheet S is fed by the pickup roller 105. Further, the lamination sheet S fed from the sheet tray 102 may be conveyed to the exit roller pair 113 from the sheet conveyance direction of the exit roller pair 113 to the winding roller 109 and the opposite direction to the sheet conveyance direction.

Figure 3:
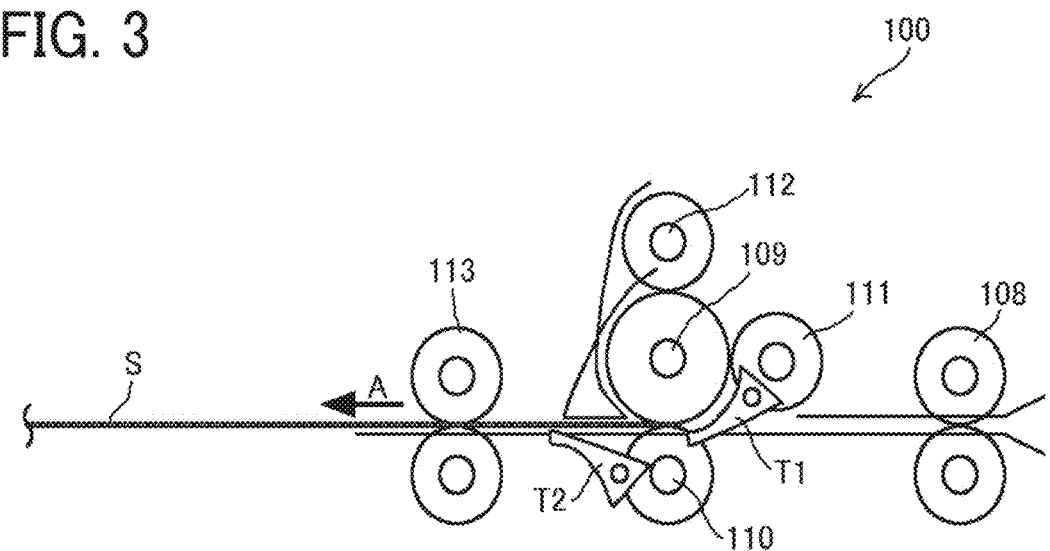
FIG. 3 is a schematic view of the main part of the sheet processing device of FIG. 1 in an operation subsequent to the operation illustrated in FIG. 2.

Subsequently, as illustrated in FIG. 3, the sheet processing device 100 temporarily stops conveyance of the lamination sheet S when the trailing end of the lamination sheet S in the forward conveyance direction has passed the winding roller 109, in other words, at a timing that the trailing end of the lamination sheet S is nipped by the nip region of the winding roller 109 and the driven roller 110. At the same time, the branching member T1 is moved (rotated) in the counter-clockwise direction about the rotation axis as a fulcrum, and a passage is generated for guiding the trailing end of the lamination sheet S around the winding roller 109. Those operations are performed in response to the detection position of the conveyance sensor C3 (see FIG. 1).

Figure 4:
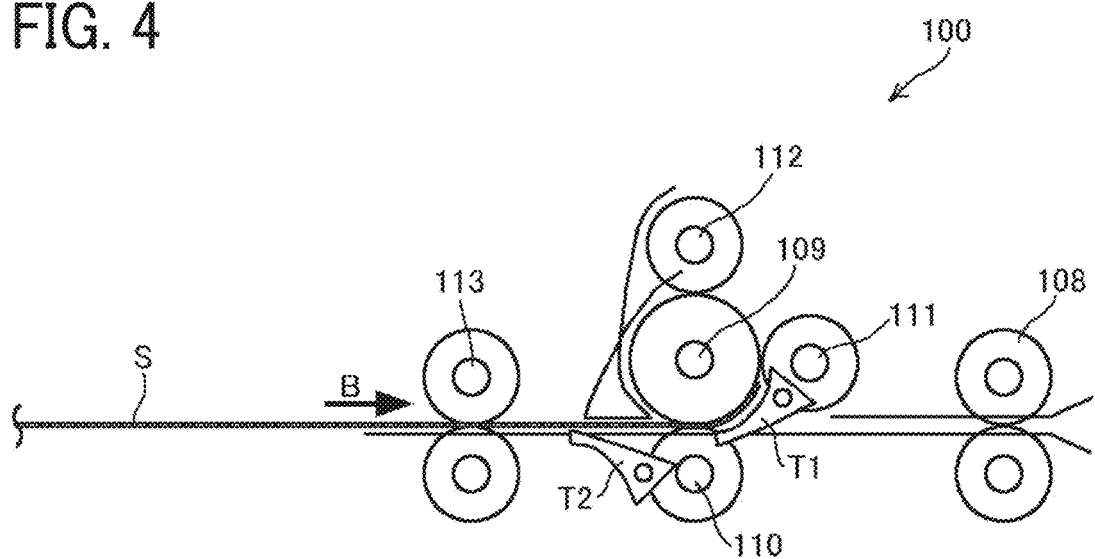
FIG. 4 is a schematic view of the main part of the sheet processing device of FIG. 1 in an operation subsequent to the operation illustrated in FIG. 3.

Then, as illustrated in FIG. 4, the exit roller pair 113 and the winding roller 109 reverse the rotational directions (in other words, rotate in a direction opposite to the rotational direction) to convey the lamination sheet S in a reverse direction (a direction indicated by arrow B). Then, the branching member T1 guides the lamination sheet S to be wound around the winding roller 109. In other words, the sheet processing device 100 causes the winding roller 109 to wind the lamination sheet S around the winding roller 109 from the non-bonding side where the two sheets of the lamination sheet S are not bonded. (skip) The rotational direction of the winding roller 109 is referred to as a first rotational direction.

Figure 5:
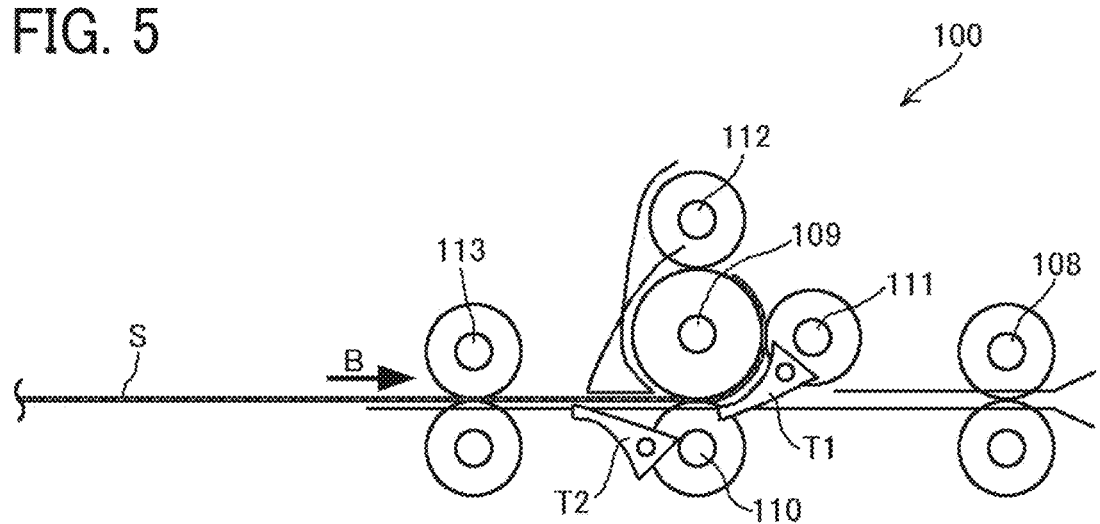
FIG. 5 is a schematic view of the main part of the sheet processing device of FIG. 1 in an operation subsequent to the operation illustrated in FIG. 4.
Figure 6:
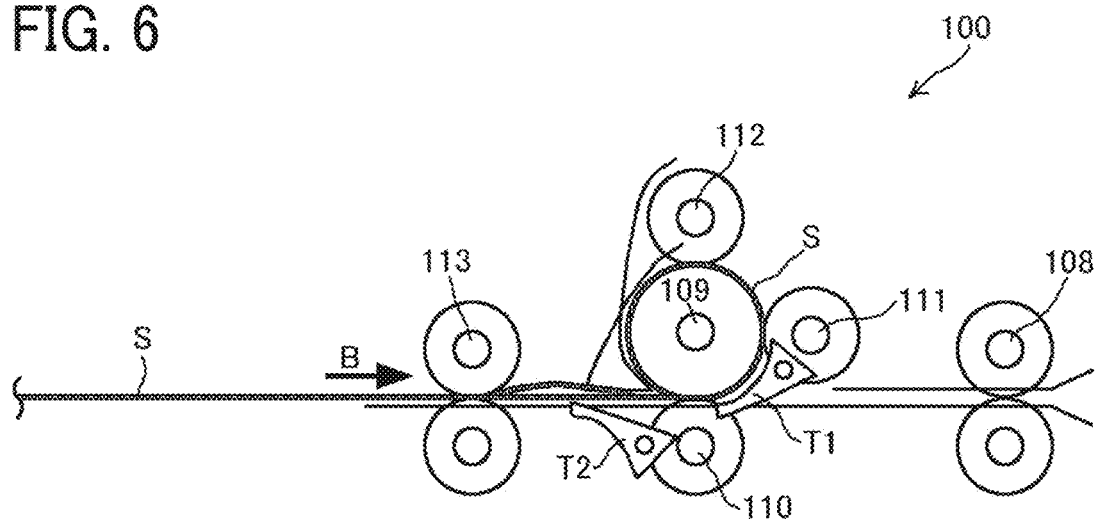
FIG. 6 is a schematic view of the main part of the sheet processing device of FIG. 1 in an operation subsequent to the operation illustrated in FIG. 5.
Figure 7:
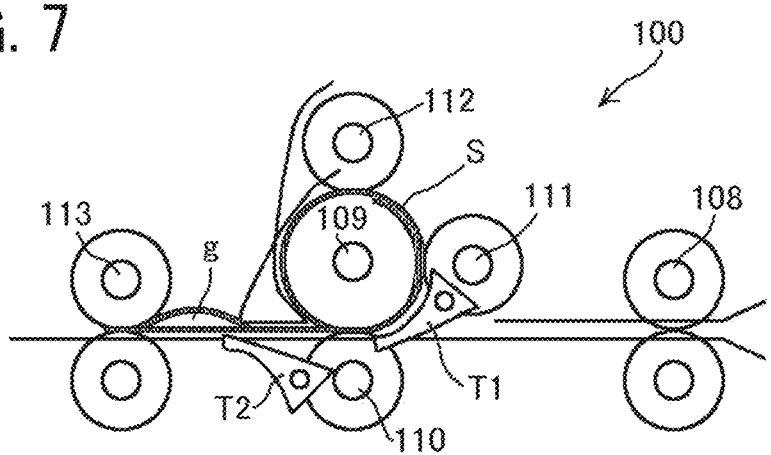
FIG. 7 is a schematic view of the main part of the sheet processing device of FIG. 1 in an operation subsequent to the operation illustrated in FIG. 6.

FIGS. 5 to 7 illustrate the process of winding the lamination sheet S around the winding roller 109. Each of the grip rollers 111 and 112 nips the lamination sheet S conveyed, between each of the grip rollers 111 and 112 and the winding roller 109 to wind the lamination sheet S around the circumference of the winding roller 109 (see FIG. 5).

As the lamination sheet S is wound around the winding roller 109 for more than one round, the leading end of the lamination sheet S in the sheet conveyance direction (i.e., the side where the two sheets of the sheet S are overlapped but not bonded) is fixed to the winding roller 109. When the lamination sheet S is further wound around the winding roller 109, a winding circumferential length difference is created between the two sheets of the lamination sheet S, to be more specific, the sheet on the inner circumference and the sheet on the outer circumference of the lamination sheet S (i.e., a difference between the two sheets in the amount of winding of the lamination sheet S around circumference of the winding roller 109). Due to the difference, the two sheets of the lamination sheet S start separation from each other between the exit roller pair 113 and the winding roller 109 (see FIG. 6).

As illustrated in FIG. 7, the slack of the sheet on the inner circumference side is collected between the exit roller pair 113 and the winding roller 109, which can create a gap (space) g between the sheet on the inner circumference side and the sheet on the outer circumference side.

As described above, the sheet processing device 100 according to the present embodiment causes the winding roller 109 to wind the lamination sheet S around the winding roller 109 to create the winding circumferential length difference between the sheet on the inner circumference of the lamination sheet S and the sheet on the outer circumference of the lamination sheet S due to the geometrical relation. By so doing, the two sheets of the lamination sheet S can be separated.

A description is then given of an additional configuration in which the sheet processing device 100 according to the present embodiment separates the whole part between one side (one end) that is a portion where the two sheets of the lamination sheet S are overlapped and bonded and another side (another end) as an opening end opposite to the one side (one end) so that the inner sheet P is inserted into the lamination sheet S, and the operations of the additional configuration.

Figure 8:
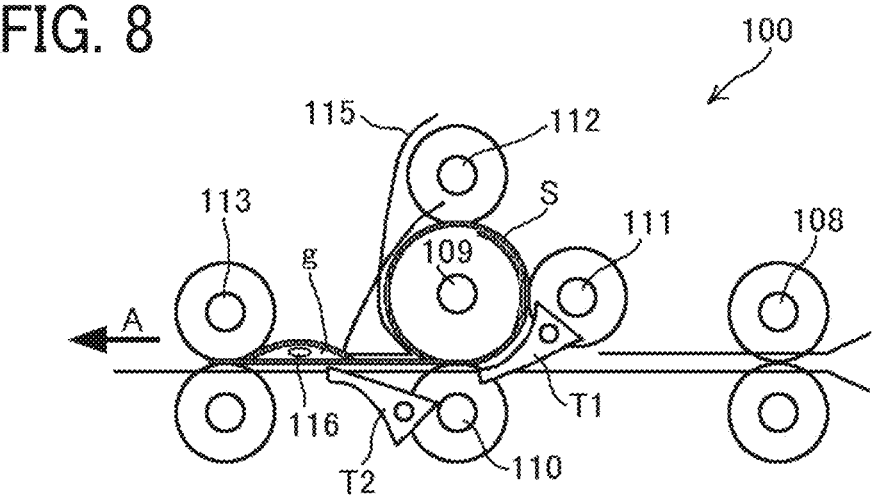
FIG. 8 is a schematic view of the main part of the sheet processing device of FIG. 1 in an operation subsequent to the operation illustrated in FIG. 7.

As illustrated in FIG. 8, the sheet processing device 100 according to the present embodiment further includes a passage member 115 and separation members 116. The passage member 115 guides one of the two separated sheets of the lamination sheet S. The separation members 116 are disposed on both lateral sides of the lamination sheet S to be movable in the width direction of the lamination sheet S. The sheet processing device 100 can cause the separation members 116 to be inserted into the space g created in the lamination sheet S from both lateral sides.

Figure 9:
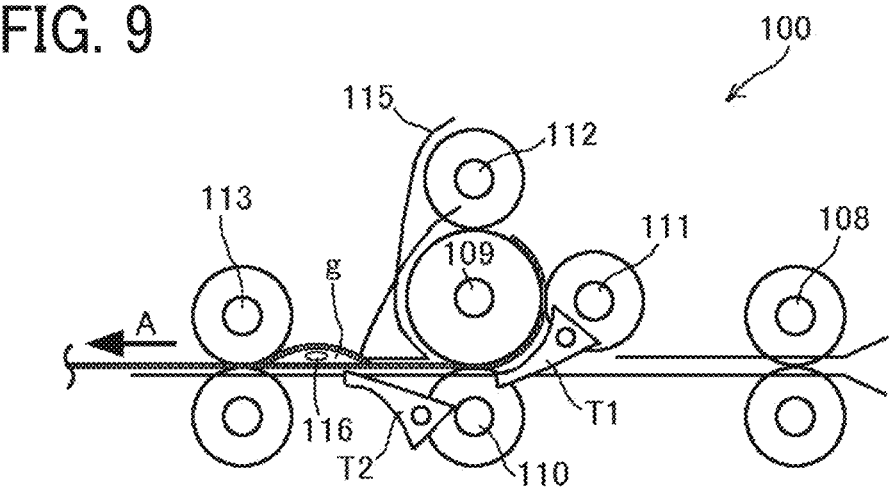
FIG. 9 is a schematic view of the main part of the sheet processing device of FIG. 1 in an operation subsequent to the operation illustrated in FIG. 8.
Figure 10:
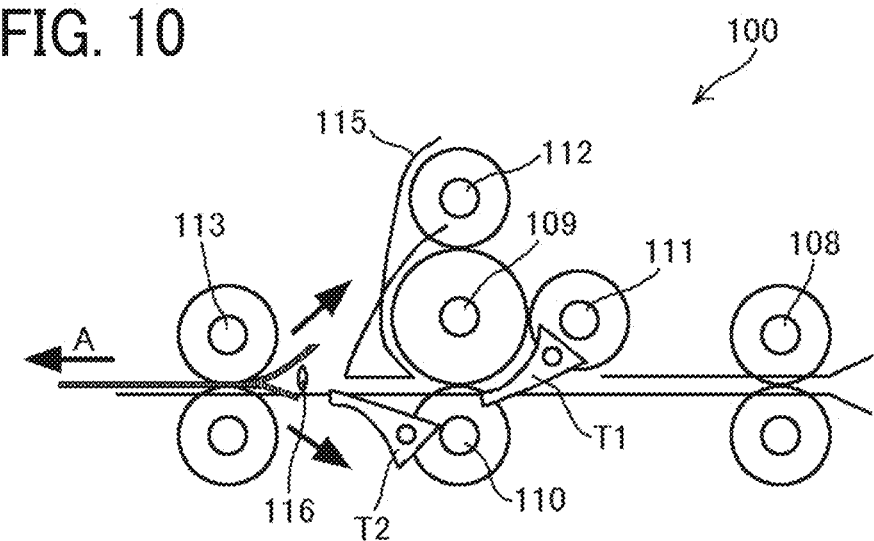
FIG. 10 is a schematic view of the main part of the sheet processing device of FIG. 1 in an operation subsequent to the operation illustrated in FIG. 9.

As illustrated in FIG. 9, the sheet processing device 100 causes the exit roller pair 113 in a direction in which the lamination sheet S is conveyed in the forward conveyance direction (the direction A) with the separation members 116 inserted in the lamination sheet S. As illustrated in FIG. 10, the trailing end (the opening end) of the lamination sheet S can be separated in response to the reach of the separation members 116 to the trailing end of the lamination sheet S in the sheet conveyance direction.

A description is now given of the separation members 116.

Figure 15:
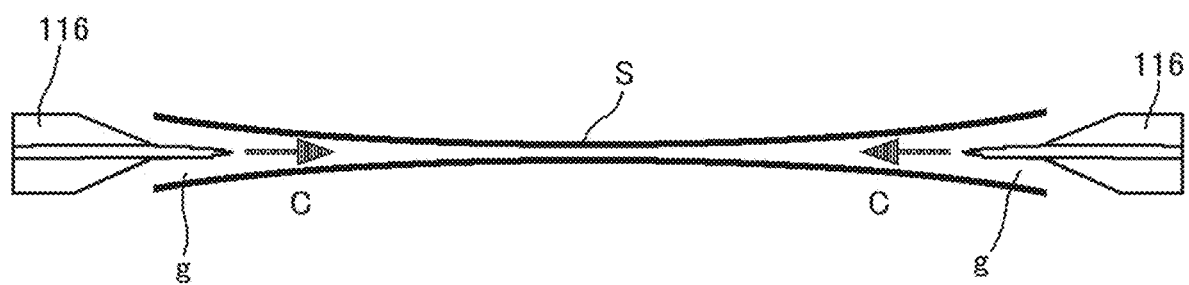
FIG. 15 is a schematic view of separation members included in the sheet processing device.

FIG. 15 is a schematic view of the separation member included in the sheet processing device.

Figure 16:
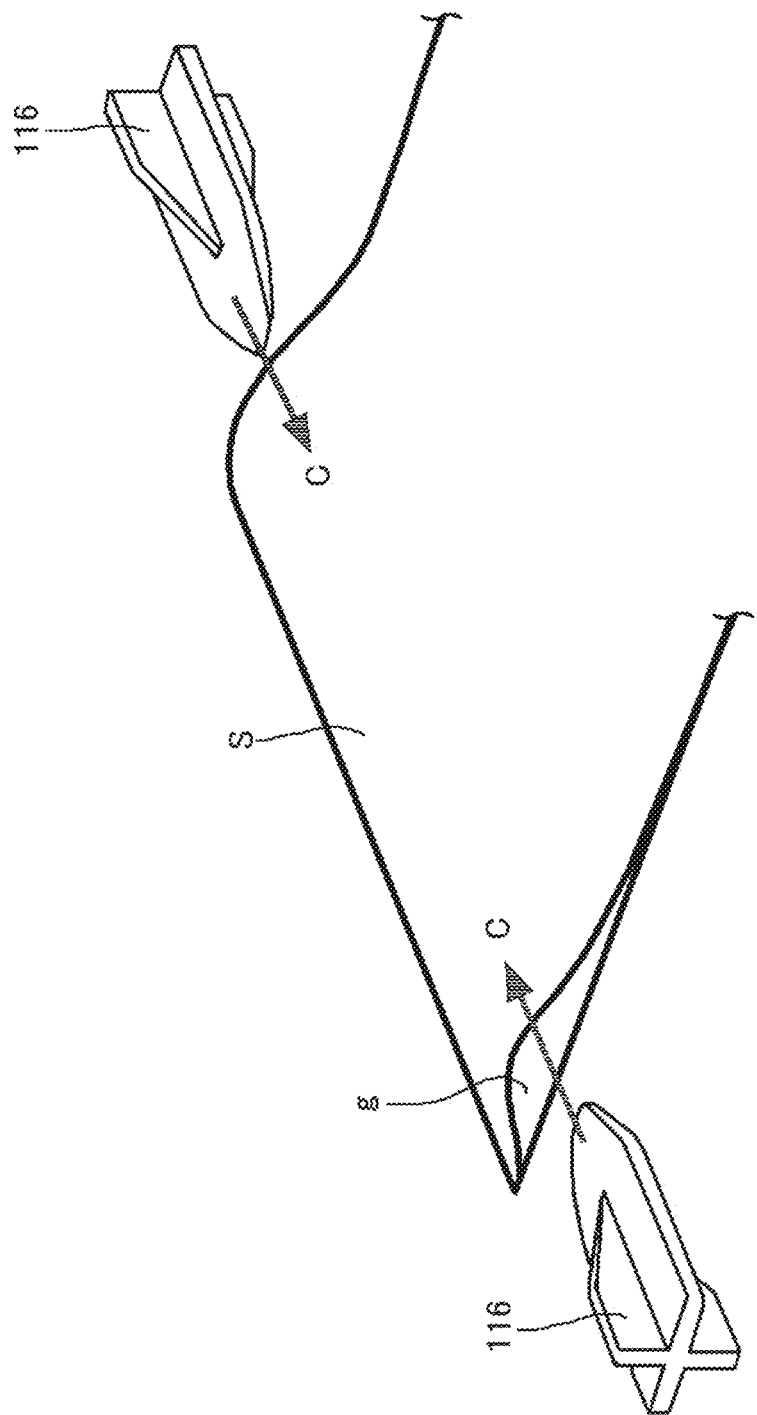
FIG. 16 is a perspective view of the separation members in an operation of separating a two-ply sheet from opposite sides.
Figure 17:
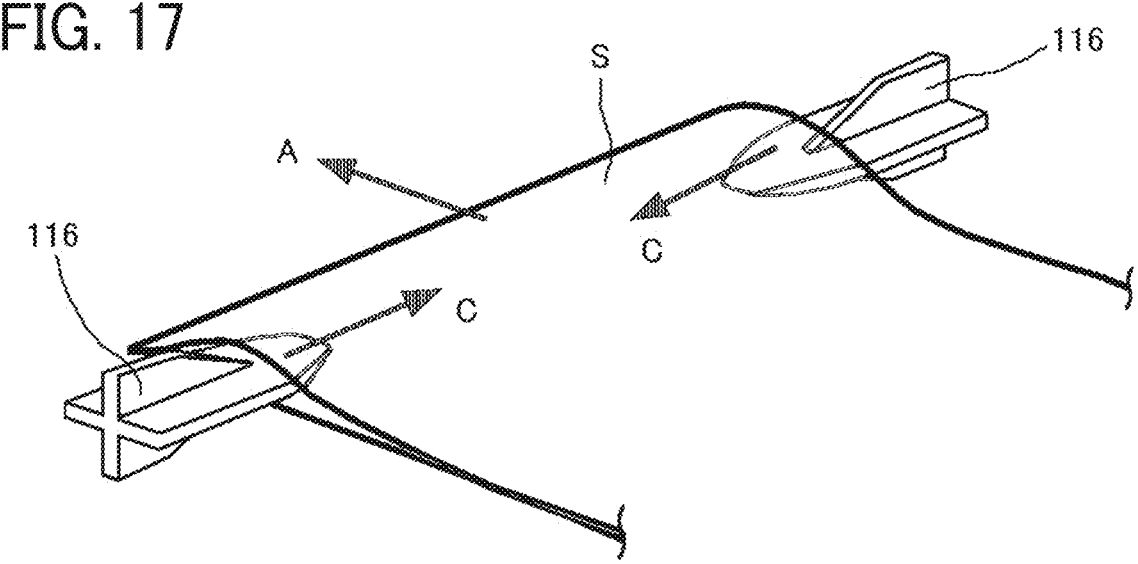
FIG. 17 is a perspective view of the separation members in an operation of separating the two-ply sheet from opposite sides, subsequent to the operation illustrated in FIG. 16.
Figure 18:
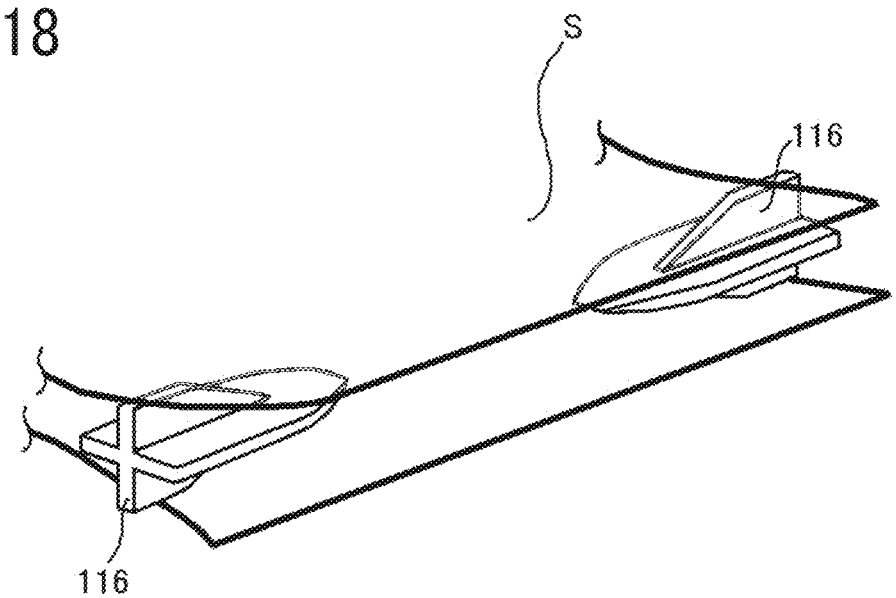
FIG. 18 is a perspective view of the separation members in an operation of separating the two-ply sheet from opposite sides, subsequent to the operation illustrated in FIG. 17.

FIGS. 16 to 18 are perspective views of the states in which the separation members separate the lamination sheet S together.

As illustrated in FIGS. 15 to 18, the separation members 116 has the shape to gradually increase in the width direction of the lamination sheet S, from the leading end toward the trailing end in the insertion direction (indicated by arrow C). Accordingly, the separation members 116 are smoothly inserted into the space g created in the lamination sheet S.

After the separation members 116 are inserted to the space g (see FIGS. 16 and 17), the lamination sheet S is conveyed in the forward conveyance direction (the direction A). By so doing, the lamination sheet S can be thoroughly separated to the trailing end (see FIG. 18).

Although the configuration according to the present embodiment includes two separation members 116, a single separation member 116 may be employed to be inserted into only one end of the lamination sheet S. Further, the shape of the separation member 116 is not limited to the shape illustrated in FIGS. 15 to 18. For example, the separation member 116 may have an elongated elliptical shape or may have a shape that can be rotated by 90 degrees.

Returning back to FIG. 10, the description is continued below.

After the exit roller pair 113 has conveyed the lamination sheet S in the forward conveyance direction (the direction A) and separated the lamination sheet S, the sheet processing device 100 moves (rotates) the branching member T2 in the clockwise direction about the rotation axis to close the conveyance passage behind the lamination sheet S at this point.

Figure 11:
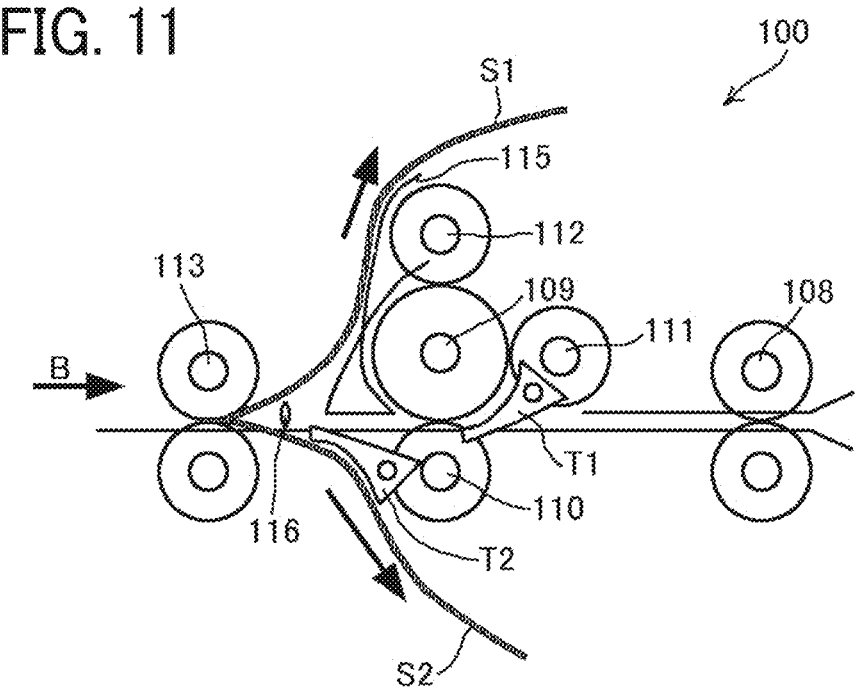
FIG. 11 is a schematic view of the main part of the sheet processing device of FIG. 1 in an operation subsequent to the operation illustrated in FIG. 10.

Then, as illustrated in FIG. 11, the exit roller pair 113 reverses the direction to convey the lamination sheet S in the opposite conveyance direction (the direction B). As a result, the two sheets, which are referred to as an upper sheet S1 and a lower sheet S2, of the lamination sheet S are separated so that the upper sheet S1 and the lower sheet S2 are guided to separate directions, respectively, and thus the two sheets (the upper sheet S1 and the lower sheet S2) are fully separated. In other words, the upper sheet S1 is conveyed along the passage member 115 and the lower sheet S2 is conveyed along the branching member T2 that also serves as a passage member. As illustrated in FIG. 11, the lamination sheet S is opened largely with one end of the lamination sheet S bonded as the bonded side of the lamination sheet S.

Figure 12:
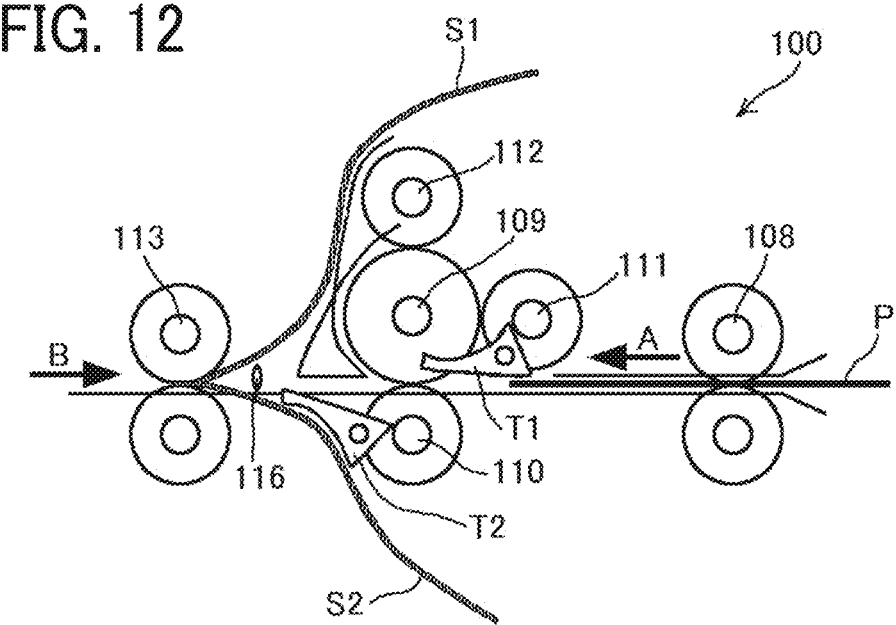
FIG. 12 is a schematic view of the main part of the sheet processing device of FIG. 1 in an operation subsequent to the operation illustrated in FIG. 11.

Subsequently, as illustrated in FIG. 12, while the exit roller pair 113 conveys the lamination sheet S in the opposite conveyance direction (the direction B) to the specified position, the entrance roller pair 108 serving as a second conveyor conveys an inner sheet P in the forward conveyance direction (the direction A) from the sheet tray 103 (see FIG. 1) toward the exit roller pair 113. At this time, the branching member T1 is moved to the upper side of the conveyance passage, and the inner sheet P passes under the branching member T1.

Figure 13:
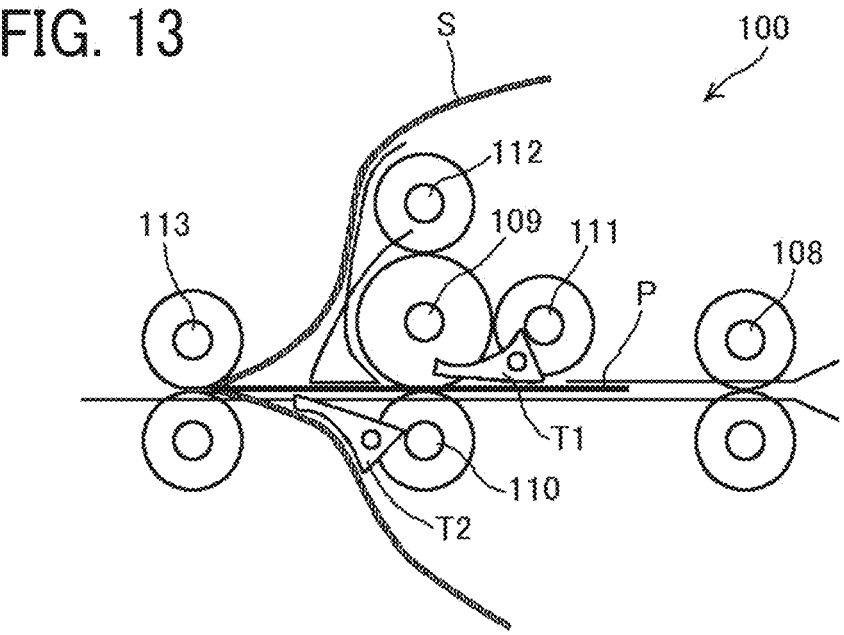
FIG. 13 is a schematic view of the main part of the sheet processing device of FIG. 1 in an operation subsequent to the operation illustrated in FIG. 12.

Subsequently, as illustrated in FIG. 13, the controller 210 of the sheet processing device 100 causes the inner sheet P to be inserted into the lamination sheet S from the open portion of the lamination sheet S. These operations are performed in response to the detection of the position of the lamination sheet S with the conveyance sensor C4.

Figure 14:
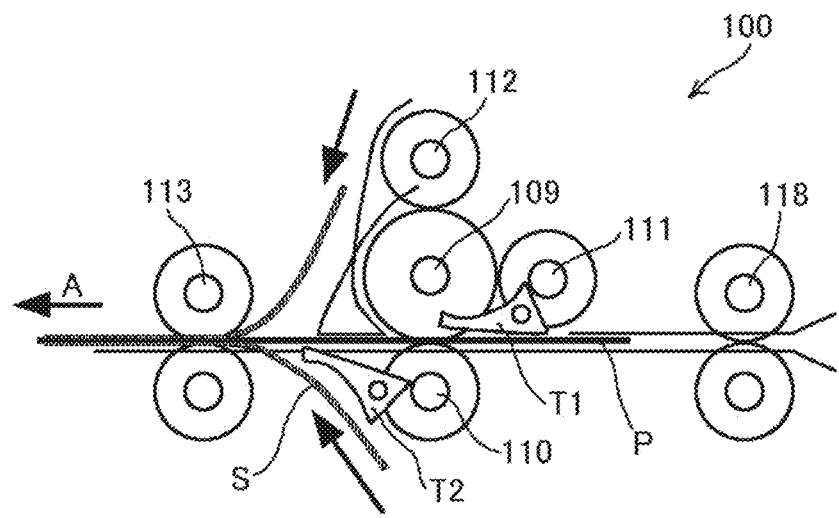
FIG. 14 is a schematic view of the main part of the sheet processing device of FIG. 1 in an operation subsequent to the operation illustrated in FIG. 13.

Then, as illustrated in FIG. 14, the exit roller pair 113 conveys the lamination sheet S in which the inner sheet P is inserted, in the forward conveyance direction (the direction A). By so doing, the two sheets of the lamination sheet S are overlapped one on another again so as to close the open portion of the lamination sheet S. Then, the sheet processing device 100 causes the exit roller pair 113 or a roller disposed downstream from the exit roller pair 113 to eject and stack the lamination sheet S with the inner sheet PM inserted (nipped), on the sheet ejection tray 104 (see FIG. 1).

As described above, the sheet processing device 100 causes the driver to largely open the lamination sheet S so as to insert and nip the inner sheet P into the lamination sheet S. Accordingly, since the configuration of the sheet processing device 100 is simpler than the configuration of a known sheet laminator employing a vacuum device, the entire sheet processing device 100 has a simpler and smaller configuration.

As illustrated in FIG. 1, the sheet processing device 100 according to the present embodiment stacks the lamination sheet S and the inner sheet P on separate trays, and can feed and convey the lamination sheet S and the inner sheet P separately. Accordingly, there is no need to stack the lamination sheets S and the inner sheets P in a predetermined order, and this configuration can enhance the convenience. In the present embodiment, the lamination sheets S are stacked on the sheet tray 102 and the inner sheets P are stacked on the sheet tray 103. However, the tray on which the lamination sheets S are stacked and the tray on which the inner sheets P are stacked are not limited to the above-described trays. For example, the inner sheets P may be stacked on the sheet tray 102 and the lamination sheets S may be loaded on the sheet tray 103.

Figure 19:
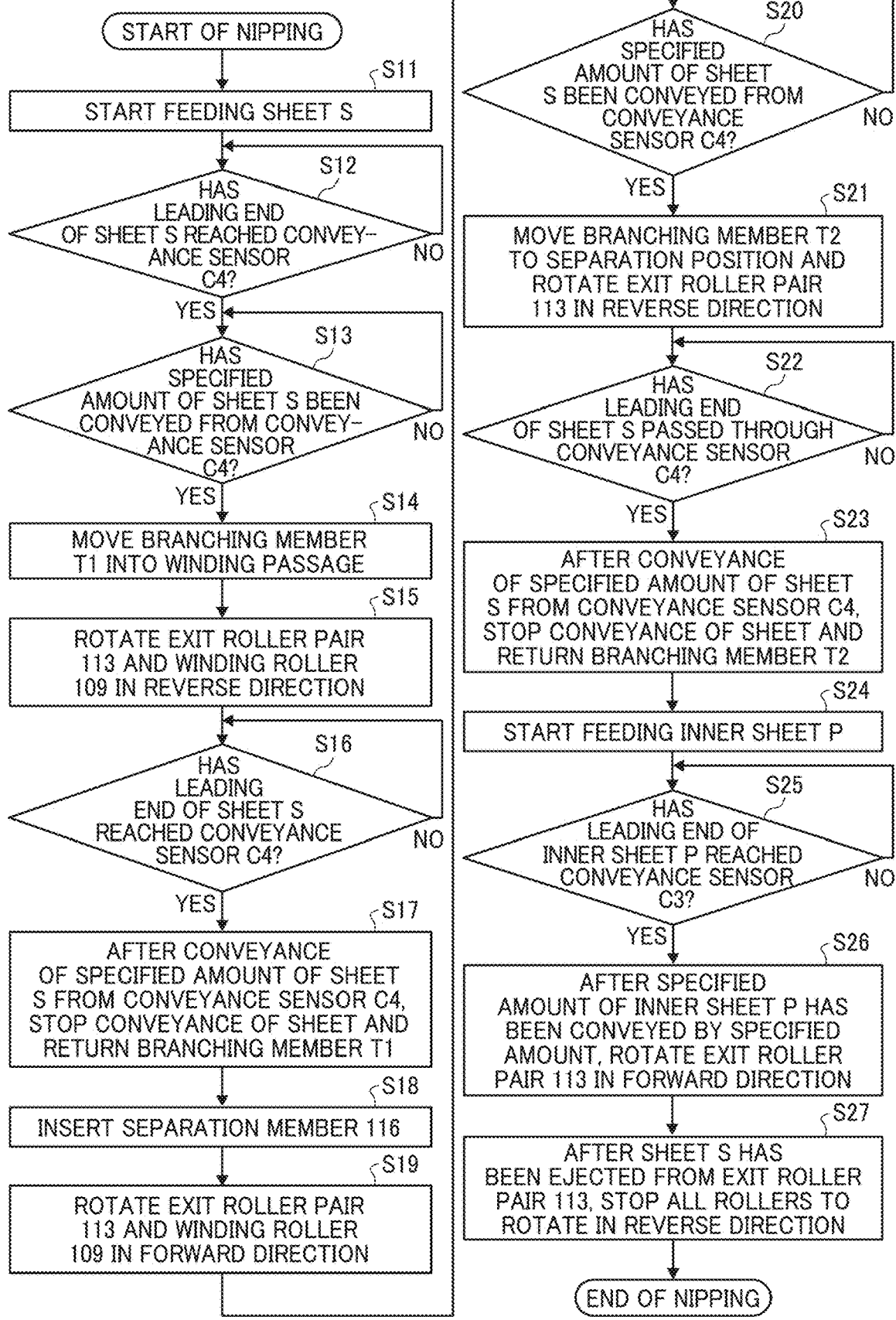
FIG. 19 is a flowchart of a series of operations from feeding a two-ply sheet to a completion of insertion of an inner sheet into the two-ply sheet.

FIG. 19 is a flowchart of a series of operations from feeding the lamination sheet S to a completion of insertion of an inner sheet into the lamination sheet S.

A description is given of the series of operations, with reference to the reference numerals indicated in the flowchart of FIG. 19.

First, in step S11 of FIG. 19, the controller 210 of the sheet processing device 100 causes the driver to start feeding a lamination sheet S (see FIG. 1). Then, in step S12, the controller 210 of the sheet processing device 100 determines whether the leading end of the lamination sheet S has reached the conveyance sensor C4 (see FIG. 2). When the leading end of the lamination sheet S has not reached the conveyance sensor C4 (NO in step S12), step S12 is repeated until the leading end of the lamination sheet S reaches the conveyance sensor C4. When the leading end of the lamination sheet S has reached the sheet conveyance sensor C4 (YES in step S12), the controller 210 determines whether the lamination sheet S has been conveyed from the conveyance sensor C4 by a specified amount, in step S13. When the lamination sheet S has not been conveyed from the conveyance sensor C4 by the specified amount (NO in step S13), step S13 is repeated until the lamination sheet S is conveyed from the conveyance sensor C4 by the specified amount. When the lamination sheet S has been conveyed from the conveyance sensor C4 by the specified amount (YES in step S13), the controller 210 of the sheet processing device 100 causes the branching member T1 to move to the position where the lamination sheet S is guided to the winding passage in step S14 (see FIG. 3).

In step S15, the sheet processing device 100 causes the winding roller 109 to rotate in the reverse direction to wind the lamination sheet S around the winding roller 109 (see FIGS. 4 to 7). In step S16, the controller 210 of the sheet processing device 100 determines whether the leading end of the lamination sheet S has reached the conveyance sensor C4. When the leading end of the lamination sheet S has not reached the conveyance sensor C4 (NO in step S16), step S16 is repeated until the leading end of the lamination sheet S reaches the conveyance sensor C4. By contrast, when the leading end of the lamination sheet S has reached the conveyance sensor C4 (YES in step S16), the sheet processing device 100 causes the lamination sheet S to be conveyed from the conveyance sensor C4 by the specified amount, stops the conveyance of the lamination sheet S, and causes the branching member T1 to be moved to the original position, in step S17. The controller 210 of the sheet processing device 100 causes the separation members 116 to be inserted into the space g that is generated by separation of the lamination sheet S (see FIG. 8), in step S18.

Then, the controller 210 of the sheet processing device 100 causes the exit roller pair 113 and the winding roller 109 to rotate in the forward conveyance direction to convey the lamination sheet S in the forward conveyance direction, in step S19. As a result, the two sheets of the lamination sheet S are separated from each other up to the trailing end in the sheet conveyance direction (see FIGS. 9 and 10).

Then, the sheet processing device 100 determines whether the lamination sheet S is conveyed from the conveyance sensor C4 by the specified amount, in step S20. When the lamination sheet S is not conveyed from the conveyance sensor C4 by the specified amount (NO in step S20), step S20 is repeated until the lamination sheet S is conveyed from the conveyance sensor C4 by the specified amount. By contrast, when the lamination sheet S is conveyed from the conveyance sensor C4 by the specified amount (YES in step S20), the sheet processing device 100 causes the branching member T2 to move to the separation position and the exit roller pair 113 to rotate in the reverse direction, in step S21. Then, the sheet processing device 100 determines whether the leading end of the lamination sheet S has passed the conveyance sensor C4 (see FIG. 11), in step S22. When the leading end of the lamination sheet S has not passed the conveyance sensor C4 (NO in step S22), step S22 is repeated until the leading end of the lamination sheet S passes the conveyance sensor C4.

By contrast, when the leading end of the lamination sheet S has passed the conveyance sensor C4 (YES in step S22), the sheet processing device 100 conveys the lamination sheet S from the conveyance sensor C4 by the specified amount, stops the conveyance of the lamination sheet S, and causes the branching member T2 to move to the original position of the branching member T2, in step S23. At this time, one end of the lamination sheet S is bonded as the bonded side of the lamination sheet S and the other end of the lamination sheet S is opened largely.

Then, the controller 210 of the sheet processing device 100 causes the driver to start feeding an inner sheet P (see FIG. 12), in step 24. Then, the controller 210 of the sheet processing device 100 determines whether the leading end of the inner sheet P has passed the conveyance sensor C3, in step S25. When the leading end of the inner sheet P has not passed the conveyance sensor C3 (NO in step S25), step S25 is repeated until the leading end of the inner sheet P passes the conveyance sensor C3. By contrast, when the leading end of the inner sheet P has passed the conveyance sensor C3 (YES in step S25), the sheet processing device 100 causes the inner sheet P by a specified amount so that the inner sheet P is inserted into the lamination sheet S (see FIG. 13), in step S26. Then, the sheet processing device 100 causes the exit roller pair 113 to rotate in the forward conveyance direction to complete the insertion of the inner sheet P to the lamination sheet S (see FIG. 14), in step S26. Then, the sheet processing device 100 causes the lamination sheet S in which the inner sheet P inserted to be ejected via the exit roller pair 113, and stops the rotations of the entire rollers, in step S27. Then, the controller 210 of the sheet processing device 100 ends the nipping operation.

A description is now given of an additional configuration of the present embodiment.

Figure 20:
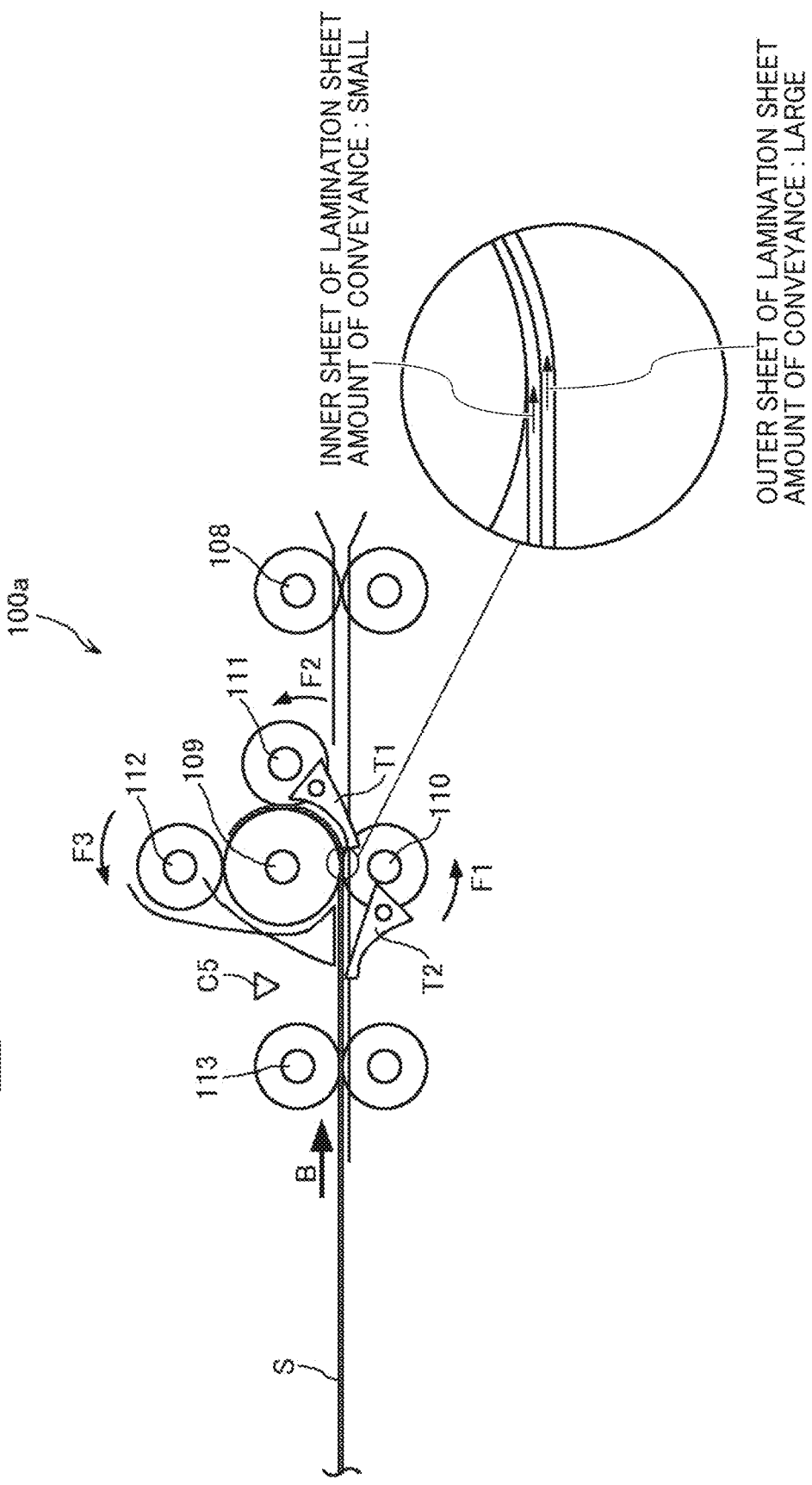
FIG. 20 is a diagram illustrating a main part of the sheet processing device with an additional configuration, with a partially enlarged view of the sheet on a winding roller.

FIG. 20 is a diagram illustrating the main part of the sheet processing device with an additional configuration, with a partially enlarged view of the lamination sheet S on the winding roller 109.

The sheet processing device 100 including the additional configuration is referred to as a sheet processing device 100a. The sheet processing device 100a satisfies the relation of F1<F2<F3, where "F1" represents a nipping force applied by the driven roller 110, "F2" represents a nipping force applied by the grip roller 111, and "F3" represents a nipping force applied by the grip roller 112. In other words, the nipping forces of the grip rollers 111 and 112 are greater than the nipping force of the driven roller 110, so that the deviation between the inner sheet and the outer sheet of the lamination sheet S is regulated at the grip portion where the grip rollers 111 and 112 contact the driven roller 110.

For this reason, a slip by the circumferential length difference is generated at the nip region between the driven roller 110 and the winding roller 109, and the conveyance amount of the inner sheet of the lamination sheet S is smaller than the conveyance amount of the outer sheet of the lamination sheet S. As a result, even if the lamination sheet S is wound around the winding roller 109 more than one round, the slack of the lamination sheet S on the outer circumference side is collected between the exit roller pair 113 and the winding roller 109, which can create the gap (space) g between the sheet on the inner circumference side and the sheet on the outer circumference side.

The sheet processing device 100a having the additional configuration includes an abnormality detection sensor C5 between the exit roller pair 113 and the winding roller 109. Specifically, the abnormality detection sensor C5 is an example of an abnormality detector that detects the abnormal condition that a gap greater than a given interval is not formed between the two sheets of the lamination sheet S when the lamination sheet S is wound around the winding roller 109.

The detection result acquired by the abnormality detection sensor C5 is stored in a first storage 135 included in a controller 210 of the sheet processing device 100a. In other words, the first storage 135 stores a detection of the abnormal condition detected by the abnormality detection sensor C5.

Accordingly, when the abnormality detection sensor C5 detects the abnormal condition, the sheet processing device 100a including the additional configuration can convey the lamination sheet S to the sheet ejection tray 104 without separating the lamination sheet S. The sheet ejection tray 104 also serves as a purge tray, but a dedicated purge tray may be disposed separately.

In the sheet processing device 100a including the additional configuration, the conveyance sensor (multifeed detection sensor) C1 illustrated in FIG. 1 is also an example of a multifeed detection sensor for detecting multifeed of the lamination sheets S. The multifeed detection sensor is an example of a multifeed detector that detects misfeed of the lamination sheets S conveyed from the sheet tray 102.

The detection result acquired by the multifeed detection sensor C1 is stored in a second storage 136 included in the controller 210 of the sheet processing device 100a. In other words, the second storage 136 stores a detection of multifeed detected by the multifeed detection sensor C1.

Figure 21:
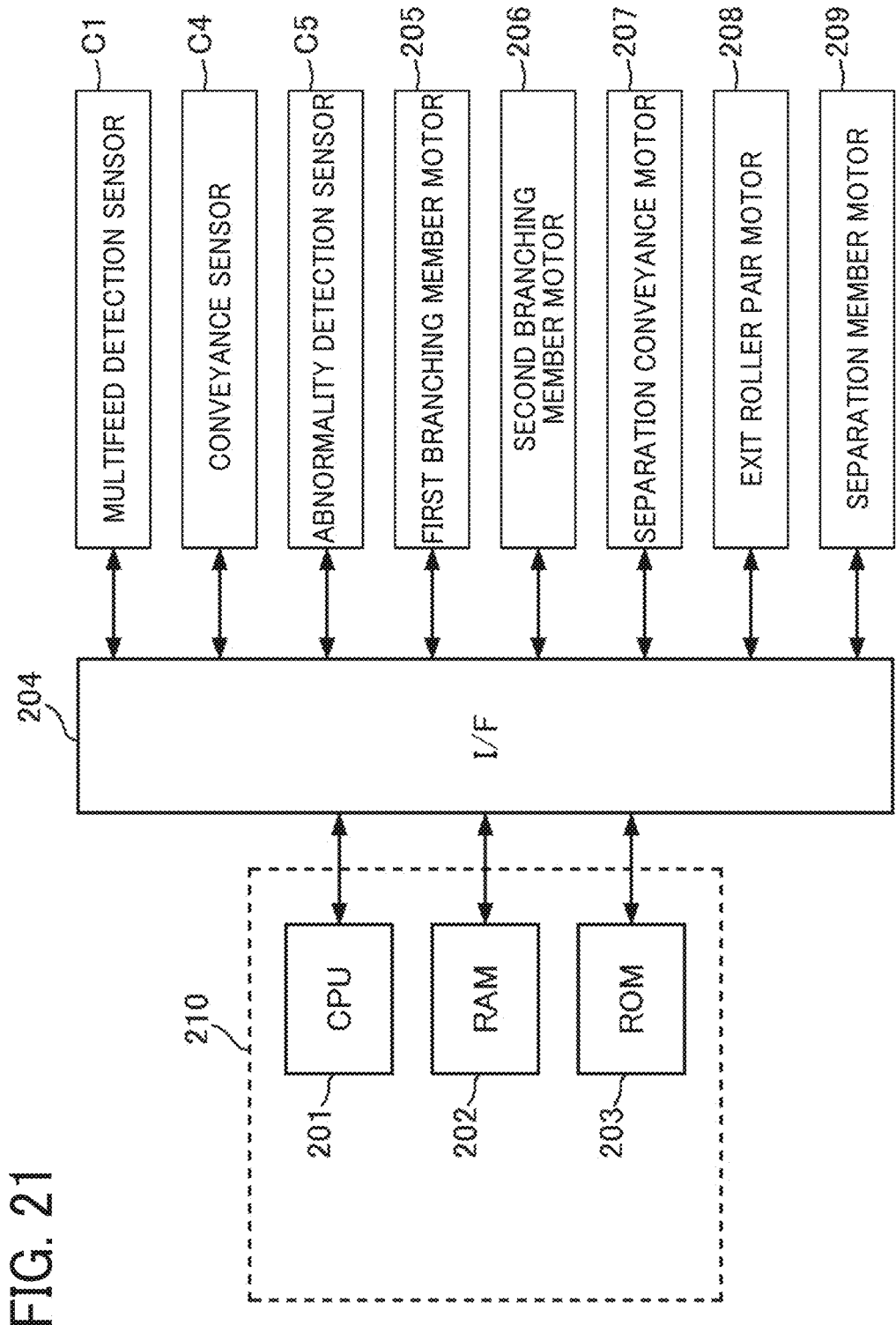
FIG. 21 is a block diagram illustrating a hardware configuration of the sheet processing device according to an embodiment of the present disclosure.

FIG. 21 is a block diagram illustrating a hardware configuration of the sheet processing device 100a according to an embodiment of the present disclosure.

The controller 210 included in the sheet processing device 100a is connected to a central processing unit (CPU) 201, a random-access memory (RAM) 202, a read-only memory (ROM) 203, which are connected to each other via an interface (I/F) 204.

The CPU 201 is an arithmetic unit and controls the overall operations of the sheet processing device.

The RAM 202 is a volatile storage medium that allows data to be read and written at high speed. The CPU 201 uses the RAM 202 as a work area for data processing.

The ROM 203 is a read-only, non-volatile storage medium that stores programs or a combination of these firmware.

The sheet processing device processes, by an arithmetic function of the CPU 201, e.g., a control program stored in the ROM 203 and an information processing program (or application program) loaded into the RAM 202. Such processing configures a software controller including various functional modules of the sheet processing device.

The software controller thus configured cooperates with hardware resources of the sheet processing device 100a to construct functional blocks to implement functions of the sheet processing device 100a. In other words, the CPU 201, the RAM 202, and the ROM 203 constitute the controller 210 to control the operations of the sheet processing device 100a.

The I/F 204 is an interface that connects the first branching member motor 205, the second branching member motor 206, the separation conveyance motor 207, the exit roller pair motor 208, the separation member motor 209, the multifeed detection sensor C1, the conveyance sensor C4, and the abnormality detection sensor C5, to the controller 210.

The controller 210 causes respective drive devices to drive the first branching member motor 205, the second branching member motor 206, the separation conveyance motor 207, the exit roller pair motor 208, and the separation member motor 209, via the I/F 204.

The first branching member motor 205 is a drive device to drive the branching member T1. The second branching member motor 206 is a drive device to drive the branching member T2. The separation conveyance motor 207 is a drive device to drive the winding roller 109. The separation conveyance motor 207 is a drive device to drive the winding roller 109. The exit roller pair motor is a drive device to drive the exit roller pair 113. The separation member motor 209 is a drive device to drive the separation members 116. Each of the driven roller 110 and the grip rollers 111 and 112 are in contact with the winding roller 109 to be rotated with the winding roller 109.

A detailed description is now given of the sheet processing device 100a according to the present disclosure.

In FIG. 20, the two sheets of the lamination sheet S attract each other by static electricity. For this reason, the slip amount at the time of winding is reduced, and the gap g having a size sufficient for inserting the separation members 116 may not be formed. In this case, the sheet processing device 100a determines that the size of the gap g is insufficient, and does not insert the separation members 116 (sheet processing (sheet separation) not available).

Further, even when the sheet separating operation is performed again on a different lamination sheet S, as the nipping forces F1, F2, and F3 between corresponding rollers are constant, the slip amount between the two sheets of the different lamination sheets S remains small, a lamination sheet S cannot be separated again.

A detailed description is now given of the sheet separating operation.

In the following description, the nipping force between the winding roller 109 and the driven roller 110 is represented as "F1", the nipping force between the winding roller 109 and the grip roller 111 is represented as "F2", and the nipping force between the winding roller 109 and the grip roller 112 is represented as "F3". When the sheet processing (sheet-separating operation) fails, the difference between F2 and F1 is expressed as ΔF21 (=F2−F1)>0, and the difference between and F3 and F2 is expressed as ΔF32 (=F3−F2)>0.

Further, in the subsequent sheet processing, the nipping force between the winding roller 109 and the driven roller 110 is represented as "F1'", the nipping force between the winding roller 109 and the grip roller 111 is represented as "F2'", and the nipping force between the winding roller 109 and the grip roller 112 is represented as "F3'", the difference between F2' and F1' is expressed as ΔF21' (=F2'−F1')>0, and the difference between and F3' and F2' is expressed as ΔF32' (=F3'−F2')>0.

In this case, since the respective nipping forces are constant (F1'=F1, F2'=F2, and F3'=F3), the differences in the nipping forces between the adjacent rollers are also constant (ΔF21'=ΔF21>0 and ΔF32'=ΔF32>0).

As a result, when a sheet separating operation could not be performed, the slip amount between the sheets of a lamination sheet S would not change in the subsequent sheet processing, and it was likely that the subsequent sheet processing (sheet separating operation) could not be performed.

In order to address the inconvenience, when a lamination sheet S cannot be separated, the sheet processing device 100a according to the present disclosure increases the nipping forces of the grip rollers with the winding roller 109 (F1', F2') to prevent recurrence of the unavailability of sheet separation.

First Embodiment

Figure 22A:
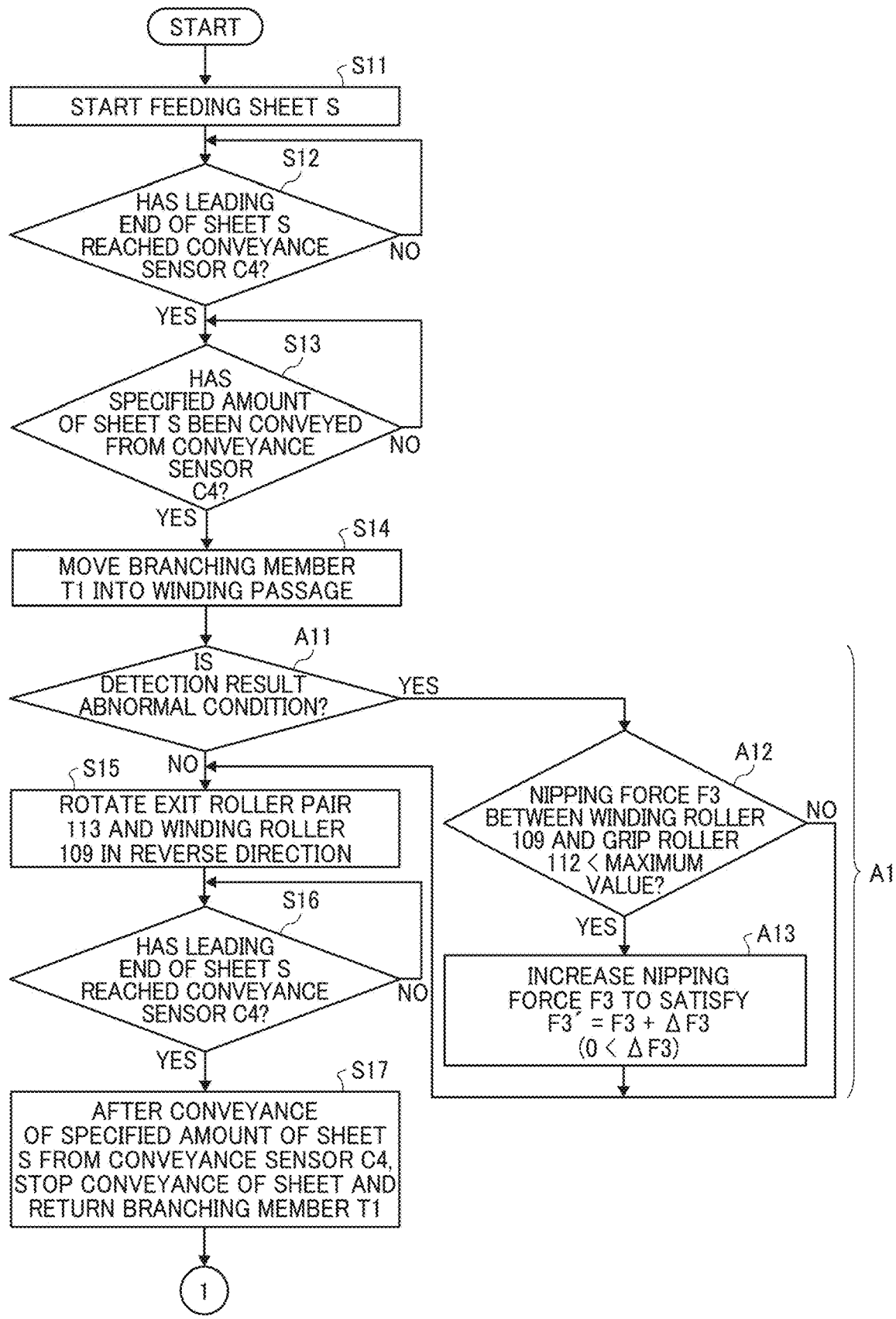
FIG. 22A is the first half of a flowchart of a series of operations from feeding a two-ply sheet to separation of the two-ply sheet according to a first embodiment of the present disclosure.
Figure 22B:
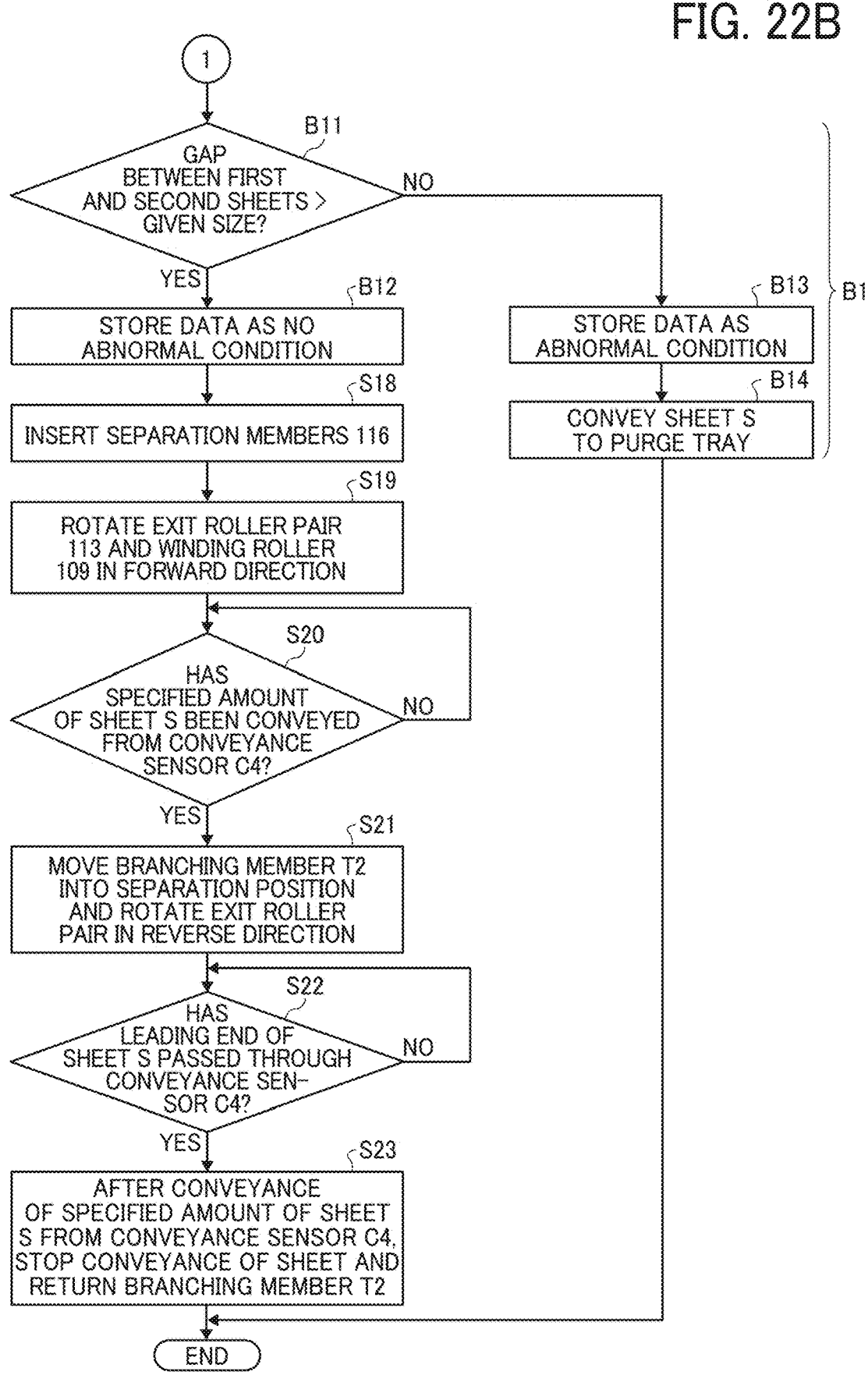
FIG. 22B is the second half of the flowchart of the series of operations subsequent to the operations of FIG. 22A.

FIG. 22 including FIGS. 22A and 22B is a flowchart of a series of operations from feeding a lamination sheet to separation of the lamination sheet according to a first embodiment of the present disclosure.

This flowchart of FIGS. 22A and 22B further includes process groups A1 and B1 to the flowchart of FIG. 19. The following description is given of the processes added to the flowchart of FIGS. 22A and 22B in particular.

First, the sheet processing device 100a starts feeding the lamination sheet S in step S11 and performs the given process in steps S12 to S17. In this case, the detection result is not the abnormal condition in step A11 (NO in step A11), and the process goes to step S15.

Then, the sheet processing device 100a determines whether the size of the gap between the two sheets (first and second sheets) of the lamination sheet S is greater than the given size (in other words, a size sufficient to insert the separation members 116 into the lamination sheet S), in step B11. When the size of the gap between the two sheets (first and second sheets) of the lamination sheet S is greater than the given size (YES in step B11), the sheet processing device 100a stores data that the detection result is not an abnormal condition, in the first storage 135, in step B12, and then the process proceeds to step S18. When the size of the gap between the two sheets (first and second sheets) of the lamination sheet S is equal to or smaller than the given size (NO in step B11), the sheet processing device 100a stores data that the detection result is an abnormal condition, in the first storage 135, in step B13.

Then, the sheet processing device 100a cause the lamination sheet S with the two sheets (first and second sheets) not separated from each other, to be conveyed to the sheet ejection tray 104 as a purge tray, in step B14. The sheet ejection tray 104 also serves as a purge tray, but a dedicated purge tray may be disposed separately.

When performing the subsequent sheet processing operation, the sheet processing device 100a refers to the detection result of the first storage 135 and determines whether the detection result in the previous sheet processing (previous separation process) is the abnormal condition, in step A11. When the sheet processing device 100a determines that the detection result in the previous sheet processing is the abnormal condition (YES in step A11), the process proceeds to step A12.

The sheet processing device 100a determines whether the nipping force F3 between the winding roller 109 and the grip roller 112 is smaller than the given maximum value, in step A12. When the sheet processing device 100a determines that the nipping force F3 between the winding roller 109 and the grip roller 112 is smaller than the given maximum value (YES in step A12), the process proceeds to step A13 to increase the nipping force F3' in the present sheet processing to be greater than the nipping force F3 in the previous sheet processing. In other words, the relation of F3'=F3+ΔF3 (ΔF3>0) is satisfied. The nipping force F2' in the present sheet processing is not changed, in other words, the relation of F2'=F2 is satisfied. Then, the process proceeds to step S15.

As a result, the difference in the nipping force of the winding roller 109 with the grip roller 112 disposed extreme downstream in the rotational direction and the nipping force of the winding roller 109 with the grip roller 111 upstream from the grip roller 112 in the rotational direction in the present sheet processing is greater than the difference in the nipping forces of the winding roller 109 with the grip roller 111 and the grip roller 112 in the previous sheet processing. In other words, the relation of the difference of the present nipping forces ΔF32' (=F3'−F2')>the difference of the previous nipping forces ΔF32 (=F3−F2) is satisfied.

Accordingly, even when the attraction is strong between the two sheets due to static electricity, the slip amount of the sheet on the outer circumference is increased, and the gap g generated between the two sheets of a lamination sheet S is also increased. As a result, this configuration can prevent recurrence of unavailability of sheet separation.

On the other hand, when the sheet processing device 100a determines that the nipping force F3 between the winding roller 109 and the grip roller 112 in the previous sheet processing is equal to or greater than the given maximum value (NO in step A12), the sheet processing device 100a does not change the nipping force F3' in the present sheet processing, in other words, the relation of F3'=F3 is satisfied. Then, the process proceeds to step S15.

Figure 23:
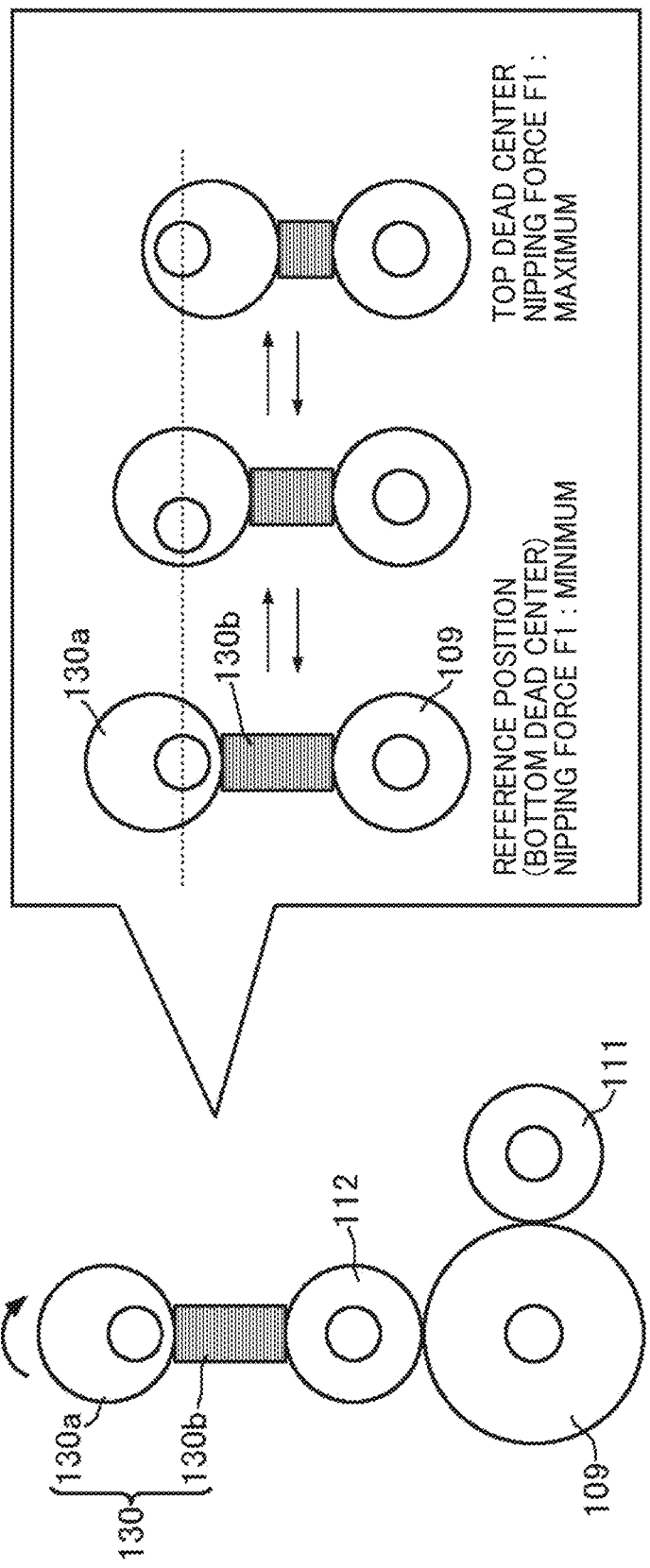
FIG. 23 is a schematic diagram illustrating an example of a control assembly that adjusts the nipping force of a grip roller according to the first embodiment of the present disclosure.

FIG. 23 is a schematic diagram illustrating an example of a control unit that adjusts the nipping force of a grip roller according to the first embodiment of the present disclosure.

As illustrated in FIG. 23, a control unit 130 adjusts the nipping force of the grip roller 112 by adjusting the contact force of the grip roller 112 to the winding roller 109.

The control unit 130 includes an eccentric cam 130a disposed to face the grip roller 112 and a spring 130b disposed between the eccentric cam 130a and the grip roller 112. The eccentric cam 130a is coupled to a drive source such as a stepper motor, and the spring 130b biases the roller shaft of the grip roller 112 toward the winding roller 109 by the eccentric rotation of the eccentric cam 130a.

More specifically, since the contact portion where the eccentric cam 130a and the spring 130b contact with each other at the reference position is the bottom dead center, the elastic force of the spring 130b is minimum, in other words, the nipping force between the rollers is also minimum.

When the eccentric cam 130a is rotated and the contact portion with the spring 130b reaches the top dead center, the nipping force between the rollers is maximum. Further, since the amount of rotation of the eccentric cam 130a can be controlled, the nipping force between the rollers can be any value in the above-described range from the above-described minimum value (at the reference position) to the maximum value.

The spring 130b has an elastic force to be set so that the nipping force at the reference position satisfies the relation of F2<F3.

Second Embodiment

Figure 24A:
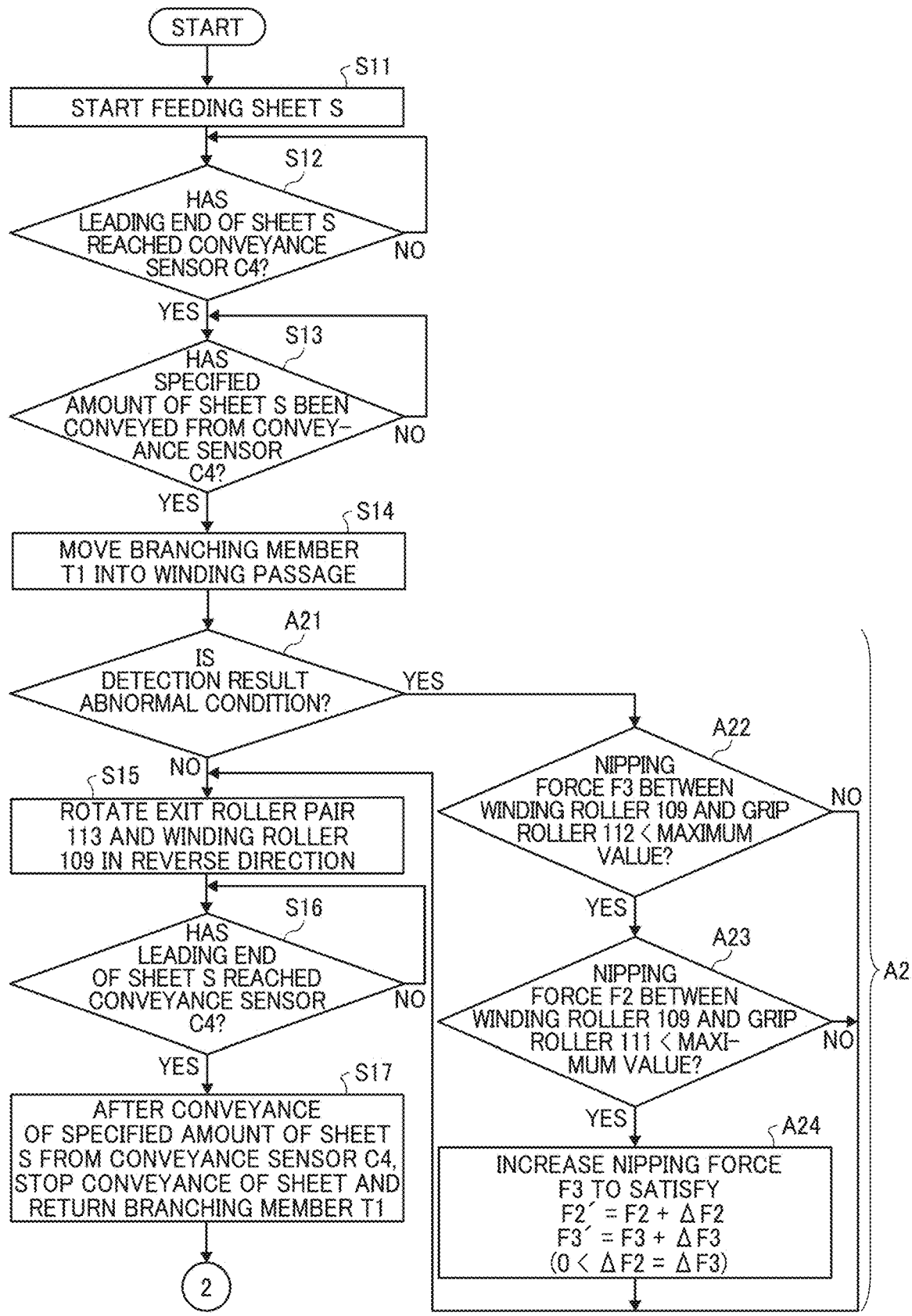
FIG. 24A is the first half of a flowchart of a series of operations from feeding a two-ply sheet to separation of the two-ply sheet according to a second embodiment of the present disclosure.
Figure 24B:
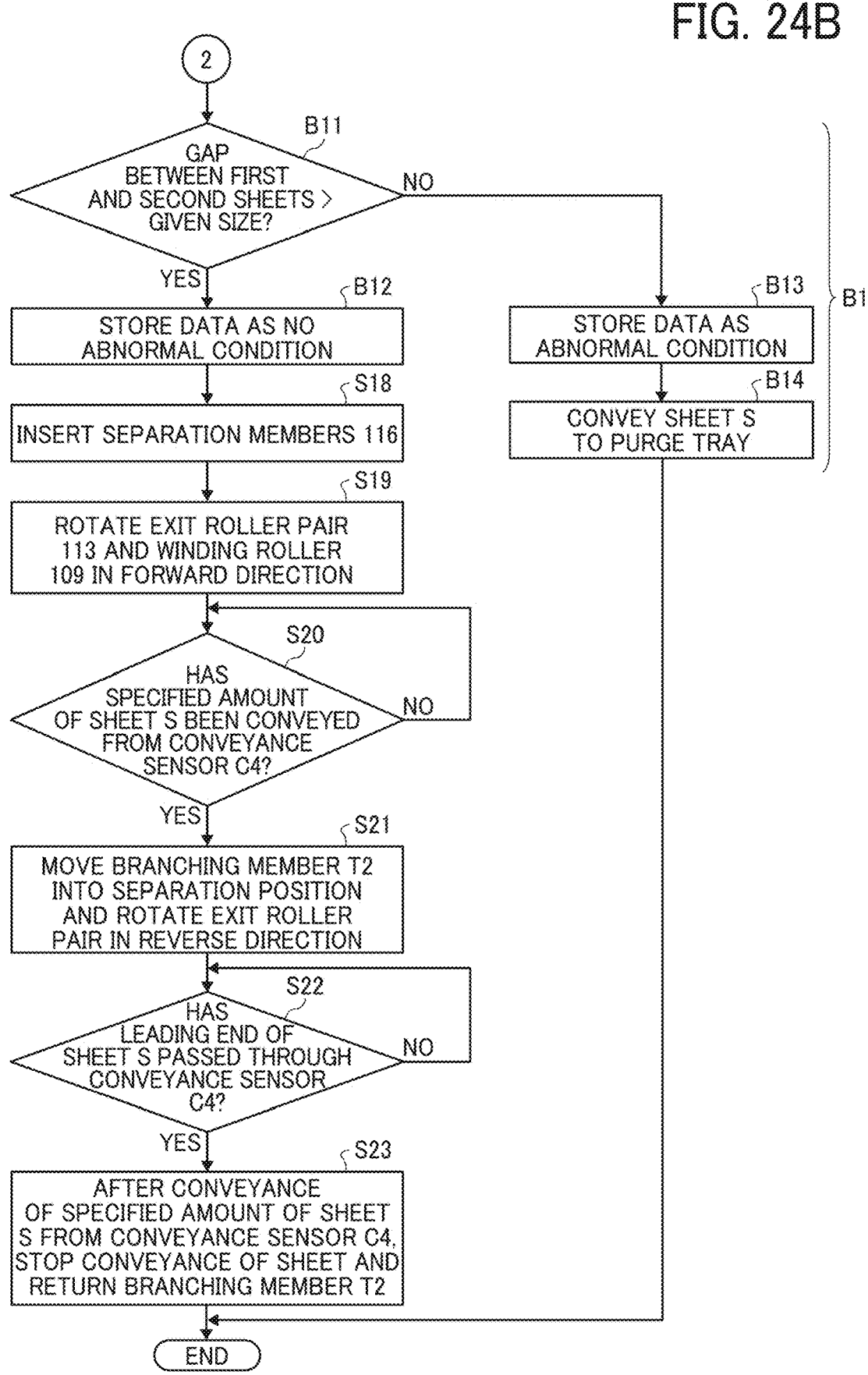
FIG. 24B is the second half of the flowchart of the series of operations subsequent to the operations of FIG. 24A.

FIG. 24 including FIGS. 24A and 24B is a flowchart of a series of operations from feeding a lamination sheet to separation of the lamination sheet according to a second embodiment of the present disclosure.

This flowchart of FIGS. 24A and 24B further includes a process group A2 instead of the process group A1 in the flowchart of FIGS. 22A and 22B. The following description is given of the processes added to the flowchart of FIGS. 22A and 22B in particular.

As in the first embodiment, the sheet processing device 100a according to the second embodiment performs the given processes from steps S11 to S17, and stores data of whether there is an abnormal condition, in step B1.

Then, when performing the subsequent sheet processing operation, the sheet processing device 100a refers to the detection result of the first storage 135 and determines whether the detection result in the previous sheet processing is the abnormal condition, in step A21. When the sheet processing device 100a determines that the detection result in the previous sheet processing is the abnormal condition (YES in step A21), the process proceeds to step A22.

The sheet processing device 100a determines whether the nipping force F3 between the winding roller 109 and the grip roller 112 is smaller than the given maximum value, in step A22. When the sheet processing device 100a determines that the nipping force F3 between the winding roller 109 and the grip roller 112 in the previous sheet processing is equal to or greater than the given maximum value (NO in step A22), the process proceeds to step S15. On the other hand, when the sheet processing device 100a determines that the nipping force F3 between the winding roller 109 and the grip roller 112 is smaller than the given maximum value (YES in step A22), the process proceeds to step A23. The sheet processing device 100a determines whether the nipping force F2 between the winding roller 109 and the grip roller 111 is smaller than the given maximum value, in step A23. When the sheet processing device 100a determines that the nipping force F2 between the winding roller 109 and the grip roller 111 in the previous sheet processing is equal to or greater than the given maximum value (NO in step A23), the process proceeds to step S15. On the other hand, when the sheet processing device 100a determines that the nipping force F2 between the winding roller 109 and the grip roller 111 is smaller than the given maximum value (YES in step A23), the process proceeds to step A24.

Then, the sheet processing device 100a increases the nipping forces F2' and F3' in the present sheet processing to be greater than the nipping forces F2 and F3 in the previous sheet processing, in step A24. In other words, the relations of F2'=F2+ΔF2 and F3'=F3+ΔF3 (where ΔF2=ΔF3>0) are satisfied. The present nipping force F1' is not changed, in other words, the relation of F1'=F1 is satisfied.

As a result, the difference in the nipping forces of the winding roller 109 with the grip roller 111 and the driven roller 110 in the present sheet processing is greater than the difference in the nipping forces of the winding roller 109 with the grip roller 111 and the driven roller 110 in the previous sheet processing. In other words, the relation of the difference of the present nipping force ΔF21' (=F2'−F1')>the difference of the previous nipping force ΔF21 (=F2−F1) is satisfied.

As a result, as in the first embodiment, this configuration can increase the gap g between the two sheets of a lamination sheet S, and as a result, can prevent recurrence of unavailability of sheet separation.

Figure 25:
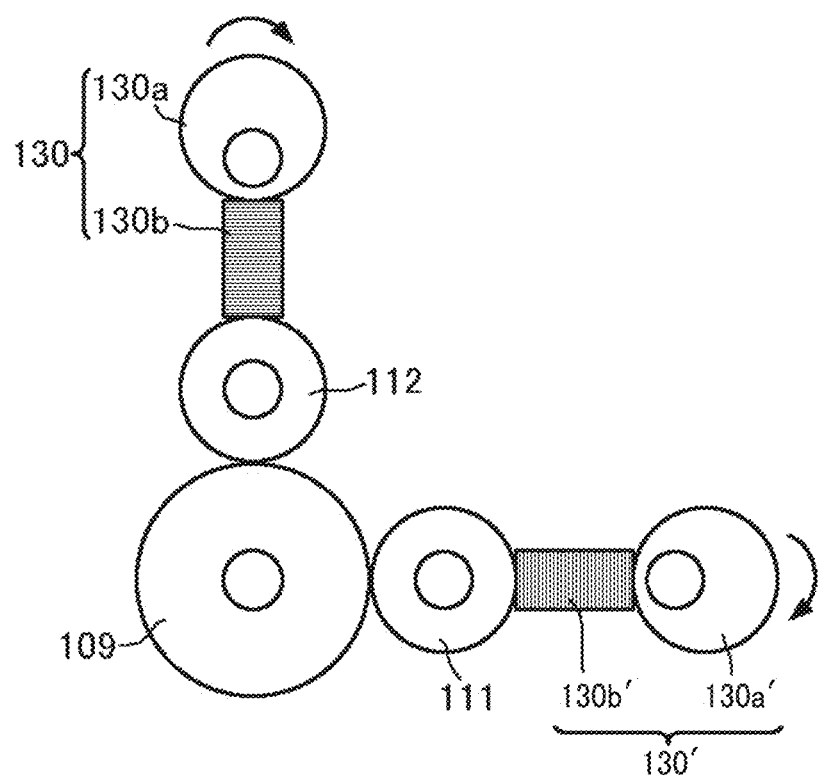
FIG. 25 is a schematic diagram illustrating an example of a control assembly that adjusts the nipping force of a grip roller according to the second embodiment of the present disclosure.

FIG. 25 is a schematic diagram illustrating an example of a control assembly that adjusts the nipping force of a grip roller according to the second embodiment of the present disclosure.

As illustrated in FIG. 25, a second control unit 130' is disposed to adjust the contact force of the grip roller 111 to the winding roller 109. The second control unit 130' has the configuration same as or similar to the control unit 130, and the nipping force between the grip roller 111 and the winding roller 109 can be any value in the above-described range from the minimum value (reference position) to the maximum value.

Third Embodiment

Figure 26A:
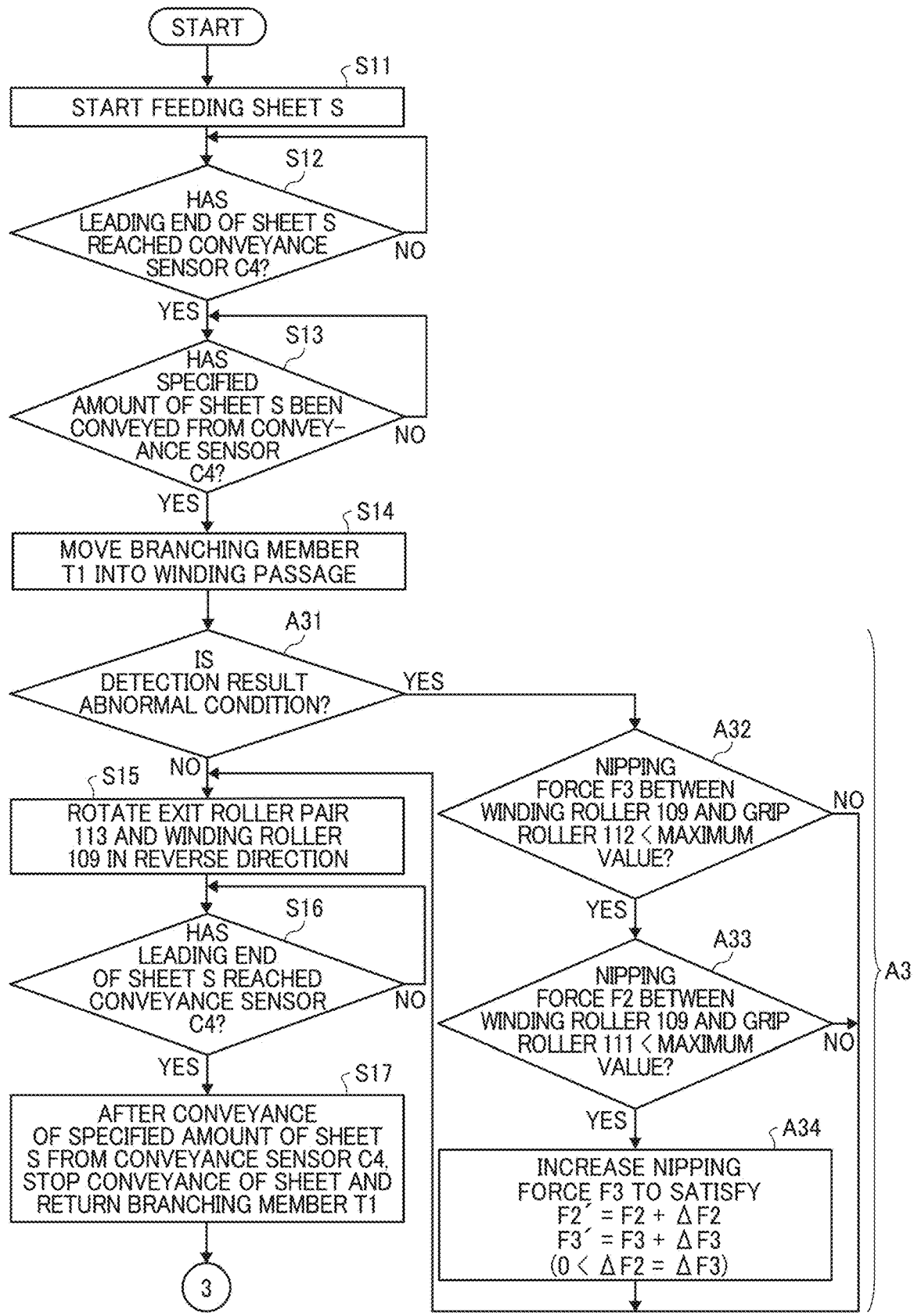
FIG. 26A is the first half of a flowchart of a series of operations from feeding a two-ply sheet to separation of the two-ply sheet according to a third embodiment of the present disclosure.
Figure 26B:
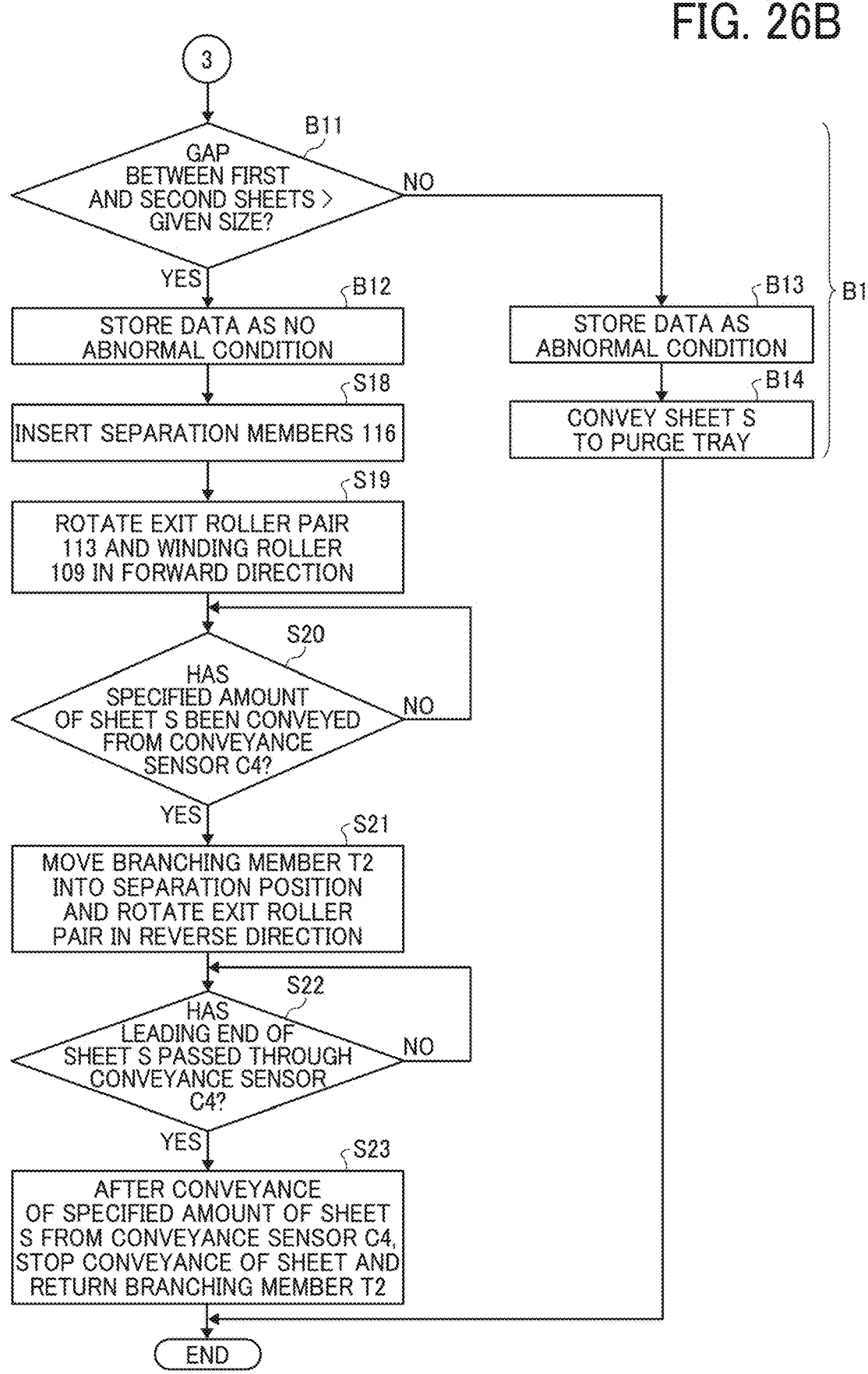
FIG. 26B is the second half of the flowchart of the series of operations subsequent to the operations of FIG. 26A.

FIG. 26 including FIGS. 26A and 26B is a flowchart of a series of operations from feeding a lamination sheet to separation of the lamination sheet according to a third embodiment of the present disclosure.

This flowchart of FIGS. 26A and 26B further includes a process group A3 instead of the process group A2 in the flowchart of FIGS. 24A and 24B. The following description is given of the processes added to the flowchart of FIGS. 22A and 22B in particular.

Similar to the second embodiment, the sheet processing device 100a determines whether the nipping force F3 between the winding roller 109 and the grip roller 112 is smaller than the given maximum value, in step A32. When the sheet processing device 100a determines that the nipping force F3 between the winding roller 109 and the grip roller 112 in the previous sheet processing is equal to or greater than the given maximum value (NO in step A32), the process proceeds to step S15. On the other hand, when the sheet processing device 100a determines that the nipping force F3 between the winding roller 109 and the grip roller 112 is smaller than the given maximum value (YES in step A32), the process proceeds to step A33. The sheet processing device 100a determines whether the nipping force F2 between the winding roller 109 and the grip roller 111 is smaller than the given maximum value, in step A33. When the sheet processing device 100a determines that the nipping force F2 between the winding roller 109 and the grip roller 111 in the previous sheet processing is equal to or greater than the given maximum value (NO in step A33), the process proceeds to step S15. On the other hand, when the sheet processing device 100a determines that the nipping force F2 between the winding roller 109 and the grip roller 111 is smaller than the given maximum value (YES in step A33), the process proceeds to step A34.

Then, the sheet processing device 100a increases the nipping forces F2' and F3' in the present sheet processing to be greater than the nipping forces F2 and F3 in the previous sheet processing, in step A34. The relations are expressed by F2'=F2+ΔF2 and F3'=F3+ΔF3, and the difference ΔF3 is set to be greater than the difference ΔF2 (ΔF3>ΔF2>0). The nipping force F1' in the present sheet processing is not changed, in other words, the relation of F1'=F1 is satisfied.

As a result, (a) the difference between the nipping force of the winding roller 109 with the grip roller 111 and the nipping force of the winding roller 109 with the driven roller 110 and (b) the difference between the nipping force of the winding roller 109 with the grip roller 112 and the nipping force of the winding roller 109 with the grip roller 111 in the present sheet processing can be greater than the difference between the nipping forces of the winding roller 109 with the grip roller 111 and the grip roller 112 in the previous sheet processing.

In other words, the relations are expressed as: (a) the relation is expressed as the difference ΔF21' (=F2'−F1') between the nipping forces in the present sheet processing>the difference ΔF21 (=F2−F1) between the nipping forces in the previous sheet processing; and (b) the difference ΔF32' (=F3'−F2') between the nipping forces in the present sheet processing>the difference ΔF32 (=F3−F2) between the nipping forces in the previous sheet processing.

As a result, as in the first and second embodiments, this configuration can increase the gap g between the two sheets of a lamination sheet S, and as a result, can prevent recurrence of unavailability of sheet separation.

Fourth Embodiment

Figure 27A:
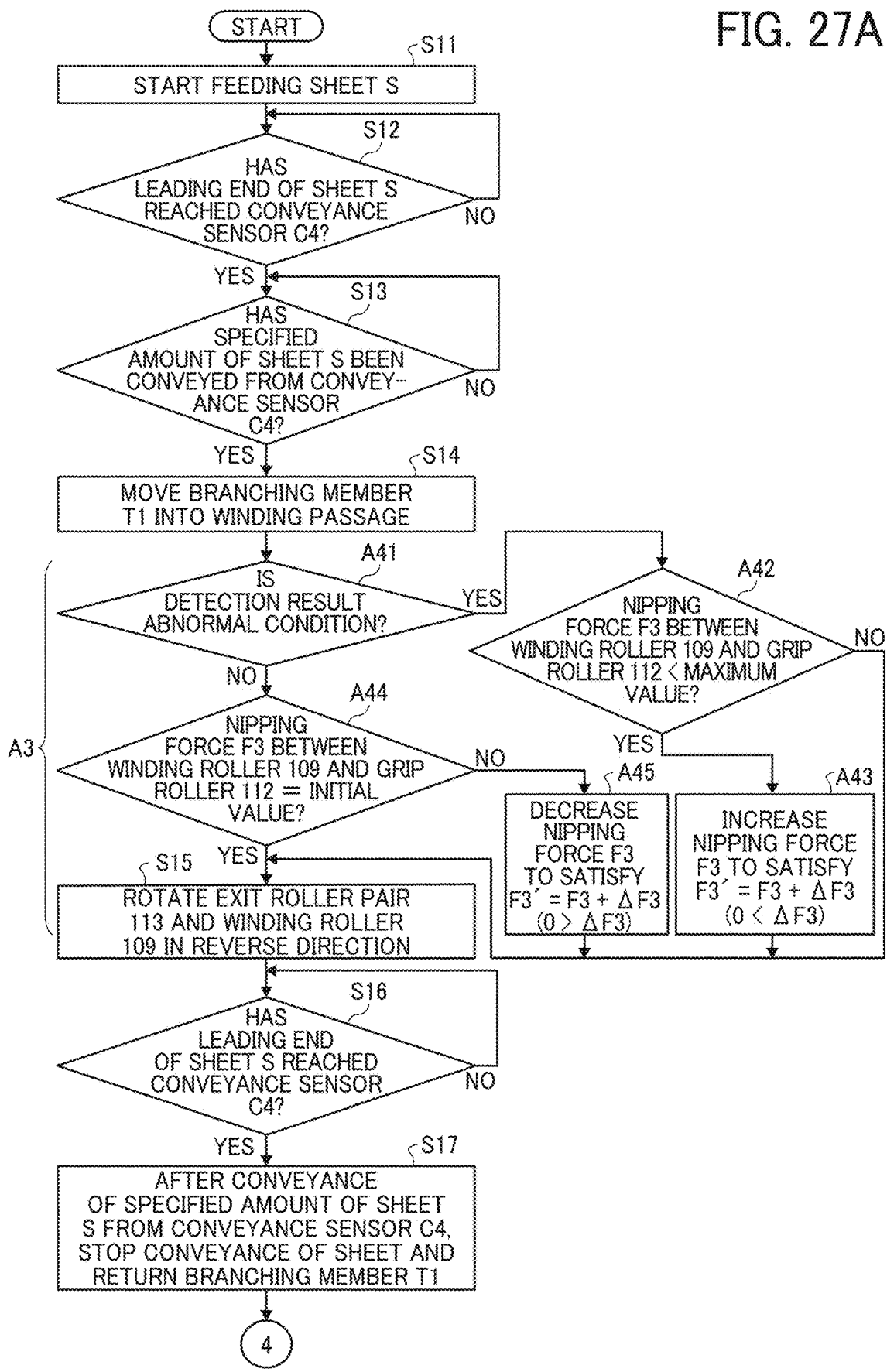
FIG. 27A is the first half of a flowchart of a series of operations from feeding a two-ply sheet to separation of the two-ply sheet according to a fourth embodiment of the present disclosure.
Figure 27B:
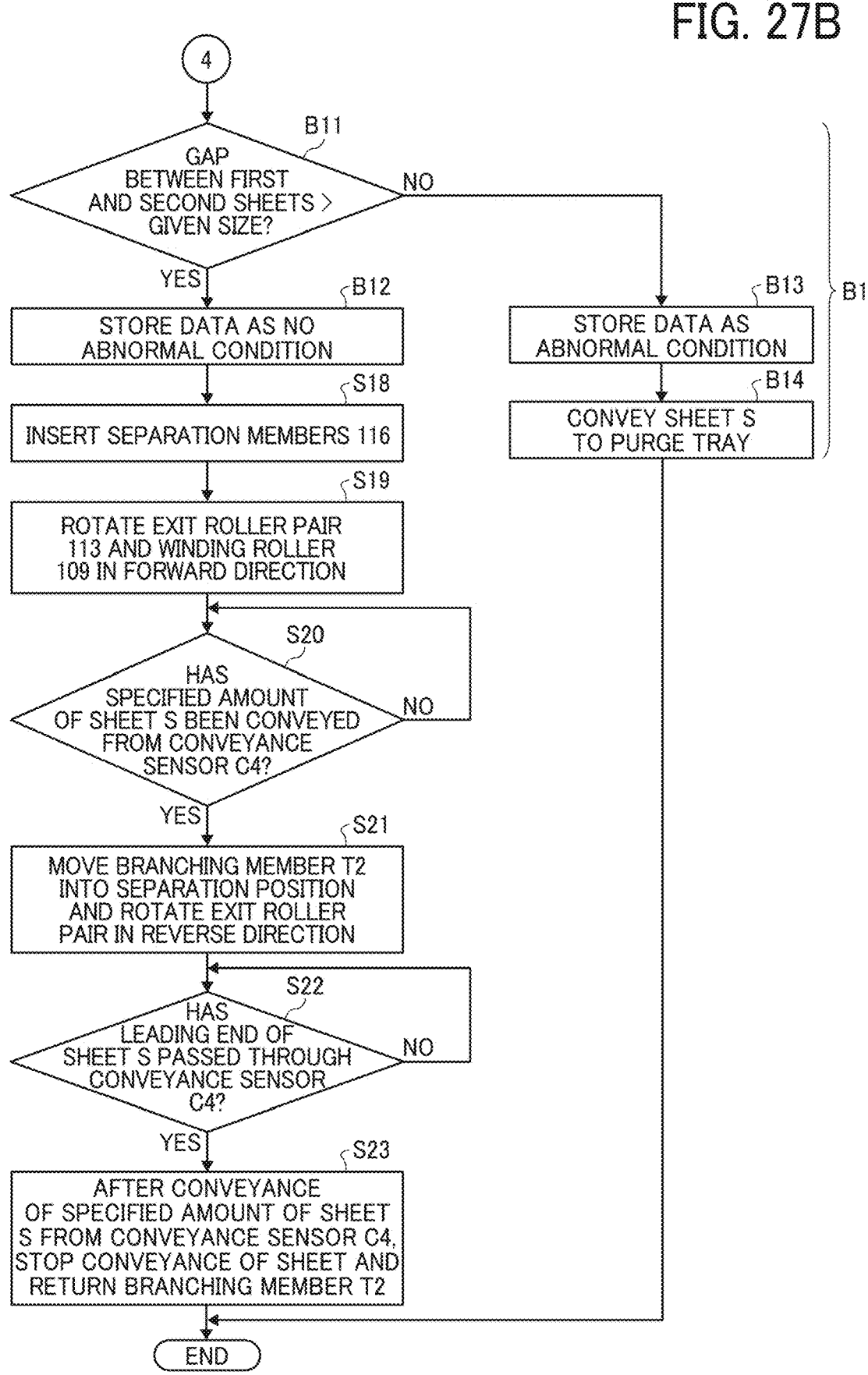
FIG. 27B is the second half of the flowchart of the series of operations subsequent to the operations of FIG. 27A.

FIG. 27 including FIGS. 27A and 27B is a flowchart of a series of operations from feeding a lamination sheet to separation of the lamination sheet according to a fourth embodiment of the present disclosure.

This flowchart of FIGS. 27A and 27B further includes a process group A4 instead of the process group A1 in the flowchart of FIGS. 22A and 22B. The following description is given of the processes added to the flowchart of FIGS. 22A and 22B in particular.

When performing the subsequent sheet processing operation, the sheet processing device 100a refers to the detection result of the first storage 135 and determines whether the detection result in the previous sheet processing is the abnormal condition, in step A41. When the sheet processing device 100a determines that the detection result in the previous sheet processing is the abnormal condition (YES in step A41), the process proceeds to step A42. The sheet processing device 100a determines whether the nipping force F3 between the winding roller 109 and the grip roller 112 is smaller than the given maximum value, in step A42. When the sheet processing device 100a determines that the nipping force F3 between the winding roller 109 and the grip roller 112 in the previous sheet processing is equal to or greater than the given maximum value (NO in step A42), the process proceeds to step S15. On the other hand, when the sheet processing device 100a determines that the nipping force F3 between the winding roller 109 and the grip roller 112 is smaller than the given maximum value (YES in step A42), the sheet processing device 100a increases the nipping force F3' in the present sheet processing to be greater than the nipping force F3 in the previous sheet processing. When the sheet processing device 100a determines that the detection result in the previous sheet processing is not the abnormal condition (NO in step A41), the process proceeds to step A44.

The sheet processing device 100a determines whether the nipping force F3 between the winding roller 109 and the grip roller 112 is the initial value (minimum value), in step A44. When the sheet processing device 100a determines that the nipping force F3 between the winding roller 109 and the grip roller 112 is not the initial value (minimum value) (NO in step A44), the process proceeds to step A45 to decrease only the nipping force F3' in the present sheet processing. In other words, the relation of F3'=F3+ΔF3 (where ΔF3<0) is satisfied.

Accordingly, only when the sheet processing (sheet separating operation) is available, the nipping force F3 can be decreased. As a result, the biasing force applied to the winding roller 109, the grip roller 112, and the spring 130b may be reduced, and deterioration of the winding roller 109, the grip roller 112, and the spring 130b can be reduced or prevented.

Fifth Embodiment

Figure 28A:
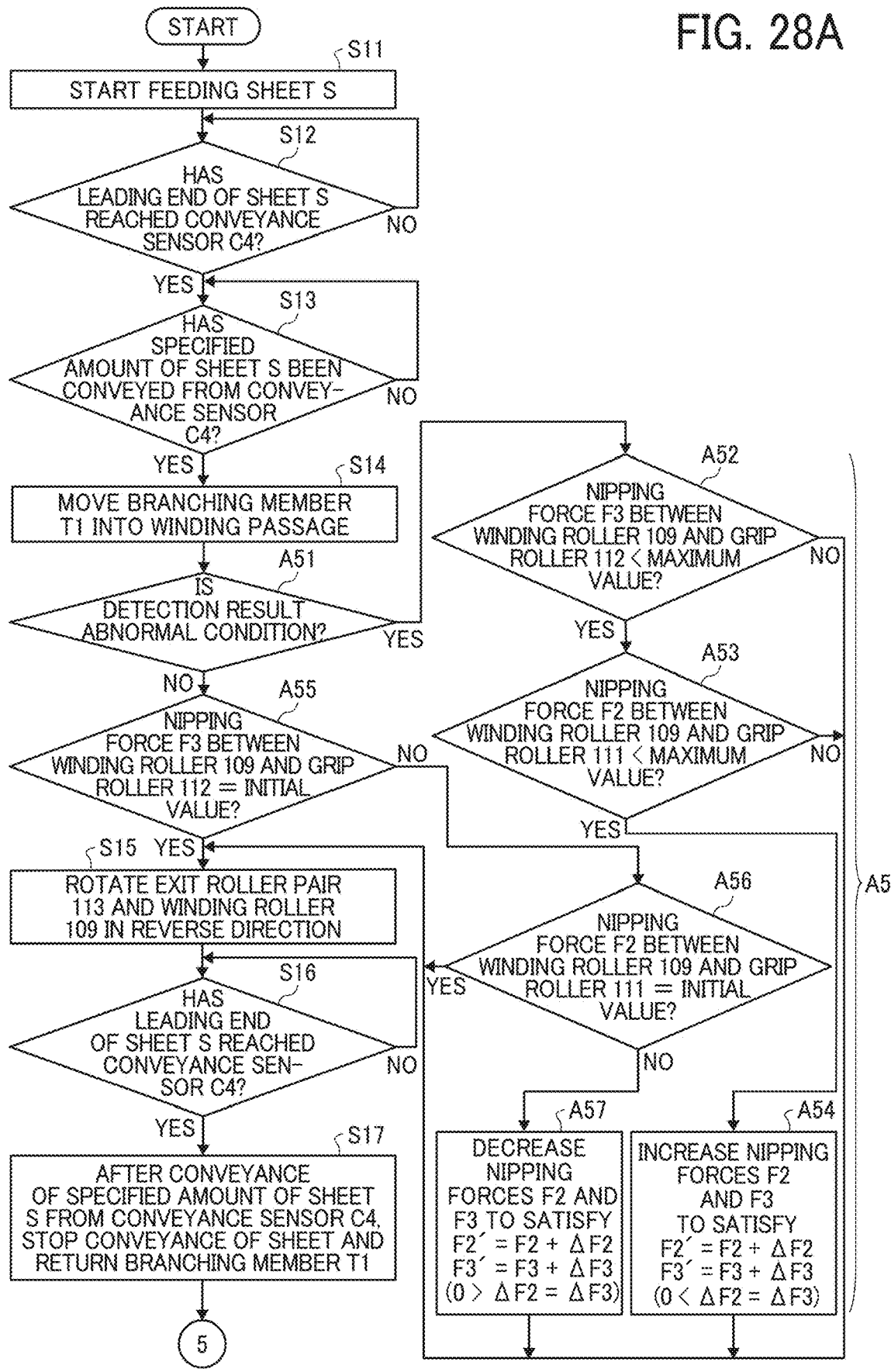
FIG. 28A is the first half of a flowchart of a series of operations from feeding a two-ply sheet to separation of the two-ply sheet according to a fifth embodiment of the present disclosure.
Figure 28B:
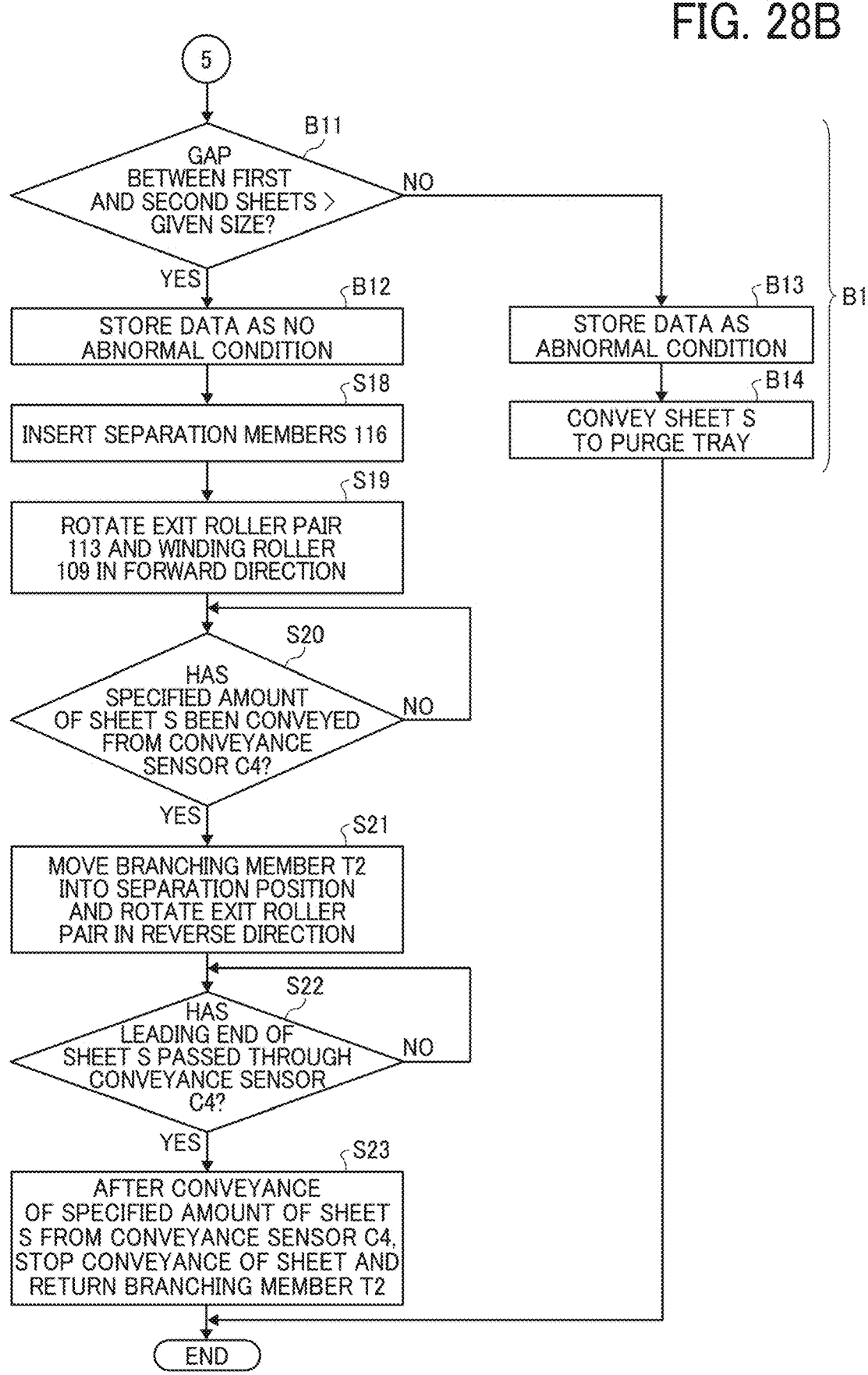
FIG. 28B is the second half of the flowchart of the series of operations subsequent to the operations of FIG. 28A.

FIG. 28 including FIGS. 28A and 28B is a flowchart of a series of operations from feeding a lamination sheet to separation of the lamination sheet according to a fifth embodiment of the present disclosure.

This flowchart of FIGS. 28A and 28B further includes a process group A5 instead of the process group A2 in the flowchart of FIGS. 24A and 24B. The following description is given in particular of the processes added to the flowchart of FIGS. 28A and 28B.

When performing the subsequent sheet processing operation, the sheet processing device 100a refers to the detection result of the first storage 135 and determines whether the detection result in the previous sheet processing is the abnormal condition, in step A51. When the sheet processing device 100a determines that the detection result in the previous sheet processing is the abnormal condition (YES in step A51), the process proceeds to step A52. The sheet processing device 100a determines whether the nipping force F3 between the winding roller 109 and the grip roller 112 is smaller than the given maximum value, in step A52. When the sheet processing device 100a determines that the nipping force F3 between the winding roller 109 and the grip roller 112 in the previous sheet processing is equal to or greater than the given maximum value (NO in step A52), the process proceeds to step S15. On the other hand, when the sheet processing device 100a determines that the nipping force F3 between the winding roller 109 and the grip roller 112 is smaller than the given maximum value (YES in step A52), the sheet processing device 100a determines whether the nipping force F2 between the winding roller 109 and the grip roller 111 is smaller than the given maximum value, in step A53. When the sheet processing device 100a determines that the nipping force F2 between the winding roller 109 and the grip roller 111 in the previous sheet processing is equal to or greater than the given maximum value (NO in step A53), the process proceeds to step S15. On the other hand, when the sheet processing device 100a determines that the nipping force F2 between the winding roller 109 and the grip roller 111 is smaller than the given maximum value (YES in step A53), the sheet processing device 100a increases the nipping forces F2' and F3' in the present sheet processing to be greater than the nipping forces F2 and F3 in the previous sheet processing in step A54, and the process proceeds to step S15. When the sheet processing device 100a determines that the detection result in the previous sheet processing is not the abnormal condition (NO in step A51), the process proceeds to step A55.

The sheet processing device 100a determines whether the nipping force F3 between the winding roller 109 and the grip roller 112 in the previous sheet processing is equal to the initial value (minimum value), in step A55. When the sheet processing device 100a determines that the nipping force F3 between the winding roller 109 and the grip roller 112 in the previous sheet processing is equal to the initial value (minimum value) (YES in step A55), the process proceeds to step S15. On the other hand, when the sheet processing device 100a determines that the nipping force F3 between the winding roller 109 and the grip roller 112 is not equal to the initial value (minimum value) (NO in step A55), the sheet processing device 100a determines whether the nipping force F2 between the winding roller 109 and the grip roller 111 is equal to the initial value (minimum value), in step A56. When the sheet processing device 100a determines that the nipping force F2 between the winding roller 109 and the grip roller 111 in the previous sheet processing is equal to the initial value (minimum value) (YES in step A56), the process proceeds to step S15. On the other hand, when the sheet processing device 100a determines that the nipping force F2 between the winding roller 109 and the grip roller 111 is not the initial value (minimum value) (NO in step A56), the process proceeds to step A57.

The sheet processing device 100a decreases the nipping forces F2' and 3', in step A57. In other words, the relations expressed as F2'=F2+ΔF2 and F3'=F3+ΔF3 (where ΔF2=ΔF3<0) are satisfied.

Accordingly, only when the sheet processing (sheet separating operation) is available, the nipping forces F2' and F3' can be decreased. As a result, the biasing force applied to the winding roller 109, the grip rollers 111 and 112, and the springs 130b and 130b' may be reduced, and deterioration of the winding roller 109, the grip rollers 111 and 112, and the springs 130b and 130b' can be reduced or prevented.

Sixth Embodiment

Figure 29A:
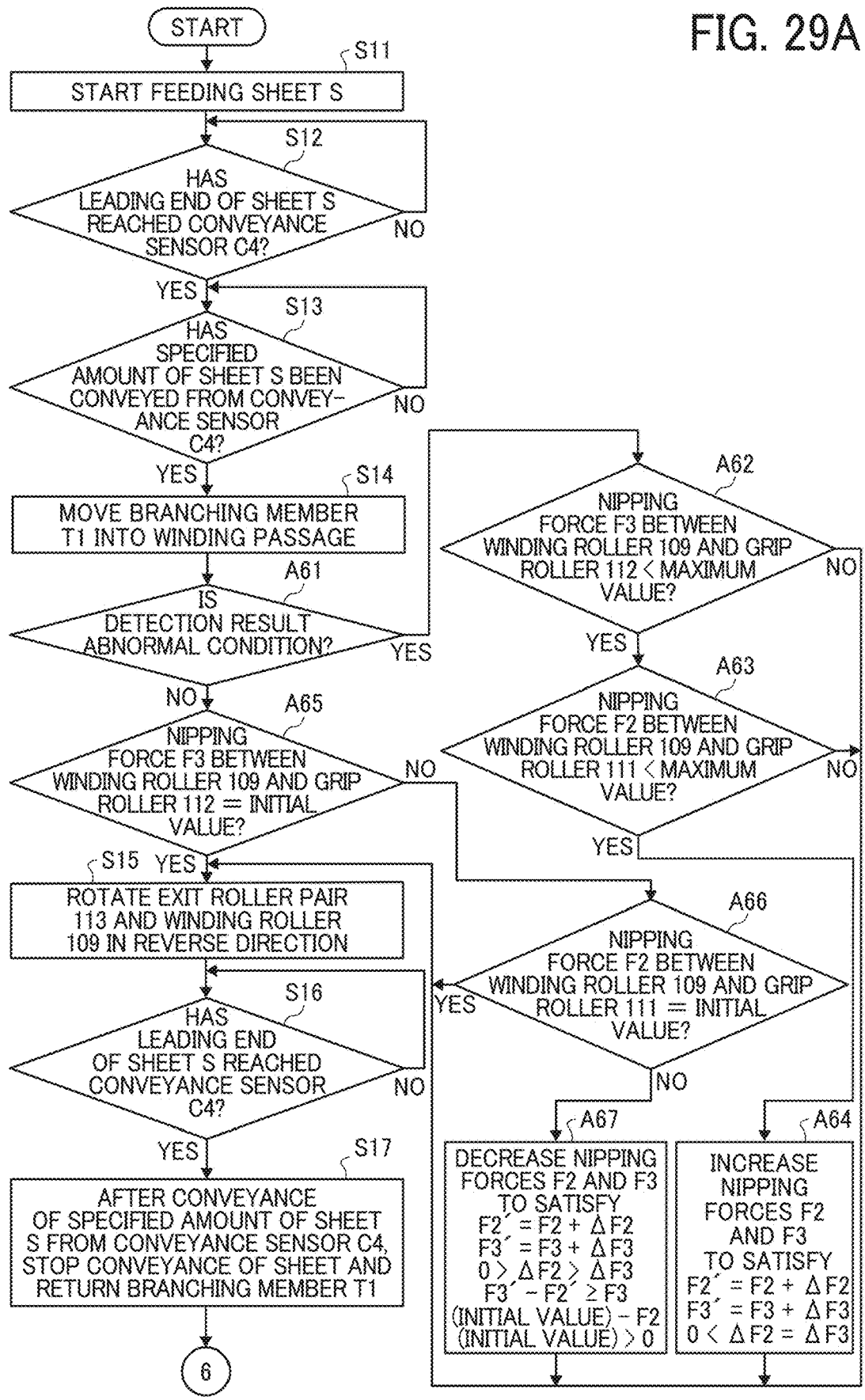
FIG. 29A is the first half of a flowchart of a series of operations from feeding a two-ply sheet to separation of the two-ply sheet according to a sixth embodiment of the present disclosure.
Figure 29B:
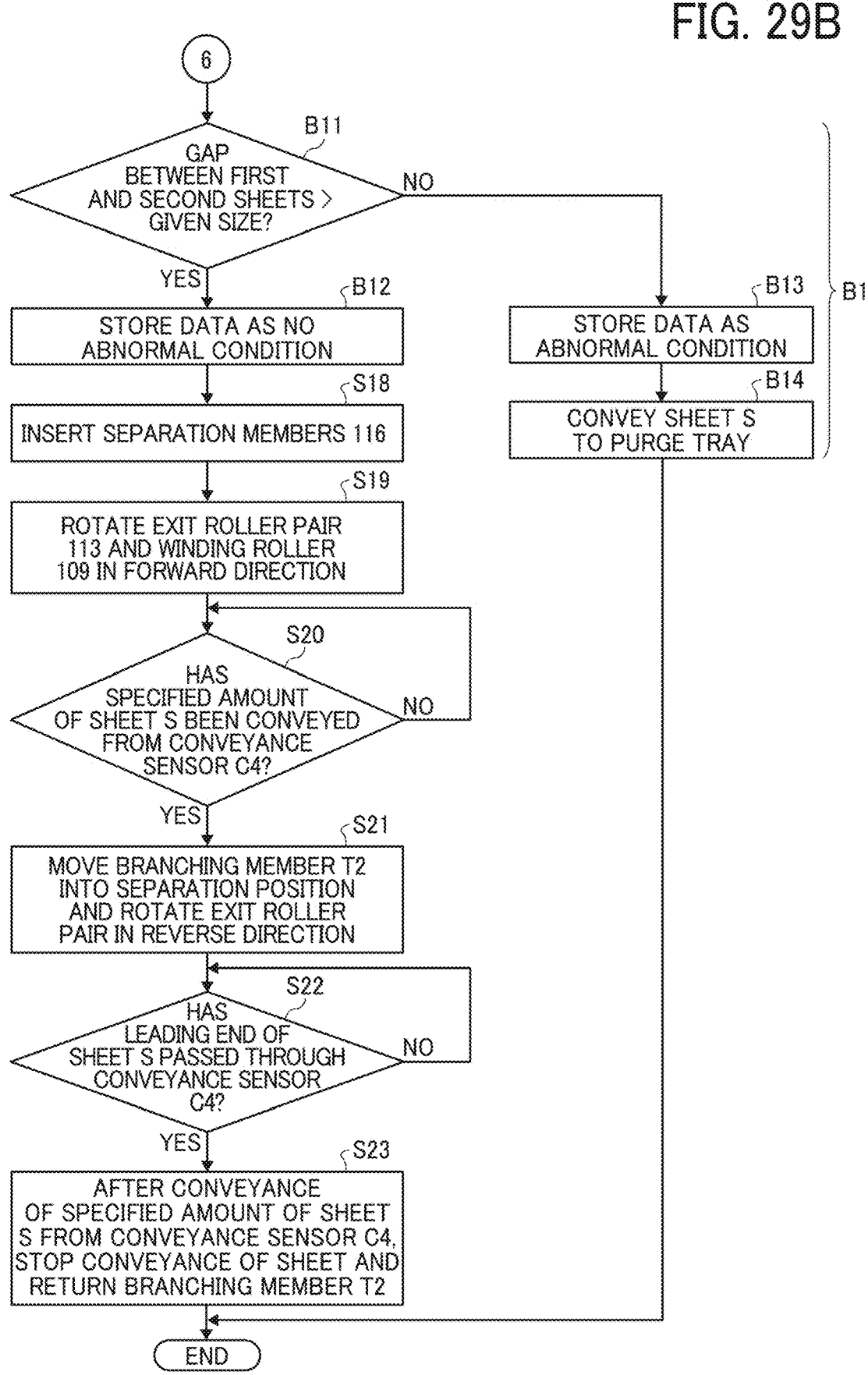
FIG. 29B is the second half of the flowchart of the series of operations subsequent to the operations of FIG. 29A.

FIG. 29 including FIGS. 29A and 29B is a flowchart of a series of operations from feeding a lamination sheet to separation of the lamination sheet according to a sixth embodiment of the present disclosure.

This flowchart of FIGS. 29A and 29B further includes a process group A6 instead of the process group A3 in the flowchart of FIGS. 26A and 26B. The following description is given in particular of the processes added to the flowchart of FIGS. 29A and 29B.

When performing the subsequent sheet processing operation, the sheet processing device 100a refers to the detection result of the first storage 135 and determines whether the detection result in the previous sheet processing is the abnormal condition, in step A61. When the sheet processing device 100a determines that the detection result in the previous sheet processing is the abnormal condition (YES in step A61), the process proceeds to step A62. The sheet processing device 100a determines whether the nipping force F3 between the winding roller 109 and the grip roller 112 is smaller than the given maximum value, in step A62. When the sheet processing device 100a determines that the nipping force F3 between the winding roller 109 and the grip roller 112 in the previous sheet processing is equal to or greater than the given maximum value (NO in step A62), the process proceeds to step S15. On the other hand, when the sheet processing device 100a determines that the nipping force F3 between the winding roller 109 and the grip roller 112 is smaller than the given maximum value (YES in step A62), the sheet processing device 100a determines whether the nipping force F2 between the winding roller 109 and the grip roller 111 is smaller than the given maximum value, in step A63. When the sheet processing device 100a determines that the nipping force F2 between the winding roller 109 and the grip roller 111 in the previous sheet processing is equal to or greater than the given maximum value (NO in step A63), the process proceeds to step S15. On the other hand, when the sheet processing device 100a determines that the nipping force F2 between the winding roller 109 and the grip roller 111 is smaller than the given maximum value (YES in step A63), the sheet processing device 100a increases the nipping forces F2' and F3' in the present sheet processing to be greater than the nipping forces F2 and F3 in the previous sheet processing in step A64, and the process proceeds to step S15. When the sheet processing device 100a determines that the detection result in the previous sheet processing is not the abnormal condition (NO in step A61), the process proceeds to step A65.

The sheet processing device 100a determines whether the nipping force F3 between the winding roller 109 and the grip roller 112 in the previous sheet processing is equal to the initial value (minimum value), in step A65. When the sheet processing device 100a determines that the nipping force F3 between the winding roller 109 and the grip roller 112 in the previous sheet processing is equal to the initial value (minimum value) (YES in step A65), the process proceeds to step S15. On the other hand, when the sheet processing device 100a determines that the nipping force F3 between the winding roller 109 and the grip roller 112 is not equal to the initial value (minimum value) (NO in step A65), the sheet processing device 100a determines whether the nipping force F2 between the winding roller 109 and the grip roller 111 is equal to the initial value (minimum value), in step A66. When the sheet processing device 100a determines that the nipping force F2 between the winding roller 109 and the grip roller 111 in the previous sheet processing is equal to the initial value (minimum value) (YES in step A66), the process proceeds to step S15. On the other hand, when the sheet processing device 100a determines that the nipping force F2 between the winding roller 109 and the grip roller 111 is not the initial value (minimum value) (NO in step A66), the process proceeds to step A67.

Then, the sheet processing device 100a decreases the nipping forces F2' and F3' in the present sheet processing to be smaller than the nipping forces F2 and F3 in the previous sheet processing but increases the reduced amount of the nipping force F3' is greater than the reduced amount of the nipping force F2', in step A67.

In other words, the relation expressed by F2'=F2+ΔF2 and the relation expressed by F3'=F3+ΔF3 (where ΔF3<ΔF2<0) are satisfied. Further, the relation of the difference ΔF32' (=F3'−F2') of the nipping force in the present sheet processing>the difference ΔF32 (initial value) of the nipping force at the initial value (=F3 (initial value)−F2 (initial value)) is satisfied, where the initial value of the nipping force of the winding roller 109 with the grip roller 111 is F2 (initial value) and the initial value of the nipping force of the winding roller 109 with the grip roller 112 is F3 (initial value).

Accordingly, this configuration can have a lower limit value for the difference (ΔF32') between the nipping force of the winding roller 109 with the grip roller 111 and the nipping force of the winding roller 109 with the grip roller 112, and to stably perform the sheet processing.

Seventh Embodiment

Figure 30A:
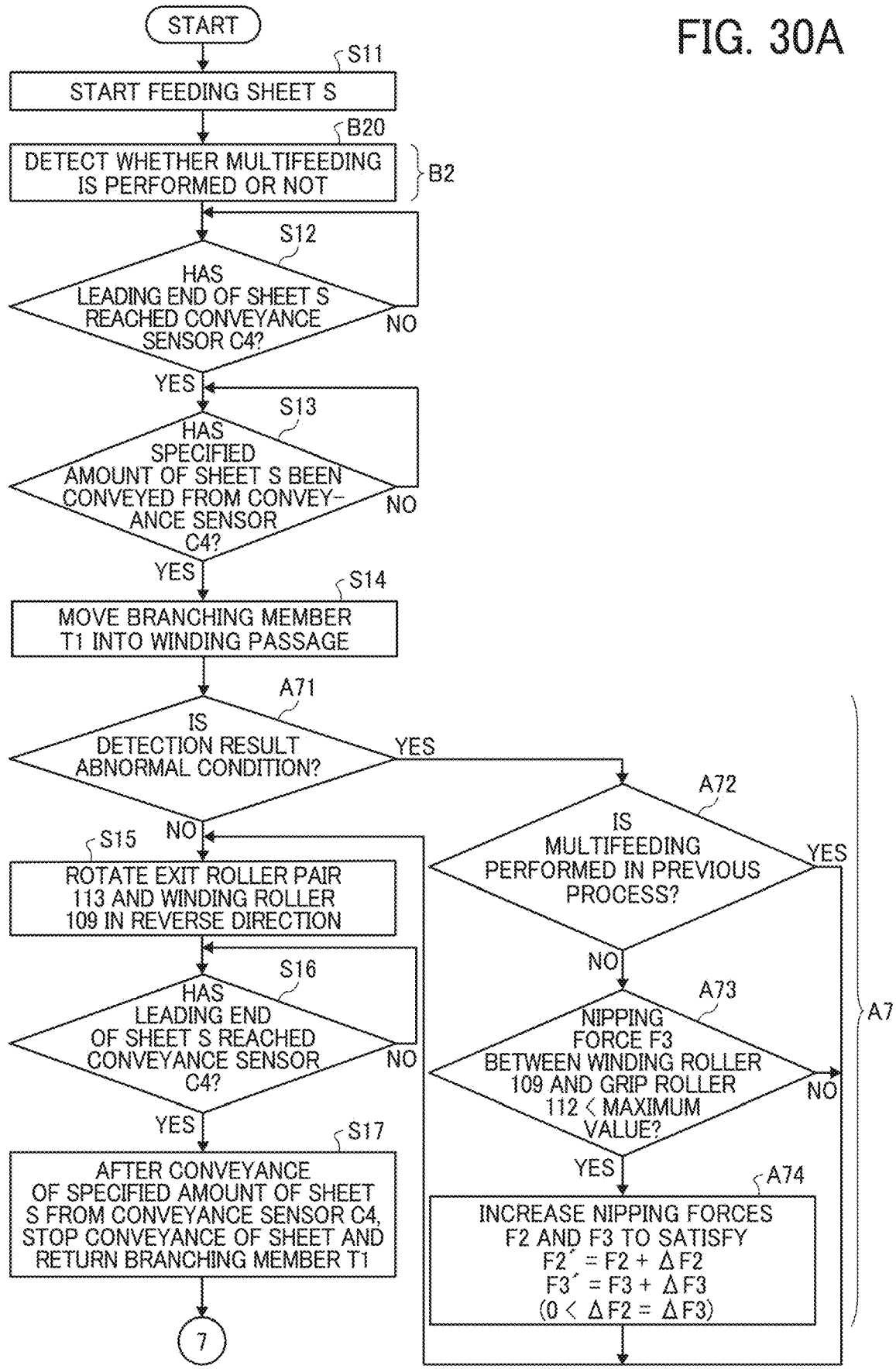
FIG. 30A is the first half of a flowchart of a series of operations from feeding a two-ply sheet to separation of the two-ply sheet according to a seventh embodiment of the present disclosure.
Figure 30B:
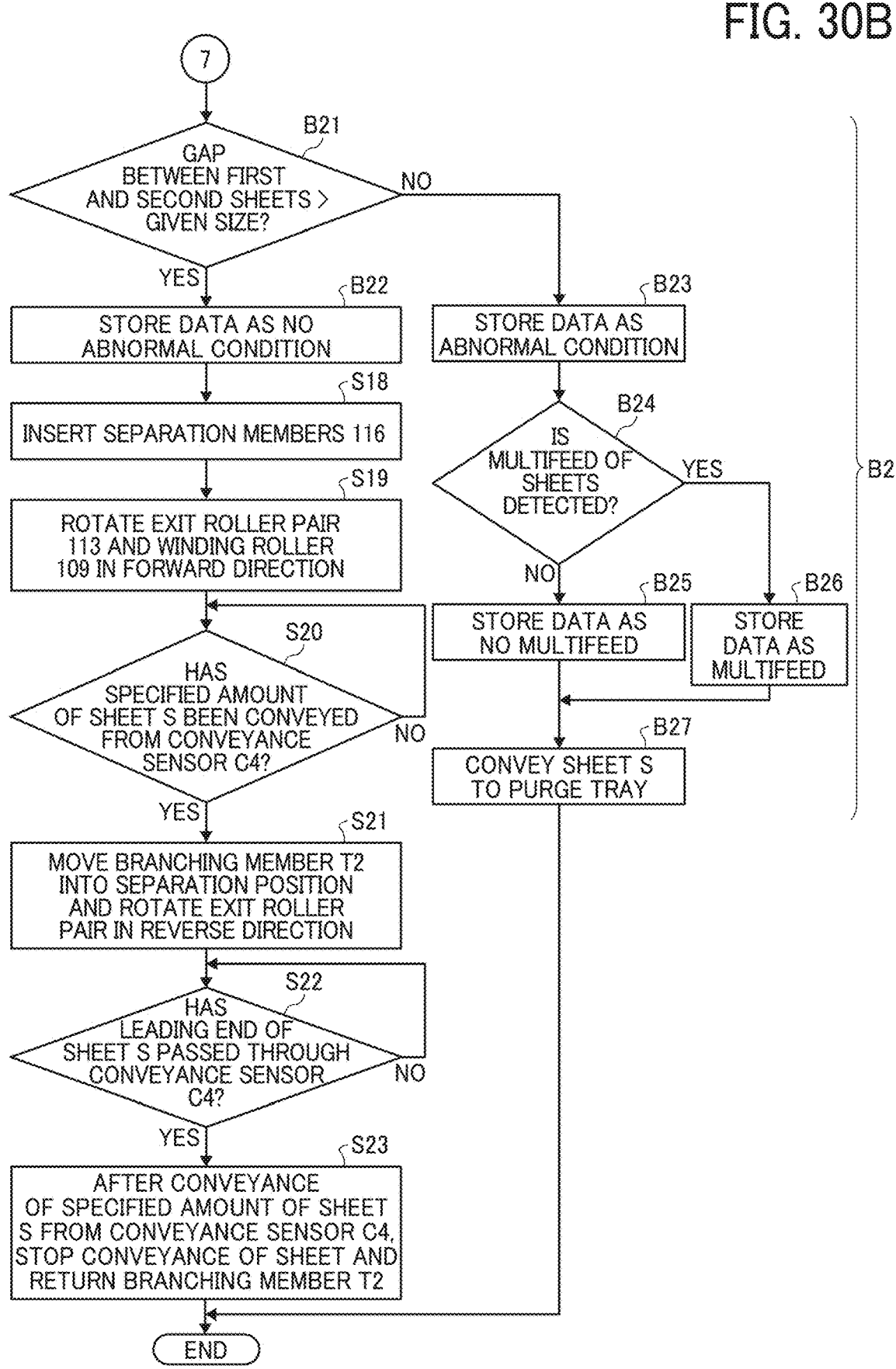
FIG. 30B is the second half of the flowchart of the series of operations subsequent to the operations of FIG. 30A.

FIG. 30 including FIGS. 30A and 30B is a flowchart of a series of operations from feeding a lamination sheet to separation of the lamination sheet according to a seventh embodiment of the present disclosure.

This flowchart of FIGS. 30A and 30B further includes process groups A7 and B2 to the flowchart of FIG. 19. The following description is given in particular of the processes added to the flowchart of FIGS. 29A and 29B.

The sheet processing device 100a starts feeding the lamination sheet S, in step S11, then cause the multifeed detection sensor C1 to detect whether multifeed of the lamination sheets S occurs, in other words, whether multiple lamination sheets S are fed together at the same time.

Subsequently, the sheet processing device 100a performs the operations in steps S12 to 17. After step S14, the sheet processing device 100a determines whether the detection result is the abnormal condition, in step A71. When the detection result is not the abnormal condition (NO in step A71), the process proceeds to step S15.

Then, the sheet processing device 100a determines whether the size of the gap between the two sheets (first and second sheets) of the lamination sheet S is greater than the given size (in other words, a size sufficient to insert the separation members 116 into the lamination sheet S), in step B21. When the size of the gap between the two sheets (first and second sheets) of the lamination sheet S is greater than the given size (YES in step B21), the sheet processing device 100a stores data that the detection result is not an abnormal condition, in the first storage 135, in step B22, and then the process proceeds to step S18. When the size of the gap between the two sheets (first and second sheets) of the lamination sheet S is equal to or smaller than the given size (NO in step B21), the sheet processing device 100a stores data that the detection result is an abnormal condition, in the first storage 135, in step B23. Then, the sheet processing device 100a determines whether the multifeed detection sensor C1 detects multifeed of the lamination sheets S, in B24. When the multifeed detection sensor C1 detects multifeed of the lamination sheets S (YES in B24), the sheet processing device 100a stores data as multifeed, in the second storage 136, in step B26. Then, the process proceeds to step B27.

On the other hand, when the multifeed detection sensor C1 does not detect multifeed of the lamination sheets S (NO in B24), the sheet processing device 100a stores data as no multifeed, in the second storage 136, in step B25. Then, the process proceeds to step B27. Then, the sheet processing device 100a cause the lamination sheet S with the two sheets (first and second sheets) not separated from each other, to be conveyed to the sheet ejection tray 104 serving as a purge tray, in step B27.

When performing the subsequent sheet processing operation, the sheet processing device 100a refers to the detection result of the first storage 135 and determines whether the detection result in the previous sheet processing is the abnormal condition, in step A71. When the sheet processing device 100a determines that the detection result in the previous sheet processing is not the abnormal condition (NO in step A71), the process proceeds to step S15. On the other hand, when the sheet processing device 100a determines that the detection result in the previous sheet processing is the abnormal condition (YES in step A71), the process proceeds to step A72.

The sheet processing device 100a refers to the detection result of the second storage 136 and determines whether the detection result in the previous sheet processing is the multifeed of the lamination sheets S, in step A72. When the detection result in the previous sheet processing is the multifeed of the lamination sheets S (YES in step A72), the nipping force F3 between the winding roller 109 and the grip roller 112 is not changed, and the process proceeds to step S15.

On the other hand, when the detection result in the previous sheet processing is no multifeed of the lamination sheets S (NO in step A72), the process proceeds to step A73. The sheet processing device 100a determines whether the nipping force F3 between the winding roller 109 and the grip roller 112 is smaller than the given maximum value, in step A73. When the sheet processing device 100a determines that the nipping force F3 between the winding roller 109 and the grip roller 112 is equal to or greater than the given maximum value (NO in step A73), the process proceeds to step S15. On the other hand, when the sheet processing device 100a determines that the nipping force F3 between the winding roller 109 and the grip roller 112 is smaller than the given maximum value (YES in step A73), the process proceeds to step A74 to increase the nipping forces F2' and F3' in the present sheet processing to be greater than the nipping forces F2 and F3 in the previous sheet processing. In other words, the relation expressed by F3'=F3+ΔF3 (where ΔF3>0) is satisfied. The nipping force F2' in the present sheet processing is not changed, in other words, the relation of F2'=F2 is satisfied. Then, the process proceeds to step S15.

As described above, when performing the subsequent sheet processing in a case of multifeed of the lamination sheets S, the nipping force of the winding roller 109 with the grip roller 112 is not changed. By so doing, the biasing force applied to each of the winding roller 109, the grip roller 112, and the spring 130b may be reduced, and deterioration of the winding roller 109, the grip roller 112, and the spring 130b can be reduced or prevented.

Eighth Embodiment

Figure 31A:
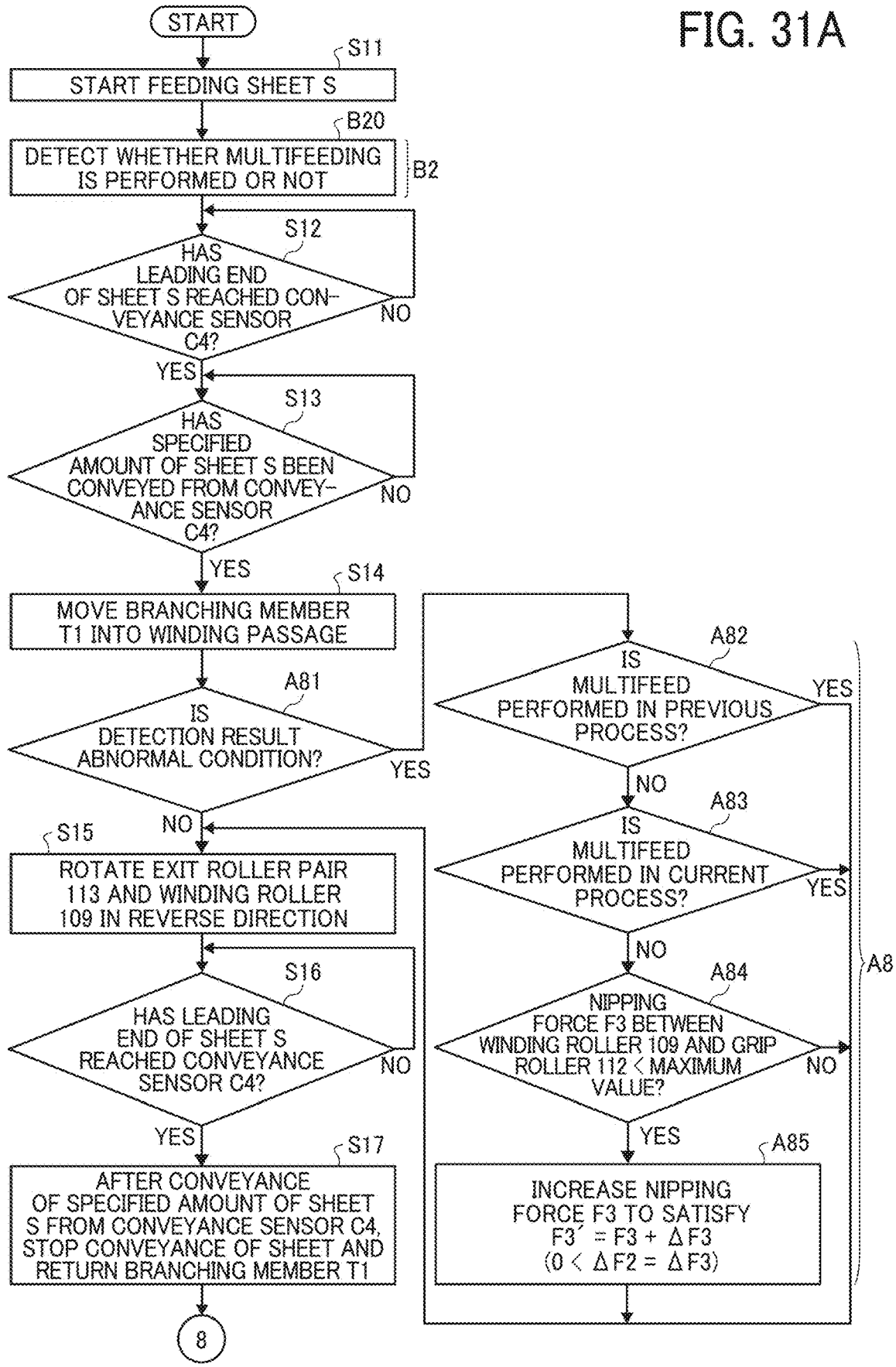
FIG. 31A is the first half of a flowchart of a series of operations from feeding a two-ply sheet to separation of the two-ply sheet according to an eighth embodiment of the present disclosure.
Figure 31B:
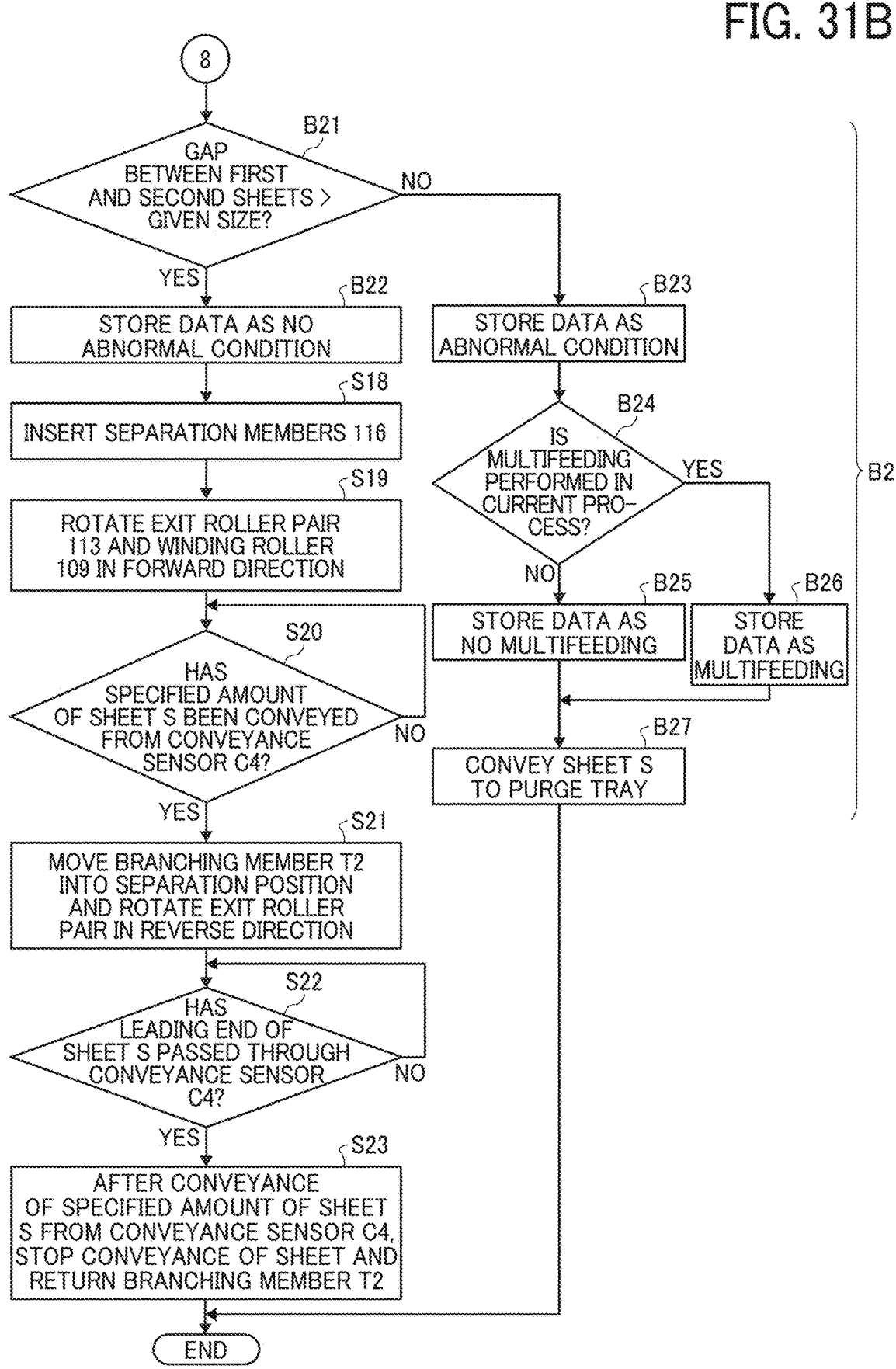
FIG. 31B is the second half of the flowchart of the series of operations subsequent to the operations of FIG. 31A.

FIG. 31 including FIGS. 31A and 31B is a flowchart of a series of operations from feeding a lamination sheet to separation of the lamination sheet according to an eighth embodiment of the present disclosure.

This flowchart of FIGS. 31A and 31B further includes a process group A8 instead of the process group A7 in the flowchart of FIGS. 30A and 30B. The following description is given in particular of the processes added to the flowchart of FIGS. 31A and 31B.

As in the seventh embodiment, the sheet processing device 100a according to the eighth embodiment performs the given processes from steps S11 to S17, and stores data of whether there is an abnormal condition or whether multiple lamination sheets S are multifed together at the same time (multifeed), in step B20 of the process group B2.

After step S14, when performing the subsequent sheet processing operation, the sheet processing device 100a refers to the detection result of the first storage 135 and the detection result of the second storage 136 and determines the detection result in the previous sheet processing is the abnormal condition, in step A81. When the sheet processing device 100a determines that the detection result in the previous sheet processing is not the abnormal condition (NO in step A81), the process proceeds to step S15. On the other hand, when the sheet processing device 100a determines that the detection result in the previous sheet processing is the abnormal condition (YES in step A81), when the sheet processing device 100a determines that the detection result in the previous sheet processing is the abnormal condition (YES in step A81), the sheet processing device 100a determines whether multiple lamination sheets S are multifed together at the same time (whether multifeed is performed) in the previous sheet processing, in step A82. When multiple feed is performed in the previous sheet processing (YES in step A82), the process proceeds to step S15. On the other hand, when multiple feed is not performed in the previous sheet processing (NO in step A82), the sheet processing device 100a determines whether multiple lamination sheets S are multifed together at the same time (whether multifeed is performed) in the present sheet processing, in step A83. When multiple feed is performed in the present sheet processing (YES in step A83), the nipping force F3 between the winding roller 109 and the grip roller 112 is not changed, and the process proceeds to step S15. On the other hand, when multiple feed is not performed in the present sheet processing (NO in step A83), the sheet processing device 100a determines whether the nipping force F3 between the winding roller 109 and the grip roller 112 is smaller than the given maximum value, in step A84. When the sheet processing device 100a determines that the nipping force F3 between the winding roller 109 and the grip roller 112 is equal to or greater than the given maximum value (NO in step A84), the process proceeds to step S15. On the other hand, when the sheet processing device 100a determines that the nipping force F3 between the winding roller 109 and the grip roller 112 is smaller than the given maximum value (YES in step A84), the process proceeds to step A85 to increase the nipping force F3' in the present sheet processing to be greater than the nipping force F3.

As a result, the biasing force applied to the winding roller 109, the grip roller 112, and the spring 130b may be reduced.

A description is now given of a sheet laminator, an image forming apparatus, and an image forming system, each including the sheet processing device according to an embodiment of the present disclosure.

FIG. 32 is a diagram illustrating an overall configuration of a sheet laminator according to an embodiment of the present disclosure, including the sheet processing device.

As illustrated in FIG. 32, a sheet laminator 200 includes the sheet processing device 100 described above, thermal pressure rollers 120, and a sheet ejection roller 121. The thermal pressure rollers 120 that function as a heat-pressure member that can heat and press the lamination sheet S. The sheet ejection roller 121 is disposed downstream from the thermal pressure rollers 120 in the sheet conveyance direction.

The sheet laminator 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user. For this reason, the sheet laminator 200 can enhance and provide the convenience better than a known sheet laminator employing a known technique.

Figure 33:
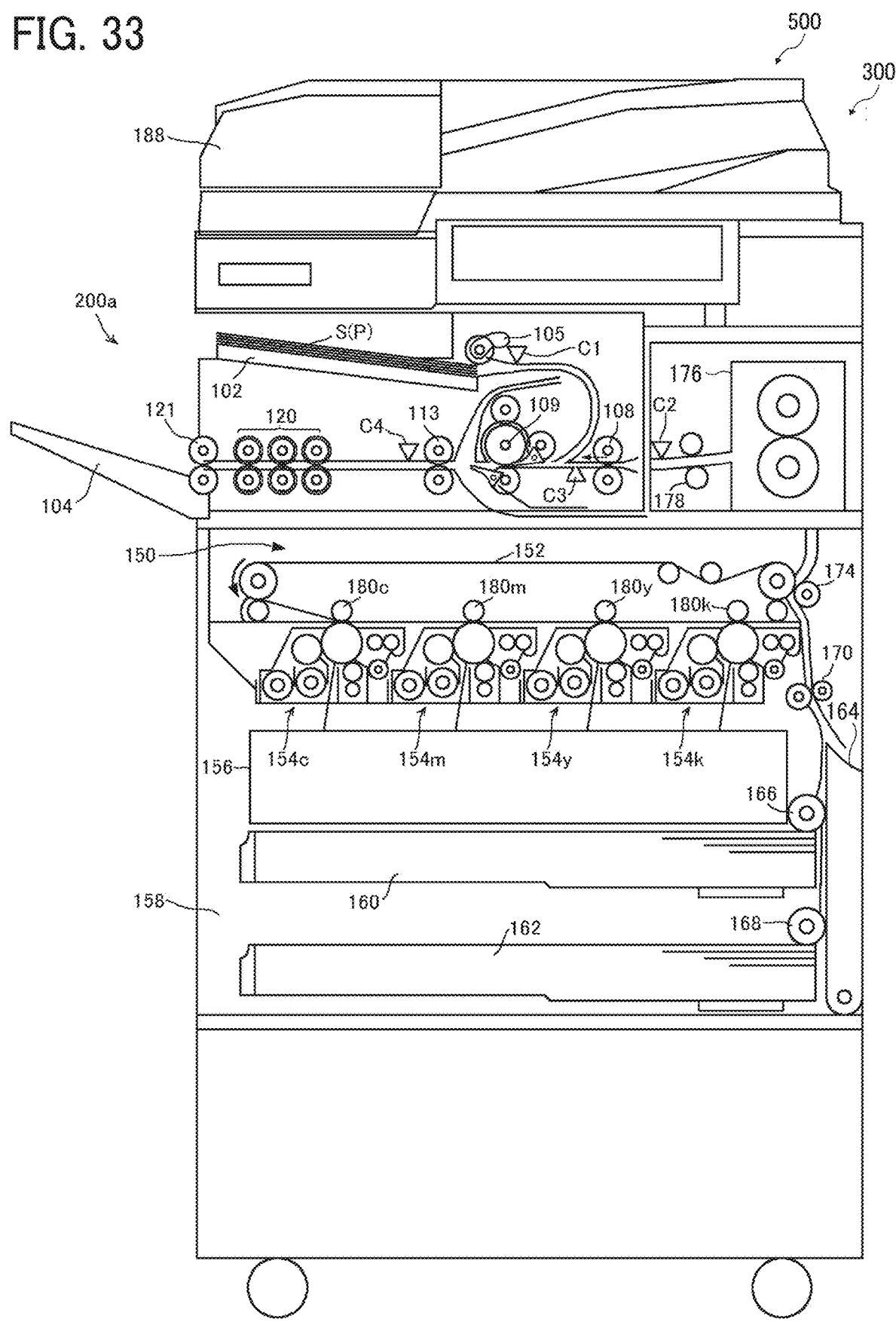
FIG. 33 is a diagram illustrating an overall configuration of an example of an image forming apparatus according to an embodiment of the present disclosure, including the sheet laminator illustrated in FIG. 32.

FIG. 33 is a schematic view of the overall configuration of an example of an image forming apparatus according to an embodiment of the present disclosure, including the laminator according to an embodiment of the present disclosure.

An image forming apparatus 300 includes a sheet laminator 200a as a device that performs sheet lamination in the housing of the image forming apparatus 300.

The sheet laminator 200a includes the sheet tray 102 on which the lamination sheets S or the inner sheets P are stacked. The sheet laminator 200a can receive the lamination sheets S, the inner sheets PM, or both from the image forming apparatus 300. Accordingly, the image forming apparatus 300 (e.g., a printer and a copier) can add (form) an image on the lamination sheet S or the inner sheet P by the in-line connection.

The configuration of the image forming apparatus 300 is described in detail. As illustrated in FIG. 33, the image forming apparatus 300 includes a housing 300A. The image forming apparatus 300 includes an intermediate transfer device 150 in the housing 300A. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 33.

The image forming apparatus 300 further includes image forming units 154c, 154m, 154y, and 154k for cyan (C), magenta (M), yellow (Y), and black (K), respectively. The image forming units 154c, 154m, 154y, and 154k are disposed below the intermediate transfer device 150 in the housing 300a. The image forming units 154c, 154m, 154y, and 154k are aligned in a quadruple tandem manner along an extended direction of the intermediate transfer belt 152. Each of the image forming units 154c, 154m, 154y, and 154k includes a drum-shaped image bearer that rotates in the clockwise direction in FIG. 25. Various image forming components, for example, a charging unit, a developing unit, a transfer unit, and a cleaning unit, are disposed around each of the image forming units 154c, 154m, 154y, and 154k. An exposure device 156 is disposed below the image forming units 154c, 154m, 154y, and 154k included in the image forming apparatus 300.

A sheet feeder 158 is disposed below the exposure device 156 in the image forming apparatus 300. The sheet feeder 158 includes a first sheet tray 160 that stores lamination sheets S and a second sheet tray 162 that stores inner sheets P. The first sheet tray 160 serves as a third sheet stacker on which a two-ply sheet such as the lamination sheet S is stacked. Similarly, the second sheet tray 162 serves as a fourth sheet stacker on which a sheet medium (e.g., the inner sheet P) is stacked.

A first feed roller 166 is disposed at a position upper right of the first sheet tray 160. The first feed roller 166 feeds out the lamination sheet S one by one from the first sheet tray 160 to a sheet conveyance passage 164. A second feed roller 168 is disposed at the upper right of the second sheet tray 162 and feeds the inner sheet P from the second sheet tray 162 one by one to the sheet conveyance passage 164.

The sheet conveyance passage 164 extends from the lower side to the upper side on the right side in the main unit of the image forming apparatus 300 and communicates with the sheet laminator 200*a* inside the image forming apparatus 300. The sheet conveyance passage 164 is provided with, e.g., a conveyance roller 170, a secondary transfer device 174 disposed facing the intermediate transfer belt 152, a fixing device 176, and a sheet ejection device 178 including an ejection roller pair, serially.

Each of the first feed roller 166, the conveyance roller 170, and the sheet conveyance passage 164 serves as a third sheet feeder to feed the two-ply sheet from the first sheet tray 160 (third sheet stacker).

Each of the second feed roller 168, the conveyance roller 170, and the sheet conveyance passage 164 serves as a fourth sheet feeder to feed a sheet medium from the second sheet tray 162 (fourth sheet stacker). Further, the intermediate transfer device 150 and the fixing device 176 serve as a part of the image forming device 140 that forms an image on a two-ply sheet or a sheet medium.

A description is now given of operations of the image forming apparatus 300 according to the present embodiment, to form an image on a lamination sheet S and then perform lamination processing on the lamination sheet S.

To perform an image on the lamination sheet S, first, an image reading device 188 reads the image on an original document, and the exposure device 156 then performs writing of the image on the original document. The image forming units 154*c*, 154*m*, 154*y*, and 154*k* form respective toner images of cyan (C), magenta (M), yellow (Y), and black (K), respectively, on the respective image bearers. Then, primary transfer devices 180*c*, 180*m*, 180*y*, and 180*k* sequentially transfer the respective toner images onto the intermediate transfer belt 152, thereby forming a color image on the intermediate transfer belt 152.

By contrast, the image forming apparatus 300 rotates the first feed roller 166 to feed and convey the lamination sheet S to the sheet conveyance passage 164. The lamination sheet S is conveyed by the conveyance roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the color image has been transferred onto the lamination sheet S, the fixing device 176 fixes the color image to the lamination sheet S, and the sheet ejection device 178 ejects to convey the lamination sheet S to the sheet laminator 200*a*.

Further, the image forming apparatus 300 rotates the second feed roller 168 to feed the inner sheet P to the sheet conveyance passage 164, and the sheet ejection device 178 ejects to convey the inner sheet P to the sheet laminator 200*a*.

As described above, the lamination sheet S on which the image has been formed and the inner sheet P are conveyed to the sheet laminator 200*a*, so that the sheet laminating operation is performed by the sheet laminator 200*a*. The details of the sheet laminating operation have been described above and the redundant descriptions are omitted.

According to the above-described configuration of the image forming apparatus 300 according to the present embodiment, the sheet laminator 200*a* can also perform the sheet laminating operation after an image is formed on the inner sheet P. The sheet laminator 200*a* may also perform the sheet laminating operation after images are formed on the inner sheet P and the lamination sheet S.

Figure 34:
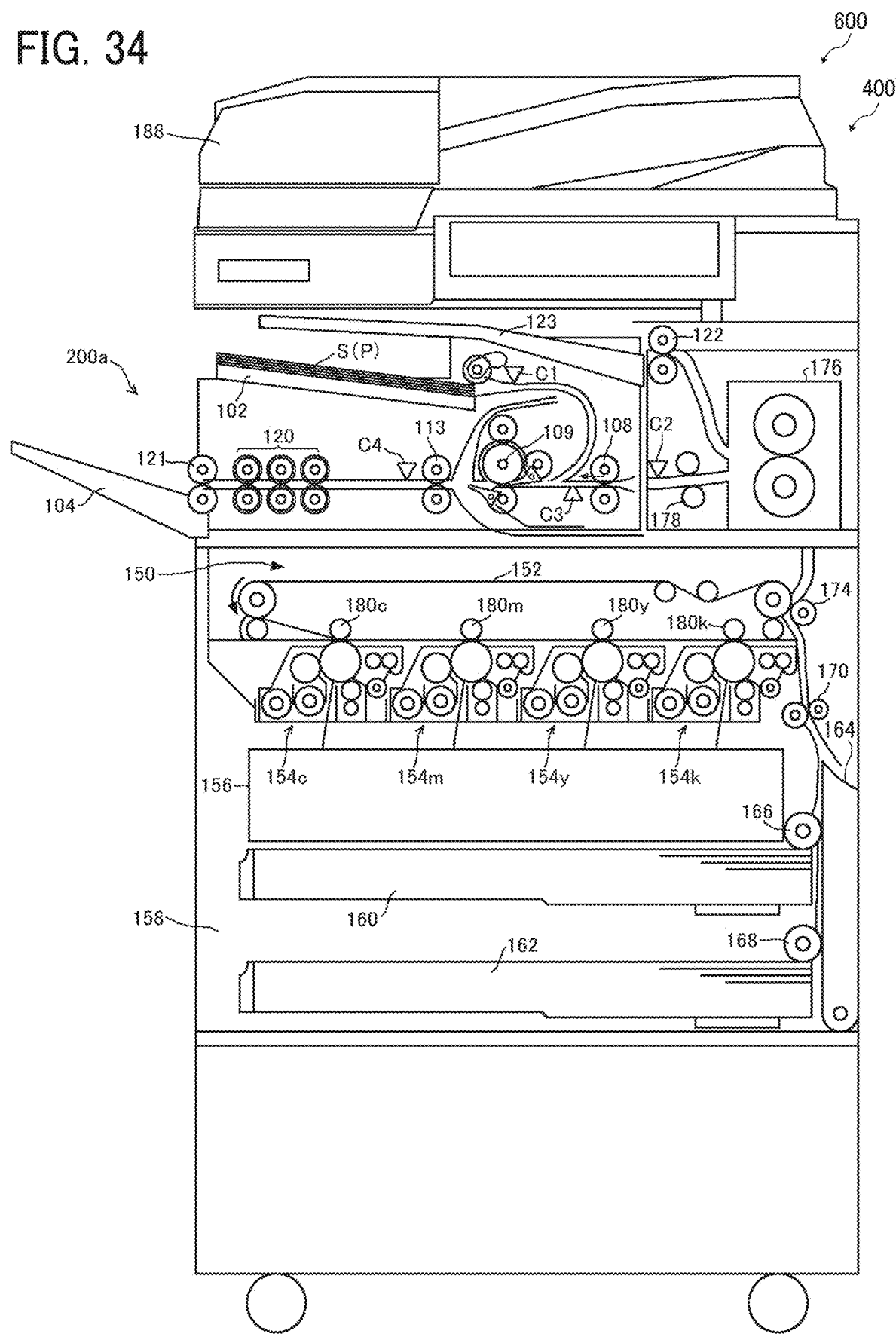
FIG. 34 is a diagram illustrating an overall configuration of an example of an image forming apparatus according to a modification of the embodiments of the present disclosure, including the sheet laminator illustrated in FIG. 32.

FIG. 34 is a schematic view of the overall configuration of an image forming apparatus according to another example of the present disclosure, including the sheet laminator illustrated in FIG. 40.

An image forming apparatus 400 illustrated in FIG. 34 is basically the same as the image forming apparatus 300 illustrated in FIG. 33. However, the image forming apparatus 400 is different from the image forming apparatus 300 illustrated in FIG. 18 in that image forming apparatus 400 includes a main ejection roller pair 122 and a main ejection tray 123, each of which is provided in the housing of the image forming apparatus 400.

When the sheet laminating operation is not performed, the image forming apparatus 400 may eject the recording medium on which the image is formed, by a main ejection roller pair 122 to a main ejection tray 123. Accordingly, the image forming apparatus 400 does not decrease the image output speed when the sheet laminating operation is not performed.

The image forming apparatus 400 may include the sheet laminator 200*a* in the housing 400A to be detachably attached to the housing 400A. In other words, when the sheet laminating operation is not required, the sheet laminator 200*a* may be detached from the image forming apparatus 400.

In addition, in the sheet laminator 200*a* thus removed, the sheet tray 103 on which the inner sheet P is loaded and the pickup roller 106 to feed the inner sheet P from the sheet tray 103 may be attached to the sheet laminator 200*a*, so that the sheet laminator 200*a* is used as a stand-alone machine similar to the sheet laminator 200*a* illustrated in FIG. 32.

Each of the image forming apparatus 300 illustrated in FIG. 33 and the image forming apparatus 400 illustrated in FIG. 34 may include the sheet processing device 100 or the sheet processing device 100*a*, instead of the sheet laminator 200*a*. The image forming apparatus 400 illustrated in FIG. 34 may include the sheet processing device 100 or the sheet processing device 100*a*, each of which is detachably attached to the image forming apparatus 400.

Further, as illustrated in FIG. 33, an image forming system 500 may include the image forming apparatus 300, either of the sheet processing device 100 or the sheet processing device 100*a*, each of which is detachably attached to the image forming apparatus 300, or either of the sheet laminator 200 or the sheet laminator 200*a*, each of which is detachably attached to the image forming apparatus 300. Furthermore, as illustrated in FIG. 34, an image forming system 600 may include the image forming apparatus 400, either of the sheet processing device 100 or the sheet processing device 100*a*, each of which is detachably attached to the image forming apparatus 400, or either of the sheet laminator 200 or the sheet laminator 200*a*, each of which is detachably attached to the image forming apparatus 400. Furthermore, the image forming systems 500 and 600 may further include a sheet feeder (a stacker), a case binding device, or both, in addition to the image forming apparatuses 300 and 400, the sheet processing devices 100 and 100a or the sheet laminators 200 and 200a. In a case in which the lamination sheet S passes through the fixing device 176, the lamination sheet S is not bonded at the fixing temperature but is bonded by application of heat higher than the fixing temperature.

Although the image forming apparatuses 300 and 400 employ electrophotography for image formation on the lamination sheet S and the insertion sheet in the description above, the image formation method is not limited thereto, and inkjet, stencil printing, or other printing method can be used.

Some embodiments of the present disclosure have been described in detail above. The above-described embodiments are examples and can be modified within the scope not departing from the gist of the present disclosure. For example, the first to eighth embodiments may be combined.

A description is now given below of several aspects of the present disclosure.

Aspect 1

In Aspect 1, a sheet processing device includes a rotary member, a first roller, a conveyor, a winding assembly, circuitry, an abnormality detector, and a memory. The first roller nips a two-ply sheet in which two sheets are overlapped and bonded at one end of the two-ply sheet, with the rotary member. The conveyor conveys the two-ply sheet between the rotary member and the first roller, with the one end disposed on an upstream side or a downstream side in a conveyance direction of the two-ply sheet. The circuitry is configured to adjust the nipping force to nip the two-ply sheet. The abnormality detector detects an abnormal condition that a gap greater than a given interval between the two sheets of the two-ply sheet is not formed in response to a winding of the two sheets around the rotary member. The memory stores a detection result of the abnormality detector. The winding assembly winds the two-ply sheet conveyed between the rotary member and the first roller, around the rotary member. The winding assembly includes a second roller to nip, with the rotary member, the two-ply sheet. The second roller is disposed downstream from the first roller in a first rotational direction in which the rotary member winds the two-ply sheet. A nipping force to nip the two-ply sheet between the rotary member and the second roller increases toward downstream from the first roller in the first rotational direction. The two-ply sheet is wound around the rotary member to generate a winding circumferential difference between the two sheets of the two-ply sheet to separate the two sheets. When the abnormality detector detects the abnormal condition as the detection result in a previous separation process, the circuitry is configured to increase the nipping force to nip the two-ply sheet between the rotary member and the second roller to be greater than a previous nipping force to nip the two-ply sheet between the rotary member and the second roller in the previous separation process to wind the two sheets of the two-ply sheet around the rotary member.

Aspect 2

In Aspect 2, in the sheet processing device according to Aspect 1, the circuitry is configured to adjust the nipping force to nip the two-ply sheet between the rotary member and the second roller disposed extreme downstream in the first rotational direction, and when the abnormality detector detects the abnormal condition as the detection result in the previous separation process, the circuitry is configured to increase the nipping force to nip the two-ply sheet between the rotary member and the second roller disposed extreme downstream in the first rotational direction to be greater than the previous nipping force to nip the two-ply sheet between the rotary member and the second roller disposed extreme downstream in the first rotational direction in the previous separation process to wind the two sheets of the two-ply sheet around the rotary member.

Aspect 3

In Aspect 3, in the sheet processing device according to Aspect 1, the circuitry is configured to adjust the nipping force to nip the two-ply sheet between the rotary member and each of at least two second rollers including the second roller disposed extreme downstream in the first rotational direction, and when the abnormality detector detects the abnormal condition as the detection result in the previous separation process, the circuitry is configured to increase the nipping force to nip the two-ply sheet between the rotary member and each of the at least two second rollers including the second roller disposed extreme downstream in the first rotational direction to be greater than the previous nipping force to nip the two-ply sheet between the rotary member and each of the at least two second rollers in the previous separation process, and increase a different of nipping forces to nip the two-ply sheet between the rotary member with adjacent members of the first roller and the at least two second rollers to be equal to or greater than a difference of previous nipping forces to nip the two-ply sheet between the rotary member with adjacent members of the first roller and the at least two second rollers in the previous separation process.

Aspect 4

In Aspect 4, in the sheet processing device according to Aspect 3, when the abnormality detector detects no abnormal condition as the detection result in the previous separation process and the nipping force to nip the two-ply sheet the rotary member and each of the at least two second rollers including the second roller disposed extreme downstream in the first rotational direction is not a given minimum value, the circuitry is configured to decrease the nipping force to nip the two-ply sheet between the rotary member and each of the at least two second rollers to be smaller than the previous nipping force to nip the two-ply sheet between the rotary member and each of the at least two second rollers in the previous separation process within a range equal to or greater than the given minimum value.

Aspect 5

In Aspect 5, the sheet processing device according to any one of Aspects 1 to 4 further includes a sheet stacker, a sheet feeder, a multifeed detector, and another memory. The sheet stacker stacks a two-ply sheet or two-ply sheets including the two-ply sheet. The sheet feeder feeds the two-ply sheet from the sheet stacker. The multifeed detector detects multifeed of the two-ply sheets fed from the sheet stacker. Said another memory stores a detection result of the multifeed detector. When the detection result stored in the memory is the abnormal condition and the detection result stored in said another memory is a multifeed, the circuitry is configured to leave the nipping force to nip the two-ply sheet between the rotary member and the second roller unchanged from the nipping force to nip the two-ply sheet between the rotary member in the previous separation process.

Aspect 6

In Aspect 6, in the sheet processing device according to Aspect 5, when the detection result stored in the memory is the abnormal condition and the detection result detected by the multifeed detector is the multifeed, the circuitry is configured to leave the nipping force to nip the two-ply sheet between the rotary member and the second roller unchanged from the nipping force to nip the two-ply sheet between the rotary member in the previous separation process.

Aspect 7

In Aspect 7, a sheet laminator includes the sheet processing device according to any one of Aspects 1 to 6 and a thermal pressure member to heat and press the two-ply sheet to perform a sheet laminating operation on the two-ply sheet in which an inner sheet is inserted between the two sheets separated by the sheet processing device.

Aspect 8

In Aspect 8, an image forming apparatus includes a sheet stacker, a sheet feeder, an image forming device, and the sheet processing device according to any one of Aspects 1 to 6 or the sheet laminator according to Aspect 7. The sheet stacker stacks stack a two-ply sheet. The sheet feeder feeds the two-ply sheet from the sheet stacker. The image forming device forms an image on the two-ply sheet fed from the sheet feeder. The sheet processing device separates the two sheets of the two-ply sheet on which an image is formed. The sheet laminator performs a sheet laminating operation on the two-ply sheet in which an inner sheet is inserted between the two sheets.

Aspect 9

In Aspect 9, an image forming system includes an image forming apparatus and the sheet processing device according to any one of Aspects 1 to 6 or the sheet laminator according to Aspect 7. The image forming apparatus forms an image on the two-ply sheet. The sheet processing device separates the two sheets of the two-ply sheet on which an image is formed. The sheet laminator performs a sheet laminating operation on the two-ply sheet in which an inner sheet is inserted between the two sheets.

Aspect 10

In Aspect 10, an image forming system includes an image forming apparatus and the sheet processing device according to any one of Aspects 1 to 6 or the sheet laminator according to Aspect 7. The image forming apparatus forms an image on the two-ply sheet. The sheet processing device is detachably attached to the image forming apparatus. The sheet laminator performs a sheet laminating operation on the two-ply sheet in which an inner sheet is inserted between the two sheets.

Aspect 11

In Aspect 11, a sheet processing device includes a rotator, a first nipper, a conveyor, a second nipper, a detector, a memory, and circuitry. The rotator winds a two-ply sheet, in which two sheets are overlapped and bonded at one end of the two-ply sheet, around the rotator to generate a winding circumferential difference between the two sheets of the two-ply sheet. The first nipper nips the two-ply sheet with the rotator to convey the two-ply sheet in a conveyance direction. The conveyor is disposed downstream from the rotator in the conveyance direction to convey the two-ply sheet to a nip between the rotator and the first nipper. The second nipper nips the two-ply sheet with the rotator. The second nipper is disposed downstream from the first nipper in a first rotational direction in which the rotator winds the two-ply sheet. The detector detects an abnormal condition, in which a gap greater than a given interval is not formed between the two sheets of the two-ply sheet when the two sheets is wound around the rotator. The memory stores a detection result as the abnormal condition by the detector. The circuitry is to increase a nipping force of the second nipper, to nip the two-ply sheet with the rotator, with respect to the first nipper toward downstream from the first nipper in the first rotational direction, and increase the nipping force of the second nipper in a present sheet processing to be greater than a previous nipping force of the second nipper in a previous sheet processing when the memory stores the detection result as the abnormal condition in the previous sheet processing, to wind the two sheets of the two-ply sheet around the rotator.

Aspect 12

In Aspect 12, in the sheet processing device according to Aspect 11, the circuitry is further to adjust the nipping force of the second nipper disposed at a downstream end in the first rotational direction to nip the two-ply sheet between the rotator and the second nipper, and increase the nipping force of the second nipper disposed at the downstream end in the present sheet processing to be greater than the previous nipping force of the second nipper disposed at the downstream end in the previous sheet processing when the memory stores the detection result as the abnormal condition in the previous sheet processing, to wind the two sheets of the two-ply sheet around the rotator.

Aspect 13

In Aspect 13, the sheet processing device according to Aspect 11 further includes at least two second nippers including the second nipper disposed at a downstream end in the first rotational direction. The circuitry is further configured to adjust the nipping force of the at least two second nippers to nip the two-ply sheet between the rotator and each of the at least two second nippers, increase the nipping force of each of the at least two second nippers in the present sheet processing to be greater than the previous nipping force of each of the at least two second nippers in the previous sheet processing, and increase a difference of nipping forces between the first nipper and each of the at least two second nippers in the present sheet processing to be equal to or greater than a difference of previous nipping forces between the first nipper and each of the at least two second nippers in the previous sheet processing, when the memory stores the detection result as the abnormal condition in the previous sheet processing.

Aspect 14

In Aspect 14, in the sheet processing device according to Aspect 13, the circuitry is further to decrease the nipping force of each of the at least two second nippers in the present sheet processing to be smaller than the previous nipping force of each of the at least two second nippers in the previous sheet processing within a range equal to or greater than a given minimum value, when the memory does not store the detection result as the abnormal condition in the previous sheet processing, and the nipping force of each of the at least two second nippers is different from the given minimum value.

Aspect 15

In Aspect 15, the sheet processing device according to any one of Aspects 11 to 14 further includes a sheet stacker, a sheet feeder, a multifeed detector, and another memory. The sheet stacker stacks a two-ply sheet or two-ply sheets including the two-ply sheet. The sheet feeder feeds the two-ply sheet from the sheet stacker. The multifeed detector detects a multifeed of the two-ply sheets fed from the sheet stacker. Said another memory stores a detection result as multifeed detected by the multifeed detector. The circuitry is further to set the nipping force of the second nipper in the present sheet processing to be as same as the nipping force of the second nipper in the previous sheet processing, when the memory stores the detection result as the abnormal condition, and when said another memory stores the detection result as the multifeed.

Aspect 16

In Aspect 16, in the sheet processing device according to Aspect 15, the circuitry is to maintain the nipping force of the second nipper as same as the nipping force of the second nipper in the previous sheet processing, when the memory stores the detection result as the abnormal condition, and when said another memory stores the detection result as the multifeed.

Aspect 17

In Aspect 17, an image forming apparatus includes a sheet stacker, a sheet feeder, an image forming device, and the sheet processing device according to any one of Aspects 11 to 16. The sheet stacker stacks a two-ply sheet. The sheet feeder feeds the two-ply sheet from the sheet stacker. The image forming device forms an image on the two-ply sheet fed from the sheet feeder.

Aspect 18

In Aspect 18, an image forming system includes an image forming apparatus to form an image on the two-ply sheet, and the sheet processing device according to any one of Aspects 11 to 16.

Aspect 19

In Aspect 19, an image forming system includes an image forming apparatus and the sheet processing device according to any one of Aspects 11 to 16. The image forming apparatus forms an image on the two-ply sheet. The sheet processing device is detachably attached to the image forming apparatus.

Aspect 20

In Aspect 20, a sheet laminator includes the sheet processing device according to any one of Aspects 11 to 16, and a thermal pressure member to heat and press the two-ply sheet to perform a sheet laminating operation on the two-ply sheet in which an inner sheet is inserted between the two sheets separated by the sheet processing device.

Aspect 21

In Aspect 21, an image forming apparatus includes a sheet stacker, a sheet feeder, an image forming device, and the sheet laminator according to Aspect 20. The sheet stacker stacks a two-ply sheet. The sheet feeder feeds the two-ply sheet from the sheet stacker. The image forming device forms an image on the two-ply sheet fed from the sheet feeder.

Aspect 22

In Aspect 22, an image forming system includes an image forming apparatus to form an image on the two-ply sheet, and the sheet laminator according to Aspect 20.

Aspect 23

In Aspect 23, an image forming system includes an image forming apparatus and the sheet laminator according to Aspect 20. The image forming apparatus forms an image on the two-ply sheet. The sheet laminator is detachably attached to the image forming apparatus.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing device comprising:
a rotator to wind a two-ply sheet, in which two sheets are overlapped and bonded at one end of the two-ply sheet, around the rotator to generate a winding circumferential difference between the two sheets of the two-ply sheet;
a first nipper to nip the two-ply sheet with the rotator to convey the two-ply sheet in a conveyance direction;
a conveyor disposed downstream from the rotator in the conveyance direction to convey the two-ply sheet to a nip between the rotator and the first nipper;
a second nipper to nip the two-ply sheet with the rotator, the second nipper disposed downstream from the first nipper in a first rotational direction in which the rotator winds the two-ply sheet;
a detector to detect an abnormal condition, in which a gap greater than a given interval is not formed between the two sheets of the two-ply sheet when the two sheets is wound around the rotator; and
a memory to store a detection result as the abnormal condition by the detector,
circuitry configured to:
increase a nipping force of the second nipper, to nip the two-ply sheet with the rotator, with respect to the first nipper toward downstream from the first nipper in the first rotational direction; and
increase the nipping force of the second nipper in a present sheet processing to be greater than a previous nipping force of the second nipper in a previous sheet processing when the memory stores the detection result as the abnormal condition in the previous sheet processing,
to wind the two sheets of the two-ply sheet around the rotator.

2. The sheet processing device according to claim 1, wherein the circuitry is further configured to:
adjust the nipping force of the second nipper disposed at a downstream end in the first rotational direction to nip the two-ply sheet between the rotator and the second nipper; and
increase the nipping force of the second nipper disposed at the downstream end in the present sheet processing to be greater than the previous nipping force of the second nipper disposed at the downstream end in the previous sheet processing when the memory stores the detection result as the abnormal condition in the previous sheet processing,
to wind the two sheets of the two-ply sheet around the rotator.

3. The sheet processing device according to claim 1, further comprising at least two second nippers including the second nipper disposed at a downstream end in the first rotational direction,
the circuitry is further configured to:
adjust the nipping force of the at least two second nippers to nip the two-ply sheet between the rotator and each of the at least two second nippers;
increase the nipping force of each of the at least two second nippers in the present sheet processing to be greater than the previous nipping force of each of the at least two second nippers in the previous sheet processing; and
increase a difference of nipping forces between the first nipper and each of the at least two second nippers in the present sheet processing to be equal to or greater than a difference of previous nipping forces between the first nipper and each of the at least two second nippers in the previous sheet processing,
when the memory stores the detection result as the abnormal condition in the previous sheet processing.

4. The sheet processing device according to claim 3, wherein the circuitry is further configured to:
decrease the nipping force of each of the at least two second nippers in the present sheet processing to be smaller than the previous nipping force of each of the at least two second nippers in the previous sheet processing within a range equal to or greater than a given minimum value,
when the memory does not store the detection result as the abnormal condition in the previous sheet processing; and
the nipping force of each of the at least two second nippers is different from the given minimum value.

5. The sheet processing device according to claim 1, further comprising:
a sheet stacker to stack a two-ply sheet or two-ply sheets including the two-ply sheet;
a sheet feeder to feed the two-ply sheet from the sheet stacker;
a multifeed detector to detect a multifeed of the two-ply sheets fed from the sheet stacker; and
another memory to store a detection result as multifeed detected by the multifeed detector,
wherein the circuitry is further configured to:
set the nipping force of the second nipper in the present sheet processing to be as same as the nipping force of the second nipper in the previous sheet processing,
when the memory stores the detection result as the abnormal condition, and
when said another memory stores the detection result as the multifeed.

6. The sheet processing device according to claim 5, wherein the circuitry is configured to:
maintain the nipping force of the second nipper as same as the nipping force of the second nipper in the previous sheet processing,
when the memory stores the detection result as the abnormal condition, and
when said another memory stores the detection result as the multifeed.

7. An image forming apparatus comprising:
a sheet stacker to stack a two-ply sheet;
a sheet feeder to feed the two-ply sheet from the sheet stacker;
an image forming device to form an image on the two-ply sheet fed from the sheet feeder; and
the sheet processing device according to claim 1.

8. An image forming system comprising:
an image forming apparatus to form an image on the two-ply sheet; and
the sheet processing device according to claim 1.

9. An image forming system comprising:
an image forming apparatus to form an image on the two-ply sheet; and
the sheet processing device according to claim 1 detachably attached to the image forming apparatus.

10. A sheet laminator comprising:
the sheet processing device according to claim 1; and
a thermal pressure member to heat and press the two-ply sheet to perform a sheet laminating operation on the two-ply sheet in which an inner sheet is inserted between the two sheets separated by the sheet processing device.

11. An image forming apparatus comprising:

a sheet stacker to stack a two-ply sheet;

a sheet feeder to feed the two-ply sheet from the sheet stacker;

an image forming device to form an image on the two-ply sheet fed from the sheet feeder; and the sheet laminator according to claim 10.

12. An image forming system comprising:

an image forming apparatus to form an image on the two-ply sheet; and the sheet laminator according to claim 10.

13. An image forming system comprising:

an image forming apparatus to form an image on the two-ply sheet; and the sheet laminator according to claim 10 detachably attached to the image forming apparatus.

\* \* \* \* \*